(12) United States Patent
Jones et al.

(10) Patent No.: US 8,768,934 B2
(45) Date of Patent: Jul. 1, 2014

(54) METHOD AND SYSTEM OF PROVIDING VERIFIED CONTENT

(75) Inventors: Scott A. Jones, Carmel, IN (US); Thomas E. Cooper, Indianapolis, IN (US); Chris Navta, Indianapolis, IN (US)

(73) Assignee: ChaCha Search, Inc, Carmel, IN (US)

( * ) Notice: Subject to any disclaimer, the term of this patent is extended or adjusted under 35 U.S.C. 154(b) by 366 days.

(21) Appl. No.: 13/160,575

(22) Filed: Jun. 15, 2011

(65) Prior Publication Data

US 2011/0307496 A1 Dec. 15, 2011

Related U.S. Application Data

(60) Provisional application No. 61/354,767, filed on Jun. 15, 2010, provisional application No. 61/359,254, filed on Jun. 28, 2010, provisional application No. 61/363,518, filed on Jul. 12, 2010.

(51) Int. Cl.
*G06F 17/30* (2006.01)

(52) U.S. Cl.
USPC ............ 707/748; 707/766; 707/769; 707/771

(58) Field of Classification Search
USPC .................. 715/716; 709/217, 215; 340/5.52; 707/748, 766, 769, 771
See application file for complete search history.

(56) References Cited

U.S. PATENT DOCUMENTS

| | | |
|---|---|---|
| 6,026,369 A | 2/2000 | Capek |
| 6,381,465 B1 | 4/2002 | Chern et al. |
| 6,584,323 B1 | 6/2003 | Son |
| 6,934,391 B1 | 8/2005 | Linkola et al. |
| 6,988,146 B1 | 1/2006 | Magret et al. |
| 7,181,417 B1 | 2/2007 | Langseth et al. |
| 7,257,391 B2 | 8/2007 | Burgess et al. |
| 2002/0085027 A1 | 7/2002 | Kim |
| 2004/0137886 A1 | 7/2004 | Ross et al. |
| 2005/0130685 A1 | 6/2005 | Jenkin |
| 2005/0267816 A1 | 12/2005 | Jaramillo |
| 2005/0267945 A1 * | 12/2005 | Cohen et al. ................... 709/215 |
| 2006/0174028 A1 | 8/2006 | Zhu |
| 2007/0055565 A1 | 3/2007 | Baur et al. |
| 2007/0105536 A1 | 5/2007 | Tingo |
| 2007/0130030 A1 | 6/2007 | Bookstaff |
| 2008/0064421 A1 | 3/2008 | Philbin |
| 2008/0153520 A1 | 6/2008 | Kirtane |
| 2008/0208675 A1 | 8/2008 | Wolmuth et al. |
| 2008/0228572 A1 | 9/2008 | Teterin |
| 2008/0243619 A1 | 10/2008 | Sharman et al. |
| 2008/0250320 A1 * | 10/2008 | Channell et al. ............... 715/716 |
| 2008/0287150 A1 | 11/2008 | Jiang et al. |
| 2008/0311934 A1 | 12/2008 | Soderstrom |
| 2009/0254930 A1 | 10/2009 | Lo et al. |
| 2010/0271173 A1 * | 10/2010 | Aikawa et al. ............... 340/5.52 |
| 2011/0289187 A1 * | 11/2011 | Brodin et al. ................. 709/217 |

* cited by examiner

*Primary Examiner* — Sathyanarayan Pannala

(74) *Attorney, Agent, or Firm* — Staas & Halsey

(57) ABSTRACT

A system and method for creating and utilizing content is described. Content is generated which includes a query and a response to the query. A primary query may be used to generate a plurality of variant queries which may be matched to a request. A content owner or curator may review a query, a response, and/or alternate queries, and may provide access to media which may be used to generate queries and responses.

20 Claims, 49 Drawing Sheets

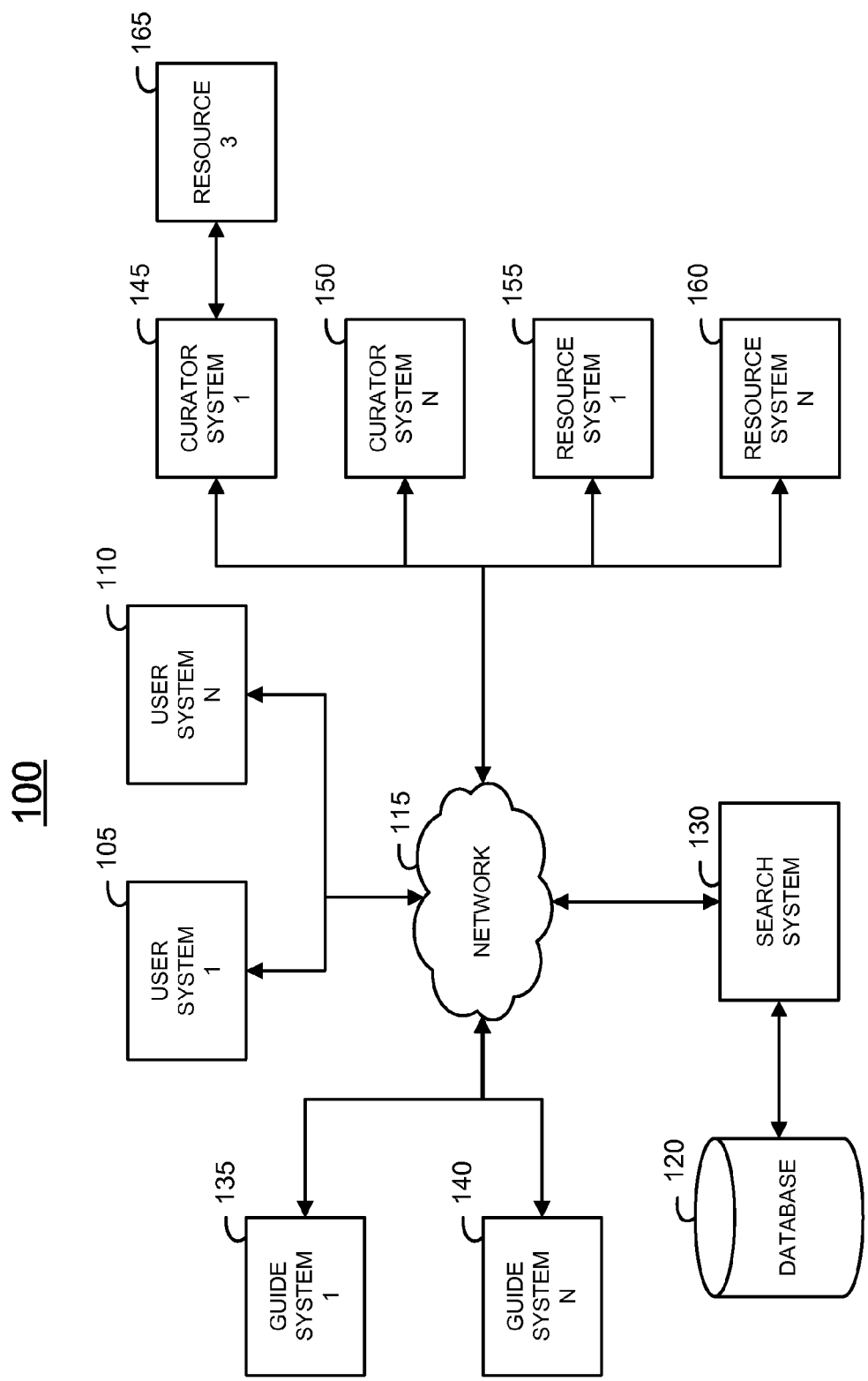

REQUEST RECORD TABLE 202

| | Description | Example Content 200a | Example Content 200b | Example Content 200c |
|---|---|---|---|---|
| 205 | Request ID | 'Request1.1' | 'Request1.2' | 'Request3.4' |
| 210 | Request type | Search | Dialogue | Search curated |
| 215 | Request destination | General search | Followers | Curator2 |
| 220 | Request time value | 'Immediate' | 'Expire three days' | 'Immediate' |
| 225 | Request guide ID | 'Guide2' | 'Expediter1' | 'Expediter2' |
| 230 | Request user ID | 'User1' | 'User1' | 'User3' |
| 235 | Request input | 'What is the first law of robotics?' | 'Are you a cat lover?' | 'What is Tao Hoo Thod?' |
| 240 | Request output | 'A robot may not injure a human being, or, through inaction, allow a human being to come to harm.' | 'Amy: Yes'; 'Bob: No'; 'Jay: Never' | 'Tao Hoo Thod from Swazdee is deep fried chunks of yummy tofu. Served with selection of peanut or sweet chili sauce.' |
| 245 | Request resource ID | 'Resource system1' | 'chacha.me' | 'Resource3' |
| 250 | Request time information | Start - 11.33A 11-Nov-09<br>End - 11.36A 11-Nov-09 | Start - 11.55A 11-Nov-09<br>End - 11.57A 14-Nov-09 | Start - 3.19P 11-Nov-09<br>End - 3.20P 11-Nov-09 |

FIG. 2

302
USER RECORD TABLE

| | Description | Example Content 300a | Example Content 300b |
|---|---|---|---|
| 305 | User ID | 'User1' | 'User2' |
| 310 | User request ID | Request1.1; Request1.2; Request1.3 | Request2.1; Request2.2 |
| 315 | User communication information | 317.222.2242; user1@chacha.com; 'User1 chacha.me passU1' | 'AIMUser2'; 888.888.2242; 'User2 chacha.me passU2' |
| 320 | User profile ID | 'DemoprofileU1'; 'GeoprofileU1'; 'PersprofileU1' | 'DemoprofileU2'; 'GeoprofileU2'; 'PersprofileU2' |
| 325 | User dialogue ID | 'Dialogue1'; 'Dialogue2' | 'Dialogue1'; 'Dialogue3'; 'Dialogue4' |

FIG. 3

GUIDE RECORD TABLE
402

| | Description | Example Content 400a | Example Content 400b | Example Content 400c |
|---|---|---|---|---|
| 405 | Guide ID | 'Guide2' | 'Expediter1' | 'Specialist2' |
| 410 | Guide request ID | 'Request1.1'; 'Request2.2'; 'Request1.4' | 'Request1.2'; 'Request2.2'; 'Request2.5' | 'Request3.1'; 'Request3.3'; 'Request3.5' |
| 415 | Guide request type | 'Category1'; 'Category2'; 'Search timed'; 'Search untimed' | 'Expedite timed'; 'Expedite untimed'; 'transcribe' | 'Category2'; 'Search untimed' |
| 420 | Guide rating | 0.9; 0.7; 0.95; 0.7 | 0.95; 0.62; 0.88 | 0.85; 0.99 |
| 425 | Guide communication information | guidecomtyp1='guide2'; guidecomtyp2='guide2@chacha.com'; guidecomtyp3='twitter:guide2'; guidecomtyp4='555.924.2242' | guidecomtyp1='exp1'; guidecomtyp2='exp1@chacha.com'; guidecomtyp3='twitter:exp1'; guidecomtyp4='555.944.2242' | guidecomtyp1='spec2'; guidecomtyp2='spec2@chacha.com'; guidecomtyp3='twitter:spec2'; guidecomtyp4='555.964.2242' |
| 430 | Guide curator ID | 'Curator1'; 'Curator2' | 'Curator2' | |

FIG. 4

CURATOR RECORD TABLE

502

| | Description | Example Content 500a | Example Content 500b |
|---|---|---|---|
| 505 | Curator ID | 'David Guetta' | 'Sawasdee Indianapolis' |
| 510 | Curator category ID | 'Entertainment'; 'Music'; 'France' | 'Dining'; 'Restaurants'; 'Thailand' |
| 515 | Curator keyword ID | 'One Love'; 'Pop Life'; 'Guetta Blaster' | 'Thod mun Pla'; 'Pug thod'; 'Yum gai'; 'lemon grass'; 'thai'; 'chili' |
| 520 | Curator resource ID | http://www.facebook.com/DavidGuetta; http://www.myspace.com/davidguetta | http://www.sawasdeeindy.com |
| 525 | Curator communication information | Curatorcomtyp1='DavidG'; Curatorcomtyp2='DavidGuetta@mailme.fr'; Curatorcomtyp3='http://twitter.com/davidguetta' | Curatorcomtyp1='Sawasdee'; Curatorcomtyp2='thai@sawasdeeindy.com'; Curatorcomtyp3='twitter:exp1'; Curatorcomtyp4='317.844.9451' |
| 530 | Curator dialogue ID | 'DialogueDG1'; 'DialogueDG2' | 'DialogueSWD2'; 'DialogueSWD4'; 'DialogueSWD25' |
| 535 | Curator guide ID | 'Expediter2'; 'Guide27' | 'Expediter2'; 'Expediter7'; 'Specialist3'; 'Generalist4' |
| 540 | Curator guide rating | '0.8'; '0.6' | '0.9'; '0.4'; '0.85'; '0.3' |

FIG. 5

DIALOGUE RECORD TABLE
602

| | Description | Example Content | Example Content |
|---|---|---|---|
| | | 600a | 600b |
| 605 | Dialogue ID | 'DialogueSWD2' | 'DialogueDG12' |
| 610 | Dialogue description | 'What is your favorite dish at Swasdee?' | 'Do you like working with new artists?' |
| 615 | Dialogue access information | http://dialogueswd2.chacha.com | http://dialoguedg12.chacha.com |
| 620 | Dialogue user ID | 'Sawasdee1'; 'Sawasdee2'; 'Sawasdeechachees' | |
| 625 | Dialogue answer ID | 'DSWD2A1'; 'DSWD2A2'; 'DSWD2A3'; 'DSWD2A5' | 'DDG12A1' |
| 630 | Dialogue responder ID | 'Sawasdee1'; 'Sawasdeechachee11'; 'Sawasdeechachee18' | |
| 635 | Dialogue curator ID | 'SawasdeeIndy' | 'DavidGuetta' |

FIG. 6

700
CONVERSATION RECORD

|     | Description              | Example Content                               |
|-----|--------------------------|-----------------------------------------------|
| 705 | Conversation record ID   | 'ConversationCC1'                             |
| 710 | Conversation curator ID  | 'ChaCha'                                      |
| 715 | Conversation dialogue ID | 'DialogueCCS1'; 'DialogueCCS3'; 'DialogueCCS4'; |
| 720 | Conversation target ID   | 'Newuser_sports'; 'User5'                     |
| 725 | Conversation responder ID| 'User1'; 'Guide5'; 'User8'                    |
| 730 | Conversation duration    | 'four days'                                   |
| 735 | Conversation category ID | 'Sports>Football'                             |

FIG. 7

800
STRUCTURED DIALOGUE RECORD

|     | Description                        | Example Content                                                                                                                                                                                                                                          |
|-----|------------------------------------|----------------------------------------------------------------------------------------------------------------------------------------------------------------------------------------------------------------------------------------------------------|
| 805 | Structured dialogue ID             | 'Demographicdialogue11'                                                                                                                                                                                                                                  |
| 810 | Structured dialogue map ID         | 'Marital status'                                                                                                                                                                                                                                         |
| 815 | Structured dialogue curator ID     | 'John Simpson-Smythe'                                                                                                                                                                                                                                    |
| 820 | Structured dialogue response       | 'I have been married to Linda since 1998.'                                                                                                                                                                                                               |
| 825 | Structured dialogue alternate queries | 'Are you married?'; 'Are you single?'; 'Is there a Mrs. %curator_ID?'; 'What is Mrs.%curator_ID?'s name?' 'Do you have a wife?'; 'What is your spouse's name?'; 'Are you divorced?'; 'Are you still married?'; 'Who did you marry?'; 'Is %curator_ID? married' |
| 830 | Structured dialogue resource ID    | 'Resource5'                                                                                                                                                                                                                                              |

FIG. 8

ChaCha®

QuickLinks

| Sawasdee | Restaurants | Yahoo |

Query: Does Sawasdee make KHA HMU? ( Select all | Clear all )  What is kha hmu?  Location: Fishers, IN  Search ▶

Stewed Pork Knuckles -- Thailand Forum
12 posts - 9 authors - Last post: Feb 7, 2008
my wife cooks *kha hmu*,,, saap , mak mak,,, about the only Thai dish that I really love ,,,, it will be good to test these other recipes
www.*thaivisa.com* › ... › Food in Thailand › Thai Food - Cached - Similar

Food of Thailand - Herbs
Thai food is currently enjoying an international vogue. ... are the dried flowerbeds of an evergreen tree native to the Molucca Islands. ...
Only cumin is used in Thai cooking, mainly in the making of curry pastes. Galangal (kha) ...www.sawasdee.com/thailand/food/herbs.htm - Cached - Similar

Kha :: Thai :: Restaurants :: Time Out Singapore
Her latest venture, the Thaithemed Kha, is set in the lush, resort-like grounds of Hort Park and it's easily her best effort, food- and looks-wise. ...
www.timeoutsingapore.com/restaurants/thai/kha - 21 hours ago - Cached - Similar

Mampui ram ah Vantirhkoh(?) an hmu! I mi(sual).com
Oct 6, 2009 .... Thil awm dan a hmuna enfiah tura kal, kan Corr. sawi danin, he UFO an tih mai hi Thawhtanni khan naupang hovin
an hmu a, an hmuh lai chuan ...www.misual.com/2009/.../mampui-ram-ah-vantirhkoh-an-hmu/ - India - Cached

| Food and Dining | Cooking | Thailand |
|---|---|---|
| ▪ Food Network<br>▪ Strange foods<br>▪ What not to eat<br>▪ No preservations | ▪ Not Mama's kitchen<br>▪ Betty Crocker never cooked this<br>▪ The Toys of Cooking<br>▪ Get the salt out | ▪ Google Translate<br>▪ CIA Fact book<br>▪ Tourism Thailand<br>▪ Thai culture and customs |

FIG. 22

2700
SUBSCRIBER RECORD

| | Description | Example Content |
|---|---|---|
| 2705 | Subscriber record ID | 'Subscriber2' |
| 2710 | Subscriber channel ID | '317.555.2204'; 'usertom@chacha.com' |
| 2715 | Subscriber request ID | '317.555.2204,12.12.08, 30 Jan 2011'; 'usertom@chacha.com,12.48.08, 31 Jan 2011' |
| 2720 | Subscriber list ID | 'Western Kentucky University Caving Club'; 'ChiChiChi Legal Society' |
| 2725 | Subscriber keywords | 'pizza'; 'dancing' |
| 2730 | Subscriber message ID | 'WKUCC14'; 'WKUCC15'; 'CCCLS3'; 'CCCLS4' |
| 2735 | Subscriber advertisment ID | 'Advert1'; 'Advert2' |
| 2740 | Subscriber action trigger ID | keyword 'casavas'; keyword 'STOP WKUCC'; keyword 'STOP CCCLS'; keyword 'wilgo'; keyword 'notgoin' |
| 2745 | Subscriber action ID | connect 270.999.9999; opt out WKUCC; opt out CCCLS; 'http://wkucc.wku.edu/calendar/respond=yes'; 'http://wkucc.wku.edu/calendar/respond=no' |

FIG. 27

2800
GUIDE RECORD

| | Description | Example Content |
|---|---|---|
| 2805 | Guide record ID | 'Guide6' |
| 2810 | Guide channel ID | '270.244.2444'; 'guidebob@chacha.com' |
| 2815 | Guide request ID | '317.555.2204,12.12.08, 30 Jan 2011'; '270.455.3301,12.48.08, 13 Feb 2011' |
| 2820 | Guide rating | 'Expedite - Master'; 'Concierge - Amazin' |
| 2825 | Guide category ID | 'shopping>music>jazz'; 'entertainment>dining'; 'recreation>outdoors'; 'sports>professional>bass fishing' |
| 2830 | Guide keyword ID | 'john coltrane'; 'thelonius monk'; 'vegan'; 'fast food'; 'spelunking'; 'hiking'; 'oregon'; 'utah' |
| 2835 | Guide result ID | 'result1g6'; 'result2g6' |
| 2840 | Guide profile info | 'Geoprofileg6'; 'Demoprofileg6'; 'Persprofileg6' |

FIG. 28

2900
ADVERTISER RECORD

|  | Description | Example Content |
|---|---|---|
| 2905 | Advertiser record ID | 'Advertiser1' |
| 2910 | Advertiser channel ID | '270.331.2224'; 'advertiser1@chamail.com'; 'orders.advertiser1.com' |
| 2915 | Advertiser advertisment ID | 'Advert1'; 'Advert3'; 'Advert5' |
| 2920 | Advertiser category ID | 'recreation>outdoors'; 'sports>equipment'; 'fitness>training' |

FIG. 29

3002
ADVERTISEMENT RECORD TABLE

|  | Description | 3000a Example Content | 3000b Example Content |
|---|---|---|---|
| 3005 | Advertisement record ID | 'Advert1' | 'Advert2' |
| 3010 | Advertisement access info | https://advertiser1.advert1.adserver.com | https://repubs.adtwo.adsrvr2.net |
| 3015 | Advertisement category ID | 'recreation>outdoors' | 'society>politics' |
| 3020 | Advertisement profile ID | 'Profile1' | 'Profile1' |
| 3025 | Advertisement usage information | 'served 1212' | 'served 100' |
| 3030 | Advertisement action trigger ID | keyword = 'casavas' |  |
| 3035 | Advertisement action ID | 'connect to 270.999.9999' |  |
| 3040 | Advertisement advertiser ID | 'Advertiser1' | 'Advertiser2' |

ANCHOR USER RECORD

| | Description | Example Content |
|---|---|---|
| 3105 | Anchor user record ID | 'Anchor2' |
| 3110 | Anchor user channel ID | '212.555.2224'; 'anchor2@chamail.com'; 'anchor2:anchor2pass' |
| 3115 | Anchor user request ID | '212.555.2224,11.25.09, 12 April 2011'; 'anchor2@chamail.com,12.48.08, 16 April 2011' |
| 3120 | Anchor user list ID | 'Western Kentucky University Caving Club'; 'Bowling Green Party' |
| 3125 | Anchor user payment information | 'Mastercard 123456789ABC'; 'PayPal Anchor2' |
| 3130 | Anchor user profile information | 'Geoprofileau2'; 'Demoprofileau2'; 'Persprofileau2' |

SUBSCRIBER MESSAGE RECORD

| | Description | Example Content |
|---|---|---|
| 3205 | Subscriber message record ID | 'WKUCC15' |
| 3210 | Subscriber message access info | 'https://WKUCC15.msgserver.chacha.com' |
| 3215 | Subscriber message target info | 'WKUCC' |
| 3220 | Subscriber message usage info | 'served=60'; 'response=50' |
| 3225 | Subscriber message action trigger ID | keyword = 'wilgo';keyword='notgoin' |
| 3230 | Subscriber message action ID | 'http://wkucc.wku.edu/calendar/respond=yes'; 'http://wkucc.wku.edu/calendar/respond=no' |
| 3235 | Subscriber message anchor ID | 'Anchor2' |
| 3240 | Subscriber message content | 'SMS'; 'IM' |

FIG. 32

3300
REQUEST RECORD

|  | Description | Example Content |
|---|---|---|
| 3305 | Request record ID | '317.555.2204,12.12.08, 30 May 2011' |
| 3310 | Request user ID | 'Subscriber2' |
| 3315 | Request category ID | 'BizDA>Restaurants' |
| 3320 | Request guide ID | 'Guide6' |
| 3325 | Request raw query ID | 'need the number for Greeks Pizza' |
| 3330 | Request keyword ID | 'pizza'; 'number'; 'Greeks Pizza' |
| 3335 | Request succinct query ID | 'Business Directory Assistance: Greeks Pizza: 42104' |
| 3340 | Request result ID | 'Greeks Pizza Ph. 270-555-2222 101W 11th Street Bowling Green KY 42104' |
| 3345 | Request advertismement ID | 'Advert1'; 'Advert2' |

FIG. 33

3400
CATEGORY RECORD

|  | Description | Example Content |
|---|---|---|
| 3405 | Category record ID | 'recreation>outdoors' |
| 3410 | Category advertisement ID | 'Advert3'; 'Advert1'; 'Advert6' |
| 3415 | Category advertisement rating | 'B-'; 'A'; 'B' |
| 3420 | Category keyword ID | 'spelunking'; 'caving'; 'camping'; 'scuba gear' |
| 3425 | Category related category ID | 'shopping>camping'; 'travel>camping' |
| 3430 | Category resource ID | 'rangerslist.com'; 'survivalist.org'; 'northwoods.net' |
| 3435 | Category resource rating | '9'; '8'; '5' |
| 3440 | Category guide ID | 'Guide6'; 'Bob Smith'; 'Dave Green' |
| 3445 | Category guide rating | 'Master'; 'Apprentice'; 'Pro' |

FIG. 34

3500
PROFILE RECORD

|  | Description | Example Content |
|---|---|---|
| 3505 | Profile record ID | 'Profile1' |
| 3510 | Profile demographic information | '18to25yearsolds' |
| 3515 | Profile geographic information | 'Zip 42104'; 'Zip 40220, 40205' |
| 3520 | Profile personality information | 'nature lover'; 'republican' |
| 3525 | Profile user ID | 'WKUCC members'; 'Anchor2'; 'BBRV' |
| 3530 | Profile user rating | '80%'; '100%'; '20%' |

FIG. 35

3600
SUBSCRIPTION LIST RECORD

|  | Description | Example Content |
|---|---|---|
| 3605 | Subscription list record ID | 'WKUCC'; 'Western Kentucky University Caving Club' |
| 3610 | Subscription list anchor ID | 'Anchor2' |
| 3615 | Subscription list message ID | 'WKUCC1'; 'WKUCC2' |
| 3620 | Subscription list registration message | 'WKUCC invite'; 'WKUCC welcome'; 'WKUCC optout' |
| 3625 | Subscription list user ID | 'Subscriber2'; 'Subscriber4'; 'Subscriber9'; 'Subscriber10' |
| 3630 | Subscription list keyword ID | 'caving'; 'spelunking'; 'western kentucky university'; 'bowling green'; 'diving'; 'adventure'; 'outdoors' |
| 3635 | Subscription list demographic | 'college student'; '18to25yearolds'; 'GPA 2.5' |
| 3640 | Subscription list geographic | 'Bowling Green'; 'Warren County'; 'Kentucky' |
| 3645 | Subscription list personality | 'curious'; 'nature lover'; 'confident' |

FIG. 36

REQUEST RECORD TABLE
5002

| | Description | Example Content 5000a | Example Content 5000b | Example Content 5000c |
|---|---|---|---|---|
| 5005 | Request ID | 'Request1' | 'Request2' | 'Request3' |
| 5010 | Request type | Search - category1 | Expedite - timed | Frivolous - automate |
| 5015 | Request guide ID | 'Guide1' | 'Expeditor1' | auto sexy |
| 5020 | Request user ID | 'User1' | 'User1' | 'User2' |
| 5025 | Request input | 'What is the first law of robotics?' | 'How many moons does the planet Saturn have?' | 'what are you wearing?' |
| 5030 | Request output | 'A robot may not injure a human being, or, through inaction, allow a human being to come to harm.' | 'Reuse - saturn has 60 detected moons per the Cassini orbiter team.' saturn.jpl.nasa.gov | 'I like to wear something sexy this time of night. Ski boots are my favorite.' |
| 5035 | Request quality | OK | OK | OK |
| 5040 | Request time information | Start - 11.33A 11-Nov-09<br>End - 11.34A 11-Nov-09 | Start - 11.55A 11-Nov-09<br>End - 11.57A 11-Nov-09 | Start - 2.55A 12-Nov-09<br>End - 2.57A 12-Nov-09 |

FIG. 50

USER RECORD TABLE
5102

| | Description | 5100a<br>Example Content | 5100b<br>Example Content |
|---|---|---|---|
| 5105 | User ID | 'User1' | 'User2' |
| 5110 | User request ID | 'Request1';<br>'Request2';<br>'Request7';<br>'Request10' | 'Request3';<br>'Request11';<br>'Request12' |
| 5115 | User request type | search - category1;<br>expedite - timed;<br>system reuse;<br>biz DA | frivolous - automate;<br>frivolous - distribute;<br>search - category2 |
| 5120 | User communication information | 317.222.2242;<br>user1@chacha.com | 'AIMUser2';<br>888.888.2242 |
| 5125 | User profile | Male, DOB 06081995, zip 40333 | Female, DOB 12241945, zip 10019 |
| 5130 | User conversation election | No | Yes - type A |

FIG. 51

GUIDE RECORD TABLE
5202

| | Description | Example Content 5200a | Example Content 5200b |
|---|---|---|---|
| 5205 | Guide ID | 'Guide1' | 'Expediter1' |
| 5210 | Guide request ID | 'Request1'; 'Request201'; 'RequestA22' | 'Request2'; 'Request24'; 'Request102' |
| 5215 | Guide request type | 'Category1'; 'Category2'; 'Search timed'; 'Search untimed' | 'Expedite timed'; 'Expedite untimed'; 'transcribe' |
| 5220 | Guide rating | 0.9; 0.7; 0.95; 0.7 | 0.95; 0.62; 0.88 |
| 5225 | Guide communication information | Guidecomtyp1='guide1'; Guidecomtyp2='guide1@chacha.com'; Guidecomtyp3='555.924.2242'; | Guidecomtyp1='exp1'; Guidecomtyp2='exp1@chacha.com'; Guidecomtyp3='twitter:exp1'; Guidecomtyp4='515.924.2242'; |
| 5230 | Guide payment info | 'Guide1 account bankA' | 'Expediter1 account PayPal' |

FIG. 52

RESPONDER RECORD TABLE
5302

| | Description | Example Content | Example Content |
|---|---|---|---|
| | | 5300a | 5300b |
| 5305 | Responder ID | 'Autochat1' | 'humanchatter1' |
| 5310 | Responder request ID | 'Request3'; 'Request29'; 'RequestB22' | 'Request11'; 'Request100'; 'RequestC22' |
| 5315 | Responder request type | 'Sports'; 'Dating'; 'Sex'; 'Offensive' | 'Sports'; 'Occult'; 'Aliens' |
| 5320 | Responder rating | 0.9; 0.7; 0.95; 0.7 | 0.95; 0.62; 0.88 |
| 5325 | Responder communication information | https://autochat1.chacha.com | https://randomtexts4u.com/sendit |
| 5330 | Responder profile | Model GerryV2.7.22 | usersofrandomtexts.com |

FIG. 53

METHOD AND SYSTEM OF PROVIDING VERIFIED CONTENT

CROSS-REFERENCE TO RELATED APPLICATIONS

This disclosure is related to and claims the benefit of U.S. Provisional Patent Application Ser. No. 61/354,767, inventor Scott A. Jones, entitled "METHOD AND SYSTEM OF TARGETING ADVERTISEMENTS", filed Jun. 15, 2010, U.S. Provisional Patent Application Ser. No. 61/363,518, inventor Scott A. Jones, entitled "METHOD AND SYSTEM OF PROVIDING VERIFIED CONTENT", filed Jul. 12, 2010, and U.S. Provisional Patent Application Ser. No. 61/359,254, inventor Chris Navta, et. al., entitled "METHOD AND SYSTEM OF PROCESSING FRIVOLOUS QUERIES", filed Jun. 28, 2010, the contents of which are incorporated herein by reference in their entirety.

BACKGROUND

1. Field of the Invention

The present invention is related to providing a response to a request for information, more specifically providing a response to a request using resources, and human assistants associated with a target of the request.

2. Description of the Related Art

In a system which produces work for publication, it is common practice that a Wiki is established wherein users may contribute information regarding a topic, a person, a business, etc. For example, user reviews might be contributed, or wiki pages might be created and maintained, etc. Sites such as Wikipedia®, FreeBase® and others provide information to users in a full-text indexed form.

Social media sites such as MySpace®, Facebook® and Twitter™ allow a user to create a web page which includes information regarding the user. Such pages may be helpful to individuals as well as businesses in order to communicate through a social network regarding activities, special events, opinions, etc.

However both types of websites may suffer from some weaknesses. In the case of the wiki sites, content of the wiki is not necessarily accurate as the person posting the information may have a bias, or may simply not be able to obtain relevant or accurate information regarding the topic or subject matter. As such, inaccurate information may be propagated, and might cause confusion, harm, etc. In particular, an individual and/or entity may not be aware that such information is being disseminated, and might desire to make his own voice heard.

Social media websites allow a user to publish any desired information, but many users are not willing or able to create content which may be of interest. For example, a public figure might provide data such as date of birth, place of birth, marital status, etc. But people interested in the person might want to know information such as favorite books, childhood heroes, food preferences, religious views, etc. Current social networks do not allow a user to create and/or publish such information in a usable format. Ad hoc attempts to determine such affiliations by peer-to-peer messaging, etc., have not been able to bridge this gap.

In light of these and other issues, a method and system whereby affiliated content can be created, enhanced, and curated would be greatly appreciated.

SUMMARY

A method and system are provided which create content associated with a registrant or curator of questions and answers associated with the content. A registration indicator, such as a server login ID, or an email address is provided by the registrant. A media file associated with the registrant is indicated. The media file is processed to create items such as answers to questions, advertisements, links to other content, etc., which may be presented. An item is associated with a query. If a query is received from a designated source, the item is presented responsive to the query.

A system is provided which enables a user to create a repository of structured and/or unstructured queries and answers which may be queried using structured and/or natural language queries. The repository or database may be created in various ways. The system may include a user system which may be used to submit queries, an owner system or curator system which may create and access a repository or database of queries, answers, and/or structured data, a search facility which may control storage of information, match queries to answers, and provide information of queries submitted, a searcher system allowing a human assistant to access information of requests, results, resources, etc., and provide a search result, and a database storing information associated with users, owners, queries, answers, searchers, resources, communications, and process activities.

The system allows a business or entity to establish a repository of information which is curated or managed or guarded by the business or 'owner'. Data in a repository may be presented in various ways. For example, a web page might present various aspects of a repository, which might include a query facility whereby a user might submit a query which would preferentially be answered using information indicated in the repository. Because the information in the repository is guarded, responses may be verified by the owner. In at least one embodiment, information in the repository may be made accessible using a query and response model. In such an instance, a query may be matched automatically and/or using a human assistant or 'guide' or human searcher. A person may be an owner of a repository.

Additional aspects and/or advantages will be set forth in part in the description which follows and, in part, will be apparent from the description or may be learned by practice of the invention. These together with other aspects and advantages, which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the disclosure will become apparent and more readily appreciated from the following description of the embodiments, taken in conjunction with the accompanying drawings, of which:

FIG. 1 is a block diagram of an exemplary system embodiment.

FIG. 2 illustrates a database for requests.

FIG. 3 illustrates a database for users.

FIG. 4 illustrates a database for guides.

FIG. 5 illustrates a database for curators.

FIG. 6 illustrates a database for dialogues.

FIG. 7 illustrates a database for a conversation.

FIG. 8 illustrates a database for a structured dialogue.

FIG. 22 illustrates a GUI for performing a search request using curated content.

FIG. 27 illustrates a database for a subscriber.

FIG. 28 illustrates a database for a guide.

FIG. 29 illustrates a database for an advertiser.

FIG. 30 illustrates a database for advertisements.

FIG. 31 illustrates a database for an anchor user.

FIG. 32 illustrates a database for a subscriber message.

FIG. 33 illustrates a database for a request.

FIG. 34 illustrates a database for a category.

FIG. 35 illustrates a database for a profile.

FIG. 36 illustrates a database for a subscription group.

FIG. 50 illustrates a database for requests.

FIG. 51 illustrates a database for users.

FIG. 52 illustrates a database for guides.

FIG. 53 illustrates a database for responders to frivolous requests.

DETAILED DESCRIPTION OF THE PREFERRED EMBODIMENTS

Figure 9:
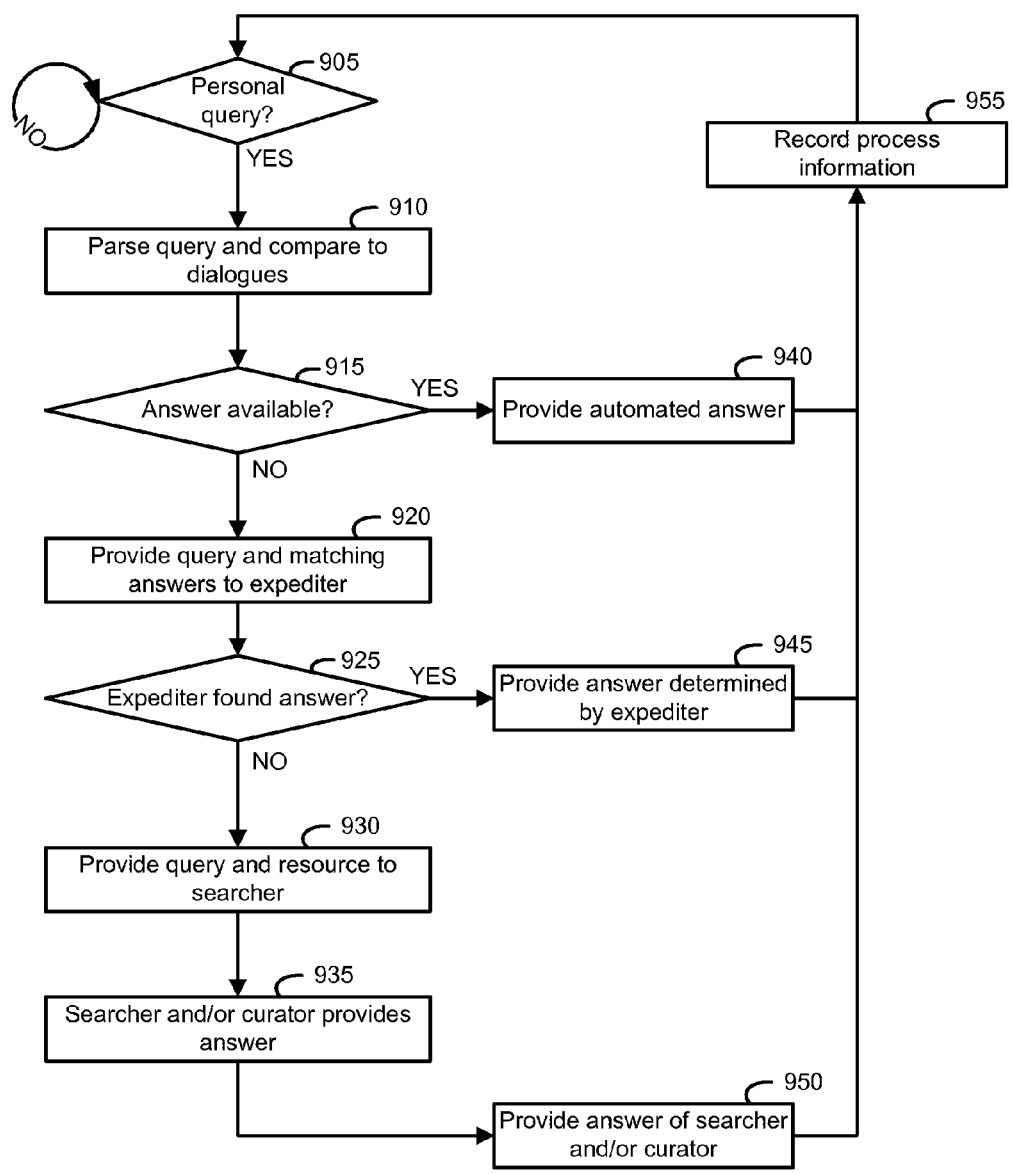
FIG. 9 is a flowchart of processing a request.

Reference will now be made in detail to the present embodiments discussed herein. Examples are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein, words importing the singular shall include the plural and vice versa unless specifically counter indicated.

A system is provided for responding to requests from users. A user device may originate a request or query, which is provided to a search system which may include a server and a database. A search system may process a user request to determine whether an automated response may be provided. If an automated response is available, the response which may include an advertisement may be provided to a user device. If an automated response may not be provided, a search system may send information of a request to a human searcher or 'guide' operating a guide system. A human searcher may determine whether an automated and/or historical response may be provided and/or may perform a search responsive to a request.

A peer-to-peer query and answer system is provided. A user operating a user system may locate another user and may deliver a question or 'dialogue' to the other user. A response by the receiving user may be recorded as part of a dialogue. A dialogue may be sent to any number of users. A group of dialogues or 'conversation' may be created by any system connected to a network. A conversation may be used to obtain profile information regarding a user. A conversation may be provided to gather information for any purpose. A user may elect to remain anonymous when a dialogue is delivered and/or may provide identifying information to the recipients. A dialogue may be created from structured data, which may be referred to as a 'structured dialogue'. A structured dialogue may be compared to a request in order to determine whether an automated response is to be provided. A structured dialogue may include an answer created and/or approved by a curator associated with the query.

In at least one embodiment, a user, who may be an owner, may be asked a series of interview style questions such as James Lipton's "Proust Questionnaire". Responses may be stored in a personal database, and may be published to users in response to a matching of a user question to the query, or as a web page which might be provided in a browser. Questionnaires or conversations might be produced in various ways. For example, an interview might be based on a particular topic such as sports, politics, religion, etc. In at least one embodiment, questionnaires may be sent to a group with a notification, and may be used to provide anonymous information regarding opinions of a group of users. For example, a user might find out a percentage of a group of friends who favor a particular sports team, etc. In at least one embodiment, a stored user response may be indexed, and provided responsive to a query matching the stored response. This may reduce the need for a person to respond to a previously answered question.

In at least one embodiment, a personal web page and/or repository may be hosted by a search service. In a search system embodiment, a user may request to view any or all queries which may meet a filtering criterion. For example, a celebrity might elect to view questions relating to the name of the celebrity, or a business might elect to view questions including the name of the business, products associated with a business, competitors, etc. Using this capability, a person or entity might elect to provide a response to a query which has been selected by a criterion. A result provided by an owner responsive to a query might be identified as to the source of the response. A user submitting a query may be made aware of a source of a response, which might influence credibility of the answer. In a search system embodiment, a database associated with a person may be used to determine a profile of the person. A profile may not be visible to other users and/or may have selective privacy controls.

A database or repository of information associated with an owner may include structured information which may be used to respond to user queries automatically. For example, a dialog may use a mapping of a response to the dialog to a number of question equivalent templates which may be compared to a user query. This may improve a probability that a response by a business or entity and/or individual may be reused. In at least one embodiment, a query which has been associated with a curator may be preferentially answered using information provided by the curator. An expediter or intermediary guide who may be designated by an entity and/or individual may be permitted to access a curated repository associated with the entity or individual. An intermediary or ambassador or expediter guide may be able to respond to queries using stored answers from the repository supervised by an owner or curator. An owner may be able to review activities of an expediter. Use of an expediter may allow a more uniform response without the need for an intermediary to perform a search, or create a response on behalf of the owner. An owner may receive information of queries directed to the owner for which an intermediary was unable to locate or provide a response. An owner may elect to create a response to any number of the queries for which a response was not located. Responses created, selected, formulated, or otherwise determined by an owner may be stored in a database associated with the owner. A mapping process, which may be guided by an owner or custodian assigned to a repository, may be provided to allow optimization of reuse of a response associated with an answered query.

In at least one embodiment, a web page associated with an individual or entity is provided which may include a facility for submitting a request directed to the individual or entity or "affiliated request". An affiliated request may be processed preferentially using resources and/or guides associated with an owner of the facility associated with the affiliated request. In at least one embodiment, an affiliate request may be identified with an IM credential, a short code, a keyword, a phone number, and/or other identifier, which may designate a curator to which the affiliate request is directed.

As used herein, a "request" means a request for information, products, and/or services. A request, or search request, or query may, include various types of media and may be provided by any user system which may establish communication with a server and/or other devices associated with a search service.

A "user" is a person who submits a request and may receive any type of information responsive to a request. A user may be any person and/or entity which may request information, provide information, and may provide compensation to an operator of an information exchange or search system.

An "advertiser" is any person and/or entity which may provide promotional information or "advertisements" to be delivered to a user. An advertisement may take various forms and/or may include media of any sort which can be delivered to a user device. A "result", "response", "answer" or "search result" is any information which has been determined to be a response to a request. A result may include an advertisement.

A "resource" is any system, person, entity, and/or other source of information. A resource may be used to provide a response, and may be accessible to a user, and/or guide on a selective basis. In at least one embodiment, a curator may select and/or control a resource such as a search engine, database, software program, or person.

A "guide", or human searcher, or searcher, or human assistant is a person and/or entity which may perform a search for information. A guide may perform various requests in various roles. A guide who processes a query which may be transferred to another guide may be referred to as an "expediter" or "ambassador" guide. A guide who receives a query and performs a search for the query may be referred to as a "specialist" or "generalist" or "searcher". A specialist may perform a search using resources associated with an area of specialization selected by the guide. A generalist may perform a search responsive to a query which is not specific to a particular area of expertise. An expediter is a guide who performs a search with a limited scope, span, capacity and/or extent. For example, an expediter may perform a search which is constrained to a limited search space, a limited time interval, a restricted set of responses, etc. Processing by an expediter may assist others to obtain a search result.

The terms voice and speech are used interchangeably herein. A user, a worker, and/or a search system may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail, and/or any other type of communication. A connection or communication session may be established using any device which is capable of utilizing a communication service. For example, a wireless device such as a cell phone, PDA, smart phone, tablet computer, etc., might be used to establish a communication session using voice, SMS, MMS, IM, email and/or internet protocols. A tablet, desktop, laptop or server system might be used to establish a communication session using IM, email, SMS, MMS, etc. A landline phone, a specialized communication terminal, or any other communication device might be used to establish a communication session.

Communication between a user, guide, resource, owner and/or search system may include conversion of text to speech and speech to text. Any type of conversion and/or other processing of information which may facilitate communication between a user, a guide, a resource, an owner and/or a search system may be performed by any elements connected by a suitable communications network. Any type of media which can be sent and/or received using a communication system may be part of a communication session. A communication session may be conducted using any or all communication services associated with a user, a guide, a resource, an owner and/or a search system. Any communication session may include communication via multiple services and/or devices. For example, a request may be submitted as a voice query, which might indicate an image located on a resource accessible to a user. A voice query might be converted to a text message, the image might be processed in order to associate a tag and/or other images with the image, and a response might be provided as a spoken reply to a mobile phone associated with a user, and a video presentation which is accessible via a high-speed connection that might be delivered to a browser functionality of a different user device.

An advertisement may be transmitted, including during any or all communication sessions. A guide, a user, a curator, a resource, and/or a result may be rated. Rating information may be obtained from a user, a guide, a curator and/or an administrator of a search system. Rating information may be used to select a user, a guide, a resource, a curator, a request, a response, a communication service, and/or any item based on information associated with an item indicated in a database. A search service, which may, for example, be a publishing service and/or a request distribution service, may be compensated by advertising revenue. Advertising and/or content may be delivered to a user, curator and/or a guide using any communication service associated with a user, curator, and/or a guide. As used herein an "item" is any person, thing, or quality which may be manipulated based on a record. An item may be an object, person, entity, group, word, category, attribute, file, medium, resource, system, address, etc., which may be represented in a database.

As illustrated in FIG. 1, system 100 includes user systems 105, 110, a network 115 such as the Internet, a search system 130, a database 120, which may comprise various records, guide systems 135, 140, curator systems 145, 150, resource systems 155, 160 and a resource 165.

While only a few systems associated with a user, a guide, a curator, a resource and a search system are depicted in FIG. 1, it is within the scope of the disclosure for multiple systems for a user, a guide, a curator, a resource and a search system to be utilized. In particular it is envisioned that many user, guide, curator, resource and search system systems may be implemented. A search system may be composed of many components as described further herein.

Any user system (e.g. the user system 105) can be used, to submit a request to the search system 130 and/or receive a result and/or other information. Any user system may receive a response, and/or may provide compensation to the search system 130.

The network 115 may be a global public network of networks (the Internet) and/or may consist in whole or in part of one or more private networks and communicatively couples the user systems 105, 110, the guide systems 135, 140, the curator systems 145, 150, and the resource systems 155, 160, with the other components of the system such as the search system 130, and the database 120. The network 115 may include one or more wireless networks which may enable wireless communication between the various elements of the system 100. For example, the search system 130 may receive messages which may be routed via a wireless network controlled by a wireless service provider to the user systems 105, 110. A wireless service provider may receive messages from the guide systems 135, 140, via a wireless network which is a part of the network 115, and provide the messages to the search system 130 via an internet connection which is part of the network 115. Similarly a voice communication via wired and/or wireless communication might be established between any elements of the system 100.

The search system 130 allows interaction to occur among the user systems 105, 110, the guide systems 135, 140, the curator systems 145, 150, and the resource systems 155, 160. For example, a request can be transmitted from the user system 105 to the search system 130, which may provide information obtained from the database 120, which may include an advertisement provided by a curator who is a user (e.g. a user at the curator system 145) to the user system 105. Similarly, a response from a guide operating the guide system 135 might be routed to the search system 130, which might process the response and provide a message to the user system 105. Any type of communication between users, guides, owners, and/or resources may be mediated and/or facilitated by the search system 130 and/or other elements of the system 100.

The search system 130 is communicatively coupled with the database 120. As will be described herein in further detail below, the database 120 includes non-transient data that is processed in association with operation of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100. Any or all elements of the system 100 may include a portion of or the entire database 120.

The user systems 105, 110, the guide systems 135, 140, the curator systems 145, 150, the resource systems 155, 160, and the search system 130 may include equipment, software, systems and personnel required to send and/or receive messages between a user system 105, 110, the guide systems 135, 140, the curator systems 145, 150, the resource systems 155, 160, and/or the search system 130 using the network 115. The database 120 includes information which may allow the search system 130 to establish communication between any or all of the elements of the system 100.

A user system, a guide system, a curator system, a resource system and/or a search system may be a desktop or portable PC or Mac®, a mobile phone, a smart phone, a PDA, a server system, a landline phone, a specialized communication terminal, a terminal connected to a mainframe, or any other suitable communication device and/or system. The search system 130 may include one or more servers, computers, etc. For example, servers such as the PowerEdge® 2900 by Dell, or the BladeCenterJS22 by IBM, or equivalent systems might be used to implement elements of the search system 130. The search system 130 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems or communication devices known in the art may be used as user systems, guide systems, curator systems, resource systems and/or to implement the search system 130.

A curator may be required to register with the search system 130. As part of a registration process, at least one communication method is associated with a curator. In at least one embodiment, a curator may register with the search system 130 and establish a username and password which are associated with the curator. A curator may login to the search system 130 using a web browser functionality of the curator system 150 in order to communicate with the search system 130. Multiple communication services may be associated with a curator and may allow a communication session to be established between a curator system such as the curator system 150 and a user system, a guide system, a resource system and/or the search system 130. Multiple identifiers of a curator may be associated with each other. Information such as IM credentials, an email address, a phone number, a URL, a username, etc., of a curator may be identified, which may allow the search system 130 to establish a communication session between a curator system and a user system, a guide system, a resource system, and/or the search system 130.

When a curator registers with the search system 130, the curator may be associated with one or more keywords, categories, resources, and/or other information. For example a keyword or category may be selected by a curator, or may be associated with a curator based on a conversation or dialogue provided to a curator and/or other information provided during and/or after a registration process. Information associated with a curator may be stored in the database 120 and may be used for purposes such as matching a curator to a user request, determining and/or obtaining compensation of a curator, communicating with a curator, etc., as will be described further herein below. A resource may be associated with a curator. A resource 'Resource 3' 165 may be associated with the curator system 145 and may be accessible only using the curator system 145. A resource which is exclusive to a curator may allow a curator to provide access to the 'Resource 3' resource 165 when a user submits an affiliated request. An affiliation may be any affinity which may be shared by a group. An affiliation may, for example, be political, geographic, topical, etc. A curator may designate a guide to be associated with the curator. For example, should a request associated with a curator require human assistance, the curator might cause the request to be preferentially directed to a designated guide.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of the guide system 140 in order to communicate with the search system 130. Multiple communication services may be associated with a guide and may allow a communication session to be established between a guide system such as the guide system 135 and a user system, a curator system, a resource system and/or the search system 130. Multiple identifiers of a guide may be associated with each other. Information such as IM credentials, an email address, a phone number, a URL, a username, etc., of a guide may be identified which may allow the search system 130 to establish a communication session between a guide system and a user system, a curator system, a resource system and/or the search system 130.

When a guide registers with the search system 130, the guide may be associated with one or more keywords, categories, resources, and/or other information. For example, a keyword and/or category may be selected by a guide or may be associated with a guide based on a conversation or dialogue provided to a guide and/or other information provided during and/or after a registration process. Information associated with a guide may be stored in the database 120 and may be used for purposes such as matching a guide to any item such as a request, search result, etc., determining and/or obtaining compensation of a guide, communicating with a guide, etc., as will be described further herein below.

A resource system may be identified by the search system 130. In at least one embodiment, the search system may identify a resource system based on use of the resource system by a guide. For example, if a guide locates a search result or response using information provided by a resource, the guide may include an identifier such as a Uniform Resource Locator (URL) of the resource used in the search result. In at least one embodiment, a resource system may be identified with a type of information such as advertisements, data regarding a topic, etc. A resource system which may require a particular type of access may be registered with the search system 130 and may be monitored regarding usage, etc. A resource may be associated with a category and/or keyword. For example, if the resource system 155 could provide current weather information, the resource system 155 might be associated with the category 'Weather' and the keywords 'partly-cloudy', 'thunderstorms', 'flood', etc. In at least one embodiment, a curator may designate a resource and may associate the resource with the curator. For example, a curator may designate a resource which is to be searched, provided, excluded, or otherwise utilized for automated and/or human assisted searches.

A user may be identified by the search system 130. When a user system, such as the user system 105, establishes a communication session with the search system 130, an identifier of a user system is determined. An identifier of a user system may be associated with other information regarding a user. A user system may be identified using an email address, a telephone number, an IM credential, a username, and/or any other identifier which may be used to associate information with a user. Multiple identifiers of a user may be associated with each other. Using information of communication services associated with a user, a communication session may be established between a user system such as the user system 105 and a curator system, a guide system, a resource system and/or the search system 130. Information such as a keyword, a category, a user profile, a previous request, a result etc., may be associated with a user. Information of a user may be stored in the database 120.

Records may be maintained in the database 120 which may be used to record the status of various items. Such records may be used to aid the processing of work inputs and production of work outputs. For example, a user may submit a request, which may describe a desired output, and provide access to information and/or materials needed to produce the output. Information indicated in a record may be combined with information in other records, and may be used to produce tables, as further described herein.

As illustrated in FIG. 2, an exemplary request record table 202 is provided. The request table 202 may comprise a number of request records 200 of which one or more may be associated with or resident in the database 120 (FIG. 1). The request record table 202 may include information of requests which may be distributed. The request records 200 may include a request ID field 205, a request type field 210, a request destination field 215, a request time value field 220, a request guide ID field 225, a request user ID field 230, a request input field 235, a request output field 240, a request resource ID field 245, and a request time information field 250.

The request ID field 205 includes an identifier of a request which is preferably unique and is preferably used consistently. A request ID serves to distinguish a request record associated with a request from a request record associated with other requests. Any number of characters, numbers, and/or other indicators may be used to indicate a request ID. In at least one embodiment, a user ID associated with a request is included in the request ID field 205. In at least one embodiment, a random number is indicated in the request ID field 205. Using the example in FIG. 2, 'Request1.1' is the request ID associated with the request record 200a.

The request type field 210 may include information of a type associated with a request. Information indicated in the request type field 210 may be used to assist in processing of a request. For example, a type associated with a request may be used to rank guides who may be associated with the type of request. Likewise, a type associated with a request may be used to select a user to receive a request. A type associated with a request may determine a resource employed in processing the request. Any request type which may be processed by the search system 130 (FIG. 1) may be indicated in the request type field 210. Using the example in FIG. 2, 'Request3.4' may be of type 'Search curated' as indicated in the request record 200c. This may indicate that a request is to receive a response associated with curated content, and/or that a guide associated with the curator as indicated in the request may respond to the request. Request types may be associated with various properties. For example, a category, a keyword, and/or other information associated with a request may be used to select a person to receive the request.

The request destination field 215 may include information of an affiliate to which a request has been directed. Information indicated in the request destination field 215 may be used to determine a delivery destination for a request, resources to be used to respond to the request, etc. Using the example in FIG. 2, 'Request1.2' is selected to be provided to 'Followers' as indicated in the request record 200b. This may indicate that users following 'User1' as indicated in the request user ID field 230 may be provided with a dialogue indicated in 'Request1.2'.

The request time value field 220 may include information of a time value associated with a request. Information indicated in the request time value field 220 may be assigned by a user originating a request. Content of the request time value field 220 may be used to determine when a request expires. For example, if a user sends a dialogue to a plurality of persons, if no response is received within a time period specified, the dialogue may be removed from pending status for persons who have not responded. Using the example in FIG. 2, 'Request1.1' and 'Request3.4' are 'Immediate' which may indicate that the request is to receive an immediate response, while 'Request1.2' is set to 'Expire three days'. Any type of time information may be indicated in the request time value field 220.

The request guide ID field 225 may include information of a number of guides associated with a request. Content of the request guide ID field 225 may be used to obtain information of a guide using a record such as the guide record 400a (FIG. 4). If a guide is selected to respond to a request, elects to respond to a request, and/or completes a request, an identifier of the guide may be indicated in the request guide ID field 225. Using the example in FIG. 2, 'Expediter1' is associated with 'Request1.2'. This may indicate that a dialogue associated with 'Request1.2' has been reviewed by 'Expediter1'.

The request user ID field 230 may include information of a number of users associated with a request. Content of the request user ID field 230 may be used to obtain information of a user associated with a request. For example if a user submits a request, an identifier of the user may be indicated in the request user ID field 230. Using the example in FIG. 2 'User1' is associated with 'Request1.1' and 'Request1.2' as indicated in the request records 200a and 200b. This may indicate that 'User1' originated 'Request1.1' and 'Request1.2'.

The request input field 235 may include information of a request. Content of the request input field 235 may be provided to a person who accepts a request. Content of the request input field 235 may include any type of information. For example, a pointer to audio, video, text, and/or other media may be indicated in the request input field 235. As illustrated in FIG. 2, the query 'What is the first law of robotics?' is the request input associated with 'Request1.1'. In at least one embodiment, the request input field 235 may indicate an original user request, a categorization, and a rewritten user request.

The request output field 240 may include information of a response associated with a request. Content of the request output field 240 may be provided to a user responsive to a request. Content of the request output field 240 may be stored in the database 120 (FIG. 1). Content of the request output field 240 may be reviewed by a user, a guide, and/or an administrator. As illustrated in FIG. 2, the response 'A robot may not injure a human being, or, through inaction, allow a human being to come to harm.' is associated with 'Request1.1'. While a text response to a query is used for the purposes of illustration, any type of media may be indicated in the request output field 240. In at least one embodiment, a text response and a URL associated with a source of the text response may be indicated in the request output field 240. In at least one embodiment, an indicator of a response and a responder may be included in the request output field 240. As illustrated in FIG. 2, the request record 200b includes responses to 'Request1.2' by 'Amy', 'Bob' and 'Jay' who may be members of the 'Followers' group associated with 'User1'.

The request resource ID field 245 may include information of a resource associated with a request. Content of the request resource ID field 245 may indicate a resource which may provide a response to a request. For example, if a guide utilizes a resource to respond to a request, an indicator of the resource may be included in the request resource ID field 245. A resource to which a request is directed may be indicated in the request resource ID field 245. For example, a web site on which a request is to be posted may be indicated, or a database that is to be used by an expediter may be indicated. Using the example in FIG. 2, 'Request1.2' may receive responses from 'chacha.me'.

The request time information field 250 may include information of time associated with a request. Content of the request time information field 250 may be used for various purposes. For example, a time at which a query was posted and completed may affect compensation of a guide. A curator may review queries based on a ranking or sorting associated with a time stamp, duration, etc.

As illustrated in FIG. 3 an exemplary user record table 302 is provided. The user record table 302 may comprise a number of user records 300 of which one or more may be associated with or resident in the database 120 (FIG. 1). The user records 300 may include a user ID field 305, a user request ID field 310, a user communication information field 315, a user profile ID field 320, and a user dialogue ID field 325.

The user ID field 305 includes an identifier of a user which is preferably unique and is preferably used consistently. A user ID serves to distinguish a user record associated with a user from a user record associated with other users. Any number of characters, numbers, and/or other indicators may be used to indicate a user ID. In at least one embodiment, a random number is indicated in the user ID field 305. Using the example in FIG. 3, 'User1' is the user ID associated with the user record 300a.

The user request ID field 310 may include information of a number of requests associated with a user. A user request ID may be for example a pointer to a request record associated with a request submitted by a user. If a user submits a request to the search system 130, a request ID may be added to the user request ID field 310. Using the example illustrated in FIG. 3, 'Request2.1' and 'Request2.2' are associated with 'User2' as indicated in the user record 300b. This may indicate that 'User2' has submitted 'Request2.1' and 'Request2.2'.

The user communication information field 315 may include information of a number of communication services associated with a user. Any information which may be used to establish communication with a user may be indicated in the user communication information field 315. For example, a telephone number, an email address, an IM credential, a URL, a username, a password, and/or other communication information may be indicated in the user communication information field 315. Using the example in FIG. 3, the phone number '317.222.2242' the email 'user1@chacha.com', and the login 'User1 chacha.me passU1' are associated with 'User1'.

The user profile ID field 320 may include information of a profile associated with a user. For example, demographic, geographic, affiliation, personality, and/or other types of information may be associated with a user. A user may provide profile information as part of a registration process. User profile information may be obtained from a database provided by a third party. User profile information may be determined based on test, polling, query history, peer review, and/or other information associated with a user. Using the example illustrated in FIG. 3, 'DemoprofileU2', 'GeoprofileU2', and 'PersprofileU2' are associated with 'User2'. A profile associated with a user may be used to select information to be provided to the user.

The user dialogue ID field 325 may include information of a number of dialogues associated with a user. For example, if a user has responded to a dialogue, an identifier of the dialogue may be indicated in the user dialogue ID field 325. A dialogue identifier may be for example a pointer to a dialogue record as further described with respect to FIG. 6.

As illustrated in FIG. 4 an exemplary guide record table 402 which may comprise a number of guide records 400 of which one or more may be associated with or resident in the database 120 (FIG. 1) is provided. The guide record table 402 (FIG. 4) may include information of guides. The guide records 400 may include a guide ID field 405, a guide request ID field 410, a guide request type field 415, a guide rating field 420, a guide communication information field 425, and a guide curator ID field 430.

The guide ID field 405 includes an identifier of a guide which is preferably unique and is preferably used consistently. A guide ID serves to distinguish a guide record associated with a guide from a guide record associated with other guides. Any number of characters, numbers, and/or other indicators may be used to indicate a guide ID. In at least one embodiment, a random number is indicated in the guide ID field 405. In at least one embodiment, a pseudonym selected by a guide may be indicated in the guide ID field 405. Using the example in FIG. 4, 'Guide2' is the guide ID associated with the guide record 400*a*.

The guide request ID field 410 may include information of a number of requests associated with a guide. Content of the guide request ID field 410 may be used to obtain information of a request. For example, if a guide is selected to respond to a request, an identifier of the request may be indicated in the guide request ID field 410. Using the example in FIG. 4, 'Request1.2', 'Request2.2' and 'Request2.5' are associated with 'Expediter1' as indicated in the guide record 400*b*. This may indicate that 'Expediter1' has performed 'Request1.2', 'Request2.2' and 'Request2.5'.

The guide request type field 415 may include information of a number of types of requests which may be performed by a guide. For example, a category and/or keyword associated with a request, a type of request, temporal information associated with a request, etc., which may be used to determine if a guide is to be presented with a request may be indicated in the guide request type field 415. In at least one embodiment, a guide may be assigned to a type of request as part of a registration process. A guide may select a type of request which the guide may perform. A guide may be required to pass a test in order to be associated with a type of request. Using the example in FIG. 4, 'Specialist2' is associated with 'Category2' and 'Search untimed', which may for example indicate that 'Specialist2' may be presented with and/or select requests associated with an untimed search for information associated with 'Category2'.

The guide rating field 420 may include information of a number of ratings associated with a guide. For example, quality, speed, peer review, etc., may be used to determine a rating of a guide. A rating of a guide may be used for purposes such as determining compensation for the guide (e.g. bonus points), selecting a guide to respond to a request, matching a request to a guide, etc. In at least one embodiment, the guide request types field 415 and the guide rating field 420 may be linked by, for example, a pointer. Using the example in FIG. 4, 'Expediter1' has a rating of '0.95' associated with 'Expedite timed', which may be used to rank 'Expediter1' versus other guides associated with the request type 'Expedite timed'.

The guide communication information field 425 may include information of a number of communication services associated with a guide. For example, a user name and password, an email address, an IM credential, a phone number, a web page, a physical address, etc., may be indicated in the guide communication information field 425. Using the example illustrated in FIG. 4, 'Guide2' is associated with the login ID 'guide2', the email 'guide2@chacha.com', the twitter ID 'twitterguide2' and the phone number '555.924.2242'. This may indicated that 'Guide2' may be contacted using the associated communication services.

The guide curator ID field 430 may include information of a curator associated with a guide. For example, a curator may select and/or qualify a guide to perform an activity associated with an affiliated request of the curator. As illustrated in the guide record 400*c* 'Specialist2' is not associated with a curator. This may indicate that 'Specialist2' may not respond to a request directed to curated content. Similarly, 'Guide2' and 'Expediter2' might respond to a request associated with 'Curator2'.

As illustrated in FIG. 5 an exemplary curator record table 502 is provided. The curator record table 502 may comprise a number of curator records 500 of which one or more may be associated with or resident in the database 120 (FIG. 1). The curator record table 502 (FIG. 5) may include information of curators. The curator records 500 may include a curator ID field 505, a curator category ID field 510, a curator keyword ID field 515, a curator resource ID field 520, a curator communication information field 525, a curator dialogue ID field 530, a curator guide ID field 535 and a curator guide rating field 540.

The curator ID field 505 includes an identifier of a curator which is preferably unique and is preferably used consistently. A curator ID serves to distinguish a curator record associated with a curator from a curator record associated with other curators. Any number of characters, numbers, and/or other indicators may be used to indicate a curator ID. In at least one embodiment, a random number is indicated in the curator ID field 505. In at least one embodiment, a pseudonym selected by a curator may be indicated in the curator ID field 505. Using the example in FIG. 5, 'David Guetta' is the curator ID associated with the curator record 500*a*.

The curator category ID field 510 may include information of a number of categories associated with a curator. Content of the curator category ID field 510 may be determined based on actions of a curator. A curator may select a category associated with the curator, may indicate content which is used to associate a category with the curator, and/or may participate in activities which may cause a category to be associated with the curator. A category associated with a curator may be used to select items which may be provided to the curator. For example, if a curator determines that a guide may respond to queries associated with the curator, information of guides associated with the categories indicated in the curator category ID field 510 may be provided to the curator to select a suitable guide for responding to the queries. A category associated with a curator may be used to select curated content which may be provided responsive to a request. Using the example illustrated in FIG. 5 the categories 'Dining', 'Restaurants' and 'Thailand' are associated with 'Sawasdee Indianapolis' as indicated in the curator record 500b.

The curator keyword ID field 515 may indicate information of a number of keywords associated with a curator. Content of the curator keyword ID field 515 may be determined based in actions of a curator. For example, a registration process may include a conversation or dialogue, a set of resources indicated by a curator may be analyzed, responses and/or requests of a curator may be analyzed using techniques such as word frequency, etc., to associate a keyword with a curator. Using the example illustrated in FIG. 5, the keywords 'One Love', 'Pop Life' and 'Guetta Blaster' are associated with the curator ID 'David Guetta'.

The curator resource ID field 520 may include information of a number of resources associated with a curator. For example, a curator may designate content which is to be used for responding to queries, a curator may be provided with a ranked list of resources which may be selected, a curator may approve a list of resources used by guides and/or provided by a system administrator, and/or other suitable methods may be employed to associate resources with a curator. Using the example in FIG. 5 the website 'http://www.sawasdeeindy.com' is a resource associated with 'Sawasdee Indianapolis'

The curator communication information field 525 may include information of a number of communication services associated with a curator. For example, a user name and password, an email address, an IM credential, a phone number, a web page, a physical address, etc., may be indicated in the curator communication information field 525. Using the example illustrated in FIG. 5, 'David Guetta' is associated with the login ID 'DavidG', the email 'DavidGuetta@mailme.fr', the twitter ID 'http://twitter.com/davidguetta'. This may indicate that the curator ID 'David Guetta' may be contacted using the associated communication services.

The curator dialogue ID field 530 may include information of a number of dialogues associated with a curator. As further described herein a dialogue may include a question and a response. If a curator has ownership of a dialogue, an identifier of the dialogue may be indicated in the curator dialogue ID field 530. For example, if a curator creates a query and answer pair which may be reused, an identifier of the dialogue may be indicated in the curator dialogue ID field 530. A dialogue associated with a curator may be created from a response to a query from a user which may be associated with the curator for purposes of reuse. Using the example in FIG. 5, the dialogues 'DialogueDG1' and 'DialogueDG2' are associated with the curator ID 'David Guetta'.

The curator guide ID field 535 may include information of a number of guides associated with a curator. Content of the curator guide ID field 535 may be modified based on actions of a person. For example, an administrator, a curator, a guide and/or a user may take actions which may cause a guide to be associated with a curator. A curator may select a guide to be associated with the curator. A guide may participate in an activity such as a dialogue, a test, a game, etc. which may cause a guide to be associated with a curator. An administrator may select a guide to be associated with a curator based on items such as a rating, a keyword, a category, a profile, an affiliation, etc., associated with the guide. A user rating may affect whether a guide is associated with a curator. For example, users might be provided with responses such as search results of a guide relating to curated content which might be used to determine whether the guide is to be associated with a curator. Using the example in FIG. 5, the guides 'Expediter2', 'Expediter7', 'Specialist3', and 'Generalist4' are associated with the curator ID 'Sawasdee Indianapolis'.

The curator guide rating field 540 may include information of a rating associated with a guide. Content of the curator guide rating field 540 may be used to rank a guide. For example, a guide with a higher rating may have a higher ranking for responding to queries directed to a curator and/or content, resources, media, etc., associated with and/or provided by a curator. In at least one embodiment, the curator guide ID field 535 and the curator guide rating field 540 may be linked by, for example, a pointer. Using the example in FIG. 5, 'Expediter2' has a rating of '0.9' and 'Expediter7' has a rating of '0.4' associated with 'Sawasdee Indianapolis'. This may indicate that if an expediter is needed to respond to a query directed to 'Sawasdee Indianapolis' 'Expediter2' may be more likely to be chosen to respond to the query. Content of the curator guide rating field 540 may be determined in various ways. In at least one embodiment, a curator may review responses by a guide associated with the curator to determine a rating of the guide. A rating associated with a guide may affect compensation for the guide.

As illustrated in FIG. 6 an exemplary dialogue record table 602 is provided. The dialogue record table 602 may comprise a number of dialogue records 600 of which one or more may be associated with or resident in the database 120 (FIG. 1). The dialogue record table 602 (FIG. 6) may include information of dialogues. The dialogue records 600 may include a dialogue ID field 605, a dialogue description field 610, a dialogue access information field 615, a dialogue user ID field 620, a dialogue answer ID field 625, a dialogue responder ID field 630, and a dialogue curator ID field 635.

The dialogue ID field 605 includes an identifier of a dialogue which is preferably unique and is preferably used consistently. A dialogue ID serves to distinguish a dialogue record associated with a dialogue from a dialogue record associated with other dialogues. Any number of characters, numbers, and/or other indicators may be used to indicate a dialogue ID. In at least one embodiment, a random number is indicated in the dialogue ID field 605. In at least one embodiment, a pseudonym selected by a curator may be indicated in the dialogue ID field 605. Using the example in FIG. 6, 'DialogueSWD2' is the dialogue ID associated with the dialogue record 600a.

The dialogue description field 610 may include descriptive information of a dialogue. Content of the dialogue description field 610 may be used for various purposes. In at least one embodiment, text of a query associated with a dialogue may be indicated in the dialogue description field 610. In at least one embodiment, a query submitted to a curator may be included in the dialogue description field 610. Using the example in FIG. 6 'Do you like working with new artists?' is the dialogue description associated with 'DialogueDG12' as indicated in the dialogue record 600b.

The dialogue access information field 615 may include information regarding how information of a dialogue may be accessed. Content of the dialogue access information field 615 may be modified based on actions of a curator. For example, a curator may indicate a location where a dialogue may be obtained from a server or system in a similar manner that an advertisement server may be employed for delivering advertisements when requested. Using the example in FIG. 6, the URL <<http://dialogueswd2.chacha.com>> is the dialogue access information associated with 'DialogueSWD2'.

The dialogue user ID field 620 may include information of a number of users who have been provided with a dialogue. Content of the dialogue user ID field 620 may include for example a pointer to a user record such as the user record 300*a* (FIG. 3), and/or may be a pointer to a group of users who may or may not be anonymous to a curator sending the dialogue. Using the example in FIG. 6, the users 'Sawasdee1' and 'Swasdee2' and the group 'Sawasdeechachees' are associated with the dialogue 'DialogueSWD2' which may indicate that 'Sawasdeelndy' has requested to send 'DialogueSWD2' to the users indicated in the dialogue user ID field 620.

The dialog answer ID field 625 may include information of a number of answers corresponding to a dialogue. Content of the dialogue answer ID field 625 may indicate a response associated with a dialogue. For example, a response created by a curator may be indicated in the dialogue answer ID field 625. Likewise, if a user responds to a dialogue, an indicator of an answer provided by the user may be added to the dialogue answer ID field 625. Using the example in FIG. 6, the answer 'DDG12A1' is associated with the dialogue 'DialogueDG12' which may indicate that a curator has provided the answer 'DDG12A1'.

The dialogue responder ID field 630 may include information of a number of persons responding to a dialogue. Content of the dialogue responder ID field 630 may be modified based on actions of a person responding to a dialogue. For example if a member of a distribution group responds to a dialogue, an identifier of the member may be indicated in the dialogue responder ID field 630. Using the example in FIG. 6 the dialogue user ID field 620 and the dialog responder ID field 630 of the dialogue 'DialogueDG12' are blank, which may indicate that no users have been provided with 'DialogueDG12'.

The dialog curator ID field 635 may include information of a curator associated with a dialogue. In at least one embodiment, a curator may control all content of a dialogue. In at least one embodiment, a curator may control a query associated with a dialogue, and may have access to responses associated with the dialogue. A curator may have access to any or all of the content of a dialogue record. Using the example illustrated in FIG. 6, 'David Guetta' is the curator ID associated with the dialogue 'DialogueDG12'.

As previously discussed, a conversation may a group of dialogues which may be provided to a user. A dialogue may take various forms. For example, a conversation might be a sequence of questions which may be used to characterize a person or entity. Likewise, a conversation many be a sequence of questions sent from a first user to a second user. In at least one embodiment, a conversation may have logical controls based on responses. A conversation may include queries which utilize multiple choice, binary, and/or free-form responses. A conversation may be created as part of a game and/or other form of entertainment.

As illustrated in FIG. 7 an exemplary conversation record 700 of which one or more may be associated with or resident in the database 120 (FIG. 1) is provided. The conversation record 700 (FIG. 7) may include information of a conversation, such as dialogues, a sequence of dialogues, logical control based on responses, etc. The conversation record 700 may include a conversation record ID field 705, a conversation curator ID field 710, a conversation dialogue ID field 715, a conversation target ID field 720, a conversation responder ID field 725, a conversation duration field 730, and a conversation category ID field 735.

The conversation record ID field 705 includes an identifier of a conversation which is preferably unique and is preferably used consistently. A conversation record ID serves to distinguish a conversation record associated with a conversation from a conversation record associated with other conversations. Any number of characters, numbers, and/or other indicators may be used to indicate a conversation record ID. In at least one embodiment, a random number is indicated in the conversation record ID field 705. In at least one embodiment, a pseudonym selected by a curator may be indicated in the conversation record ID field 705. Using the example in FIG. 7, 'ConversationCC1' is the conversation record ID associated with the conversation record 700.

The conversation curator ID field 710 may include an identifier of a curator associated with a conversation. Content of the content curator ID field 710 may be used to look up information of a curator using a record such as the curator record 500*b* (FIG. 5). A curator may have various levels of access to content associated with a conversation. In at least one embodiment, a curator may have access to dialogues and/or conversations which are not controlled by the curator. Using the example in FIG. 7 'ChaCha' is the conversation curator ID associated with 'ConversationCC1' which may indicate that 'ConversationCC1' is a system conversation.

The conversation dialogue ID field 715 may include information of a number of dialogues associated with a conversation. Content of the conversation dialogue ID field 715 may be modified based on actions of a person such as a user, a guide, a curator, and/or a system administrator. For example, a person may select queries associated with dialogues which may be included in a conversation. As illustrated in FIG. 7, 'DialogueCCS1', 'DialogueCCS3', and 'DialogueCCS4' are associated with 'ConversationCC1'.

The conversation target ID field 720 may include information of a number of persons designated to receive a conversation. For example, a group of users, which may be dynamically modified, may be indicated in the conversation target ID field 720. An explicit target such as a user ID, guide ID, etc., may be included in the conversation target ID field 720. Using the example in FIG. 7, 'Newuser_sports' and 'User5' are indicated as targets for 'ConversationCC1'. This may for example indicate that a new registrant such as a user, a guide, etc. (i.e., new users), associated with the category 'Sports' may be provided with the conversation 'ConversationCC1'. Similarly, 'User5' may be provided with 'ConversationCC1'.

The conversation responder ID field 725 may include information of a number of persons who respond to a conversation. For example, if a guide responds to 'ConversationCC1', an identifier of the guide may be indicated in the conversation responder ID field 725. Using the example in FIG. 7, 'User1', 'Guide5' and 'User8' may have responded to 'ConversationCC1'.

The conversation duration field 730 may include information of time associated with a conversation. In at least one embodiment, the conversation duration field 730 may indicate an amount of time a target may have to respond to a conversation after it is provided. In at least one embodiment, the conversation duration field 730 may indicate a time interval during which a target may respond to a conversation. Any type of conditions may be used to specify duration of a conversation. Using the example in FIG. 7, 'ConversationCC1' has duration 'four days'.

The conversation category ID field 735 may include information of a number of categories associated with a conversation. A category associated with a conversation may be used for various purposes. For example, a user may elect to receive a conversation associated with a category, a curator may seek queries associated with a category in order to provide curated content, a guide may select a conversation associated with a category in order to generate profile information, a system administrator may create conversations associated with a category which may be provided to guides registering for the category, etc. Using the example in FIG. 7, 'Sports>Football' is the conversation category ID associated with 'ConversationCC1'.

As previously noted, a curator may designate a resource which may produce a dialogue associated with the curator. For example, a user might identify a web page of a social networking site which might be used to determine a response to a query associated with the user. Likewise, a wiki page, a personal database, a resume and/or other media might be identified to produce answers to queries. In at least one embodiment, a person may respond to a series of queries such as a conversation which may be used to create a structured dialogue associated with the person, who may be a curator of the structured dialogue. As will be further discussed herein, a curator may review information associated with a structured dialogue. A structured dialogue may be used to respond to a request. For example, a request associated with curated content may receive an answer or response based on content of a structured dialogue associated with the curated content.

As illustrated in FIG. 8 an exemplary structured dialogue record 800 of which one or more may be associated with or resident in the database 120 (FIG. 1) is provided. The structured dialogue record 800 (FIG. 8) may include information of a structured dialogue. The structured dialogue record 800 may include a structured dialogue ID field 805, a structured dialogue map ID field 810, a structured dialogue curator ID field 815, a structured dialogue response field 820, a structured dialogue alternate queries field 825, and a structured dialogue resource ID field 830.

The structured dialogue ID field 805 includes an identifier of a structured dialogue which is preferably unique and is preferably used consistently. A structured dialogue ID serves to distinguish a structured dialogue record associated with a structured dialogue from a structured dialogue record associated with other structured dialogues. Any number of characters, numbers, and/or other indicators may be used to indicate a structured dialogue ID. In at least one embodiment, a random number is indicated in the structured dialogue ID field 805. In at least one embodiment, a pseudonym selected by a curator may be indicated in the structured dialogue ID field 805. Using the example in FIG. 8, 'Demographicdialogue11' is the structured dialogue ID associated with the structured dialogue record 800.

The structured dialogue map ID field 810 may include an indicator of a keyword or tag associated with a structured dialogue. Content of the structured dialogue map ID field 810 may include various criteria which may be used to locate information associated with a structured dialogue in structured data and/or unstructured data. Automated processing of various types of media and/or resources may be assisted by content of the structured dialogue map ID field 810. Using the example in FIG. 8, 'marital status' is indicated in the structured dialogue map ID field 810 which may indicate that the presence of 'marital status' information in a file may indicate that a response to the dialogue 'Demographicdialogue11' may be present in the file.

The structured dialogue curator ID field 815 may include an identifier of a curator associated with a structured dialogue. An identifier of a person and/or entity associated with a resource used to generate a structured dialogue may be indicated in the structured dialogue curator ID field 815. Using the example in FIG. 8, 'John Simpson-Smythe' is the curator associated with the structured dialogue 'Demographicdialogue11', which may indicate that 'John Simpson-Smythe' has generated and/or reviewed content of the structured dialogue record 800. Any number of curators may be associated with a structured dialogue. In at least one embodiment, personal information of a user may be associated with a structured dialogue which is solely accessed based on security information associated with the user.

The structured dialogue response field 820 may include information of a number of responses associated with a structured dialogue. Content of the structured dialogue response field 820 may be generated automatically and/or using the assistance of a person. For example, an automated process might generate a response based on a resource provided, and a person such as a curator associated with the structured dialogue might edit the response. Using the example in FIG. 8, 'I have been married to Linda since 1998.' is the response associated with 'Demographicdialog11'.

The structured dialogue alternate queries field 825 may include information of a number of responses associated with a structured dialogue. Content of the structured dialogue alternate queries field 825 may indicate explicit alternate queries and/or may include templates used to generate alternate queries which are deemed to be equivalent to a structured query such as 'Are you married?'. As will be discussed further herein, alternate queries may be used for various purposes. For example, alternate queries may be used to determine whether a query directed to a curator may receive an automated response such as a response indicated in the structured dialogue response field 820.

The structured dialogue resource ID field 830 may include information of a resource associated with a structured dialogue. For example, a resource which was used to produce a response to a structured dialogue, a resource which may be used to obtain a response when an alternate query matches a user request, a resource which may be consulted if a query is determined to be a fuzzy match to a query, etc., may be indicated in the structured dialogue resource ID field 830. Using the example in FIG. 8 'Resource5' is the resource associated with 'Demographicdialogue11'.

As illustrated in FIG. 9, a process 900 for responding to a request is provided. The process 900 may be performed in whole or in part by any suitable element of the system 100 (FIG. 1). In at least one embodiment, the process 900 is operative on a server associated with the search system 130 (FIG. 1).

In operation 905 (FIG. 9) a determination is made as to whether a personal query is received. If it is determined in operation 905 that a personal query is not received, control remains at operation 905 and process 900 continues. If it is determined in operation 905 that a personal query is received, control is passed to operation 910 and process 900 continues.

The determination in operation 905 may be made using various criteria. In at least one embodiment, if a message is received at a server associated with the search system 130 (FIG. 1), it may be determined that a personal request is received. For example, if an email message, an SMS, EMS, and/or MMS message, an IM, an IP message, and/or a voice message is received at an address associated with the search system 130, it may be determined that a personal request is received. In at least one embodiment, a personal request may be identified by a login ID, URL keyword, short code, or other identifier, which may indicate that a request is to be processed based on curated information.

In operation 910, a personal request is parsed and is compared to dialogues. In at least one embodiment, content of a request may be compared to content of a structured dialogue associated with a curator. A process for comparing a request to a dialogue is further described herein with respect to FIG. 11. However, any method of comparing a personal request to a query or dialogue may be used within the spirit and scope of the embodiments herein. Control is passed to operation 915 and process 900 continues.

In operation 915 a determination is made as to whether an answer is available. If it is determined in operation 915 that an answer is available, control is passed to operation 940 and process 900 continues. If it is determined in operation 915 that an answer is not available, control is passed to operation 920 and process 900 continues.

The determination in operation 915 may be made using various criteria. In at least one embodiment, a match to a query associated with a dialogue associated with a curator may be used to determine whether an answer is available. In at least one embodiment, if a match is not found, it may be determined that a default answer or a closest matching answer is an available answer. For example, if a query is directed to a business, and an automated response which matches the query is not found, a generic and/or keyword based response associated with the business such as a request for clarification may be provided. A query may be compared to a template, corrected based on grammar, spelling, and slang rules, etc. to determine whether an answer is available.

In operation 940, an automated answer is provided. An automated answer may include an advertisement targeted based on a query and/or an answer. An answer may be provided to a user using any communication service, format and/or devices associated with the user. An answer may identify a curator associated with the answer. Control is passed to operation 955 and process 900 continues.

In operation 920, a query and answers matching the query are provided to an expediter. In at least one embodiment, an expediter is selected based on a ranking of the expediter associated with a curator and a query. Tools for processing of a personal query by an expediter are described further herein. Information of a resource associated with a personal request and/or a curator may be provided to an expediter. Control is passed to operation 925 and process 900 continues.

In operation 925, a determination is made as to whether an expediter has found an answer. If it is determined in operation 925 that an expediter has found an answer, control is passed to operation 945 and process 900 continues. If it is determined in operation 925 that an expediter has not found an answer, control is passed to operation 930 and process 900 continues.

The determination in operation 925 may be made based on various criteria. For example, an expediter may select an alternate query and/or a response provided based on automated processing of a query provided by the expediter. An expediter may form a query which is submitted to a resource which may provide a response to a request. In at least one embodiment, if an expediter indicates that the expediter cannot find a response, it may be determined that a default response may be provided. If an expediter does not respond within a predetermined time period, it may be determined that an expediter has not found an answer.

In operation 945, an answer determined by an expediter is provided. For example, a curated answer associated with a query selected by an expediter may be provided. A response provided by a database based on a query constructed based on actions of an expediter may be provided. A free-form answer provided by an expediter may be provided. An advertisement may be included in an answer determined by an expediter. An answer may be provided to a user using any communication service, format and/or devices associated with the user. An answer may identify a curator associated with the answer. Control is passed to operation 955 and process 900 continues.

In operation 930, a query and a resource are provided to a searcher. For example, a searcher associated with a curator may be provided with information of a query and a resource associated with content of the query and/or a curator associated with the query. Any resource which may assist a searcher performing a search may be provided. Control is passed to operation 935 and process 900 continues.

In operation 935, a searcher and/or a curator provide a response. For example, a searcher may perform a search responsive to the query and may obtain a search result for the query. In at least one embodiment, if a response has not been found by an expediter and/or a searcher a query may be directed to a curator. In particular, if a result for a query is not available from a resource provided by a curator, a curator may be required to provide a response for the query. Control is passed to operation 950 and process 900 continues.

In operation 950, an answer of a searcher and/or a curator is provided. For example, a text message, IM, web message, URL, voice, SMS, MMS, email and/or other message may be provided to a device associated with a device submitting a request. In at least one embodiment, a search result may be provided using a web page, search tool, or other browser functionality associated with a curator. An answer associated with curated content may be identified to the recipient of a search result. Control is passed to operation 955 and process 900 continues.

In operation 955, process information is recorded. In at least one embodiment, information of a request, a response, a curator, an expediter, a searcher, a user, a resource, a keyword, and a category are recorded in the database 120 (FIG. 1). A rating of any item associated with a request may be determined based on information of processing the request such a time, ability to locate a result, ratings by a user, ratings by a curator, etc. Control is passed to operation 905 and process 900 continues.

As previously discussed, a conversation, which may include any number of dialogues, may be distributed to a recipient such as a guide, a user, a curator, etc. For example, a conversation which might be composed of structured dialogues may be used to obtain profile information of a person such as a curator or a user based on responses by the person to the conversation.

Figure 10:
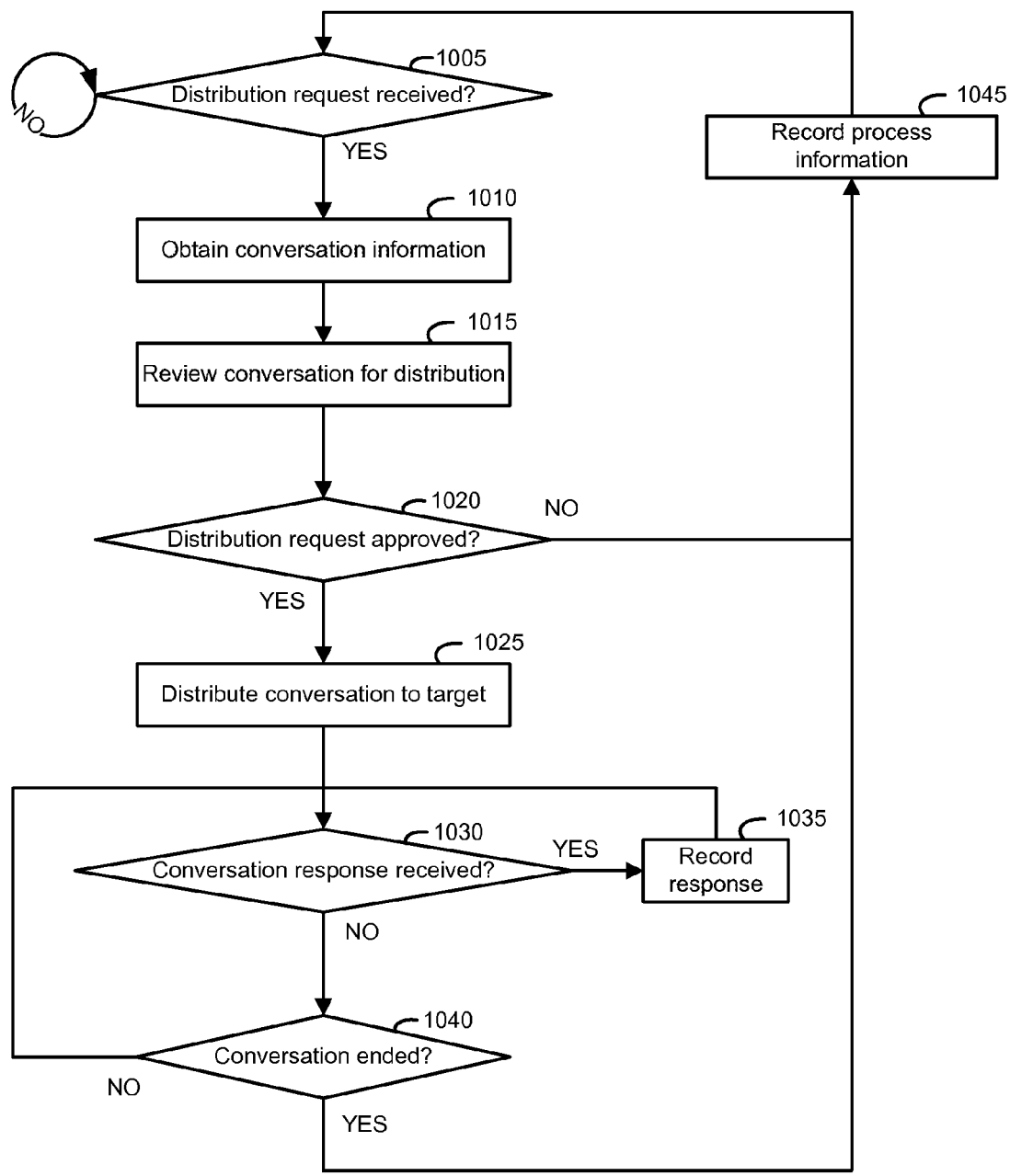
FIG. 10 is a flowchart of distributing a conversation.

As illustrated in FIG. 10, a process 1000 for distributing a conversation is provided. The process 1000 may be performed in whole or in part by any suitable element of the system 100 (FIG. 1). In at least one embodiment, the process 1000 is operative on a server associated with the search system 130 (FIG. 1).

In operation 1005 (FIG. 10), a determination is made as to whether a distribution request is received. If it is determined in operation 1005 that a distribution request is not received, control remains at operation 1005 and process 1000 continues. If it is determined in operation 1005 that a distribution request is received, control is passed to operation 1010 and process 1000 continues.

The determination in operation 1005 may be made using various criteria. In at least one embodiment, if a message is received at a server associated with the search system 130 (FIG. 1), it may be determined that a distribution request is received. For example, if an email message, an SMS, EMS, and/or MMS message, an IM, an IP message, and/or a voice message is received at an address associated with the search system 130 it may be determined that a distribution request is received. In at least one embodiment, if a request is received at a web server a distribution request web page may be provided to a browser functionality of a user system. In at least one embodiment, a distribution request may be an SMS message received from a mobile device.

In operation 1010, information of a conversation is obtained. For example, if a conversation includes multiple dialogues, content of the dialogues may be determined. In at least one embodiment, a distribution list for a conversation may be obtained. Control is passed to operation 1015 and process 1000 continues.

In operation 1015, acceptance of a conversation for distribution is reviewed. For example, if a dialogue is created by a curator, content of the conversation may be reviewed for commercial bias. A human-assisted review such as a review by an expediter, or a curator may be performed. Control is passed to operation 1020 and process 1000 continues.

In operation 1020, a determination is made as to whether a distribution request is approved. If it is determined in operation 1020 that a distribution request is not approved, control is passed to operation 1045 and process 1000 continues. If it is determined in operation 1020 that a distribution request is approved, control is passed to operation 1025 and process 1000 continues.

The determination in operation 1020 may be made using various criteria. In at least one embodiment, if a list of recipients is not acceptable it may be determined that a distribution request is not approved. In at least one embodiment, a compensation associated with a distribution list may be used to determine whether a distribution request is approved. For example, a person or entity requesting a distribution may be required to pay for a given number of dialogues distributed. In at least one embodiment, if it is determined that a distribution request is not approved, a source of the distribution request may be notified.

In operation 1025, a conversation is distributed to a target. For example, a target user may receive a query associated with a conversation. Any number of targets may receive a conversation. A target may respond automatically to a conversation. Control is passed to operation 1030 and process 1000 continues.

In operation 1030, a determination is made as to whether a response to a conversation is received. If it is determined in operation 1030 that a response to a conversation is not received, control is passed to operation 1040 and process 1000 continues. If it is determined in operation 1030 that a response to a conversation is received, control is passed to operation 1035 and process 1000 continues.

The determination in operation 1030 may be made using various criteria. In at least one embodiment, a target may be required to respond to all dialogues associated with a conversation in order that it is determined that a response to a conversation is received. In at least one embodiment, if a message is received from a communication service associated with a target of a conversation, it may be determined that a response to a conversation is received.

In operation 1035 a response is recorded. For example, a response to a conversation may be recorded in the database 120 (FIG. 1) using a record such as the conversation record 700 (FIG. 7). Control is passed to operation 1030 and process 1000 continues.

In operation 1040, a determination is made as to whether a conversation is ended. If it is determined in operation 1040 that a conversation is not ended, control is passed to operation 1030 and process 1000 continues. If it is determined in operation 1030 that a conversation is ended, control is passed to operation 1045 and process 1000 continues.

The determination in operation 1040 may be made based on various criteria. For example, if all targets have responded to a conversation it may be determined that a conversation is ended. In at least one embodiment, if a time period associated with a conversation has elapsed it may be determined that a conversation is ended. In at least one embodiment, if a predetermined number of targets have responded it may be determined that a conversation is ended.

In operation 1045, process information is recorded. In at least one embodiment, information of a conversation, a curator, a target, an approval status, a response, and a resource may be recorded in the database 120 (FIG. 1). Any information regarding the process 1000 may be recorded. Control is passed to operation 1005 and process 1000 continues.

Figure 11:
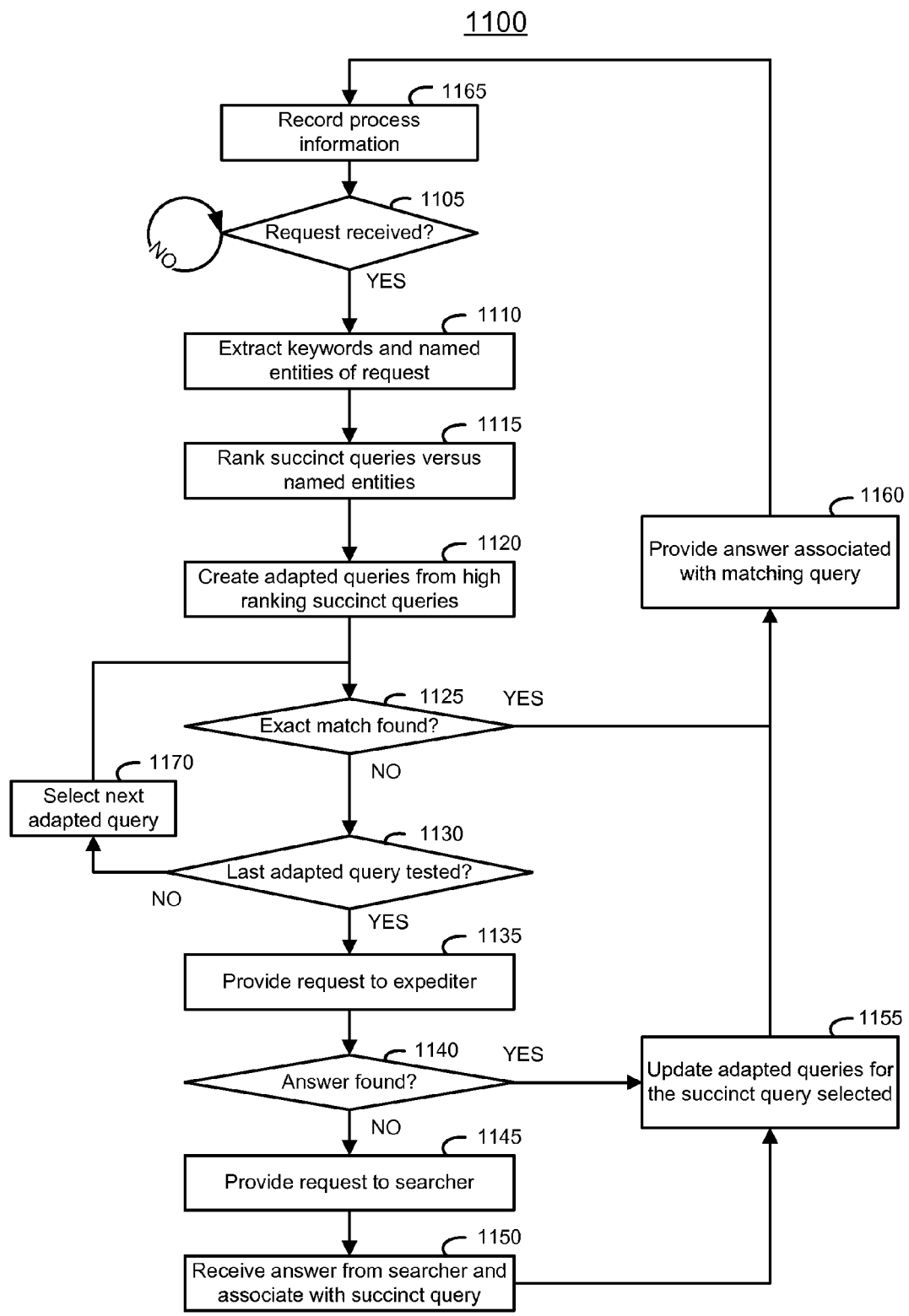
FIG. 11 is a flowchart of processing a request.

As illustrated in FIG. 11, a process 1100 for responding to a request is provided. The process 1100 may be performed in whole or in part by any suitable element of the system 100 (FIG. 1). In at least one embodiment, the process 1100 is operative on a server associated with the search system 130 (FIG. 1).

In operation 1105 (FIG. 11), a determination is made as to whether a request is received. If it is determined in operation 1105 that a request is not received, control remains at operation 1105 and process 1100 continues. If it is determined in operation 1105 that a request is received, control is passed to operation 1110 and process 1100 continues.

The determination in operation 1105 may be made using various criteria. In at least one embodiment, if a message is received at a server associated with the search system 130 (FIG. 1), it may be determined that a request is received. For example, if an email message, an SMS, EMS, and/or MMS message, an IM, an IP message, and/or a voice message is received at an address associated with the search system 130 it may be determined that a request is received. In at least one embodiment, if a request is received at a web server a request web page may be provided to a browser functionality of a user system. In at least one embodiment, a request may be an SMS message received from a mobile device. In at least one embodiment, a request may be received at an address associated with a curator.

In operation 1110 keywords and named entities are extracted from a request. A keyword may include any word, phrase, sentence, part of speech, etc. A 'named entity' may include a group of words which may include keywords which is determined to be a verbal atom. For example, proper names of persons, places, musical compositions, etc. may be named entities. A keyword may be any word which is not a 'stop word'. A 'stop word' is a word and/or phrase which occurs with a high enough frequency that a large (e.g., over five percent) percentage of queries may include the word. Examples of English 'stop words' might include "the", "who", "what", "if", "he", etc. It is important to note that a named entity may include any number of stop words. In at least one embodiment, a database of named entities and keywords is maintained and ranked. A ranking of keywords may be based on factors such as frequency of occurrence of a word or phrase in user queries, selection of a keyword by guides performing a search for a query including the keyword, etc. In at least one embodiment, a table of synonyms may be maintained. Control is passed to operation 1115 and process 1100 continues.

In operation 1115 succinct queries are ranked based on keywords and named entities. For example, a request such as "What's in Tao Hoo Thod?" would produce the keywords 'Tao', 'Hoo', 'Thod' which might be used to rank content of structured dialogue records. For example, if the dialogue map ID field 810 of a structured dialogue record included the keywords 'Tao', 'Hoo', 'Thod' that dialogue might have a high ranking for the request "What's in Tao Hoo Thod?", as it includes the keywords 'Tao', 'Hoo' and 'Thod'. For example, queries such as 'What is Tao Hoo Thod?' and 'Is Tao Hoo Thod spicy?' might have a high ranking as all three keywords are included in the query. If 'Tao Hoo Thod' is a named entity the exact sequence 'Tao Hoo Thod' might be given a higher weighting. For example the query 'Is Hoo Thod Tao hot?' would have a lower ranking as it does not match the named entity exactly, even though it includes the keywords 'Tao', 'Hoo' and 'Thod'. A succinct query may be a reference query associated with a structured dialogue, as previously discussed. A ranking operation may include consideration of substitute words, stemming, etc.

In operation 1120 adapted queries are created from high ranking succinct queries. An "adapted query" is a query which is constructed from a succinct query based on a set of rules and/or templates. An adapted query is a semantic equivalent of a succinct query. Any number of adapted queries may be constructed based on a succinct query. An adapted query may be selected and/or verified by a person. An adapted query may be associated with items such as a profile, user, guide, geography, system, etc. A predetermined number of succinct queries may be selected. Alternately, a predetermined number of alternate queries may be created. In at least one embodiment, alternate queries may be stored. In at least one embodiment, alternate queries may be generated programmatically and/or algorithmically. Control is passed to operation 1125 and process 1100 continues.

In operation 1125, a determination is made as to whether an exact match is found. If it is determined in operation 1125 that an exact match is not found, control is passed to operation 1130 and process 1100 continues. If it is determined in operation 1125 that an exact match is found, control is passed to operation 1160 and process 1100 continues.

The determination in operation 1125 may be made based on various criteria. In at least one embodiment, if each character of an adapted query exactly matches each character of a query indicated in a request, it may be determined that an exact match is found. In at least one embodiment, if an exact match is not found to a last adapted query, it may be determined that a reference courtesy query is an exact match to a request, which may cause an associated response to be provided to a user.

In operation 1130, a determination is made as to whether a last adapted query is tested. If it is determined in operation 1130 that a last adapted query is not tested, control is passed to operation 1170 and process 1100 continues. If it is determined in operation 1130 that a last adapted query is tested, control is passed to operation 1135 and process 1100 continues.

The determination in operation 1130 may be made based on various criteria. In at least one embodiment, if a predetermined number of adapted queries and/or succinct queries are compared to a query of a request, it may be determined that a last adapted query is reached. In at least one embodiment, if adapted queries associated with a predetermined number of succinct queries are compared, it may be determined that a last adapted query is reached. In at least one embodiment, if an adapted query is an exact match excluding a predetermined number of characters, or segment of a request, it may be determined that a last adapted query is reached.

In operation 1170 a next adapted query is selected. In at least one embodiment, a similarity function of an adapted query such as query length may be used to select a next query to be compared to a request. For example, an adapted query which is not the same length as a request may be discarded prior to comparison. Control is passed to operation 1125 and process 1100 continues.

In operation 1135, a request is provided to an expediter. For example, a GUI such as the GUI 1900 (FIG. 19) may be provided to an expediter guide who may locate a response to a request. In at least one embodiment, an expediter may be provided with curated content and other information provided by a curator such as a GUI, a search resource, etc. Control is passed to operation 1140 and process 1100 continues.

In operation 1140, a determination is made as to whether an answer is found. If it is determined in operation 1140 that an answer is not found, control is passed to operation 1145 and process 1100 continues. If it is determined in operation 1140 that an answer is found, control is passed to operation 1155 and process 1100 continues.

The determination in operation 1140 may be made based on various criteria. For example, if an expediter indicates that a previous query matches the request, if an expediter selects an automated resource to provide a response, if an expediter activates a control indicating that a free-form response is suitable, etc., it may be determined that an answer is found. In at least one embodiment, if an expediter determines that an answer is not available, it may be determined that a predetermined answer will be provided to a user.

Figure 21:
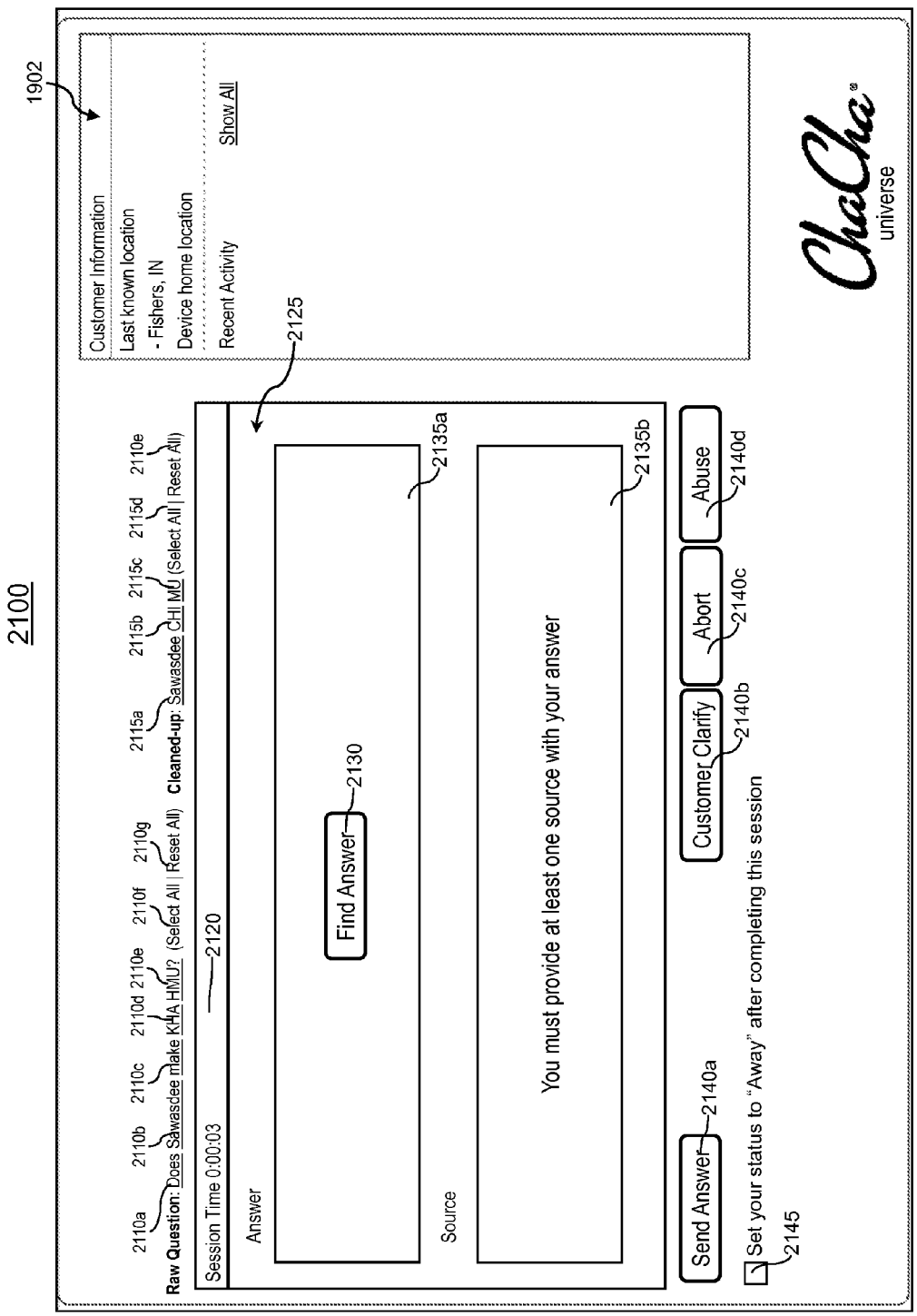
FIG. 21 illustrates a GUI for performing a search request and returning a response.

In operation 1145, a request is provided to a searcher. In at least one embodiment, a user request, a succinct query, and a resource are provided to a searcher. A GUI such as the GUI 2100 (FIG. 21) and the GUI 2200 (FIG. 22) may be provided to a searcher. A searcher may be provided with resources which may include curated information and/or resources. A searcher may conduct a search using any available resources. In at least one embodiment, a search may be restricted to resources provided by a curator. In at least one embodiment, the searcher is a curator. Control is passed to operation 1150 and process 1100 continues.

In operation 1150, a response is received from a searcher and associated with a succinct query. If a searcher obtains a search result, the search result may be associated with a succinct query which is associated with a user request. A succinct query and answer may be stored in a dialogue. In at least one embodiment, a curator may review a dialogue created by a guide prior to usage of the dialogue. Control is passed to operation 1155 and process 1100 continues.

In operation 1155, adapted queries associated with a succinct query are updated. For example, if a dialogue created by a searcher is accepted, a request may be used to generate adapted queries associated with a dialogue. Likewise, if an expediter has determined that a request is associated with an existing dialogue, the request may be associated with the dialogue as an alternate query. In at least one embodiment, a curator, a system administrator, and/or a guide may review a modification to a dialogue. Control is passed to operation 1160 and process 1100 continues.

In operation 1160, an answer associated with a matching query is provided. For example, if an adapted query associated with a dialogue is found to be an exact match to a user query, a dialogue response associated with the adapted query may be provided to a user. If an adapted query is directed to an automated resource such as weather, news, movie times, or other database, an answer provided by the automated resource may be provided to a user. If a guide has selected an answer, the answer may be provided to a user. An answer may be presented to a user using any device and/or service associated with the user. Control is passed to operation 1165 and process 1100 continued.

In operation 1165, process information is recorded. In at least one embodiment, information of processing a request is recorded in the database 120 (FIG. 1). Information of a searcher, expediter, user, curator, resource, query, answer, dialogue, keyword, named entity, etc., may be recorded and/or updated. Control is passed to operation 1105 and process 1100 continues.

Figure 12:
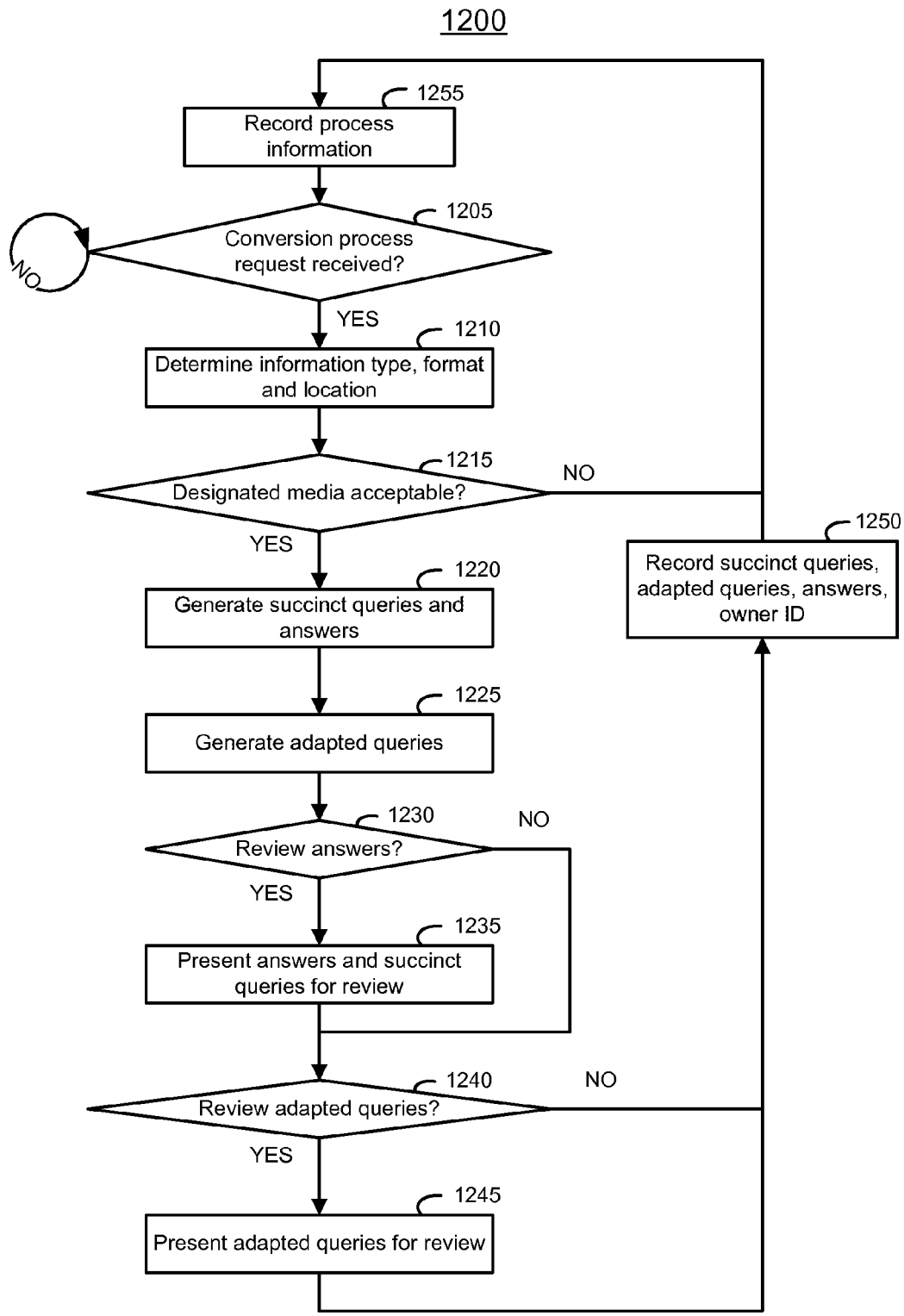
FIG. 12 is a flowchart of creating a structured dialogue.

As previously discussed, it may be desirable to create a structured dialogue from a resource. For example, a curator may provide access to a database, a webpage, etc., which may include structured and/or unstructured data which may be used to generate queries and responses. A structured dialogue may be modified, reviewed, etc. As illustrated in FIG. 12, a process 1200 for conversion of a data resource to a structured dialogue is provided. The process 1200 may be performed in whole or in part by any suitable element of the system 100 (FIG. 1). In at least one embodiment, the process 1200 (FIG. 12) may be operative on the search system 130 (FIG. 1) and/or the curator system 145.

In operation 1205 (FIG. 12), a determination is made as to whether a conversion process request is received. If it is determined in operation 1205 that a conversion process request is not received, control remains at operation 1205 and process 1200 continues. If it is determined in operation 1205 that a conversion process request is received, control is passed to operation 1210 and process 1200 continues.

The determination in operation 1205 may be made using various criteria. In at least one embodiment, if a message is received at a server associated with the search system 130 (FIG. 1), it may be determined that a conversion process request is received. For example, if an email message, an SMS, EMS, and/or MMS message, an IM, an IP message, and/or a voice message is received at an address associated with the search system 130, it may be determined that a request to process a file is received. In at least one embodiment, if a request is received at a web server a request web page may be provided to a browser functionality of a user system. In at least one embodiment, a web page provided by the search system 130 (FIG. 1) may be used to indicate a request to convert media to structured dialogues.

In operation 1210, a data type, file format, and location of information to be processed is determined. For example, a format of a web page, a spreadsheet, a text document, etc., may be determined based on information provided by a user and/or curator. A location associated with information to be processed may be provided. For example, a URL and/or other information such as security information which may be used to access media, software and systems which may be processed may be determined. Control is passed to operation 1215 and process 1200 continues.

In operation 1215, a determination is made as to whether the designated media is acceptable. If it is determined in operation 1215 that the designated media is not acceptable, control is passed to operation 1255 and process 1200 continues. If it is determined in operation 1215 that the designated media is acceptable, control is passed to operation 1220 and process 1200 continues.

The determination in operation 1215 may be made based on various criteria. For example, a list of acceptable file types, a sample access, etc., may be used to determine whether media may be accessed and/or processed. A GUI such as the GUI 1600 (FIG. 16) may be provided to designate media to be used to create a structured dialogue. Any condition which may be used to verify that media to be converted is accessible may be used to determine whether the designated information is acceptable. A person such as a guide may assist in determining whether designated media or information is acceptable.

In operation 1220, succinct queries and answers are generated based on media indicated. For example, a structured dialogue such as the structured dialogue record 800 (FIG. 8) may be populated with a dialogue map ID, a dialogue response, and a dialogue resource ID. A structure associated with a media file may be used to determine an answer and/or a succinct query. Control is passed to operation 1225 and process 1200 continues.

In operation 1225, adapted queries are generated. For example, a template associated with a succinct query may be used to generate alternate queries, which may include spelling errors, grammatical variations, a synonym, etc. A ranking may be associated with an adapted query for a succinct query. A morphology associated with a succinct query may be used to create or generate adapted queries. Control is passed to operation 1230 and process 1200 continues.

In operation 1230, a determination is made as to whether answers are to be reviewed. If it is determined in operation 1230 that answers are not to be reviewed, control is passed to operation 1240 and process 1200 continues. If it is determined in operation 1230 that answers are to be reviewed, control is passed to operation 1235 and process 1200 continues.

The determination in operation 1230 may be made based on various criteria. In at least one embodiment, authorization associated with a reviewer may be used to determine whether an answer is to be reviewed. For example, if a curator is providing a resource, or is editing responses to queries associated with the curator, the curator may be allowed to review answers.

In operation 1235, answers and succinct queries are presented for review. A curator may be permitted to revise an answer which has been generated automatically and/or using the assistance of a guide. For example, if a guide participates in generating an answer to a succinct query which is controlled by a curator, the curator may be permitted to edit a response provided by a guide. Control is passed to operation 1240 and process 1200 continues.

In operation 1240, a determination is made as to whether adapted queries are to be reviewed. If it is determined in operation 1240 that adapted queries are not to be reviewed, control is passed to operation 1250 and process 1200 continues. If it is determined in operation 1240 that adapted queries are to be reviewed, control is passed to operation 1245 and process 1200 continues.

The determination in operation 1240 may be made based on various criteria. In at least one embodiment, authorization associated with a reviewer may be used to determine whether an adapted query is to be reviewed. If a curator is providing a resource, or is editing responses to queries associated with the curator, the curator may be allowed to review adapted queries. Security information associated with a curator may be required in order to review and/or edit adapted queries and/or answers. A guide may review adapted queries. A guide may be authorized by a curator and/or an administrator to review adapted queries.

In operation 1245, adapted queries are presented for review. A person may be permitted to revise an adapted query which has been generated automatically and/or using the assistance of a guide. For example, if a guide creates an adapted query with an answer which is controlled by a curator, the curator may be permitted to edit an adapted query provided by the guide. A GUI such as the GUI 1800 (FIG. 18) may be provided for review of answers and/or adapted queries. Control is passed to operation 1250 and process 1200 continues.

In operation 1250, succinct queries, adapted queries, answers, curator information, etc., associated with curated content is recorded. If a query is not owned by a curator, but is based on a previous query, a structured dialogue associated with the curator maybe created. Control is passed to operation 1255 and process 1200 continues.

In operation 1255, process information is recorded. In at least one embodiment, information of processing a request is recorded in the database 120 (FIG. 1). Information of a searcher, expediter, user, curator, resource, query, answer, dialogue, keyword, named entity, etc., may be recorded and/or updated. Control is passed to operation 1205 and process 1200 continues.

Figure 13:
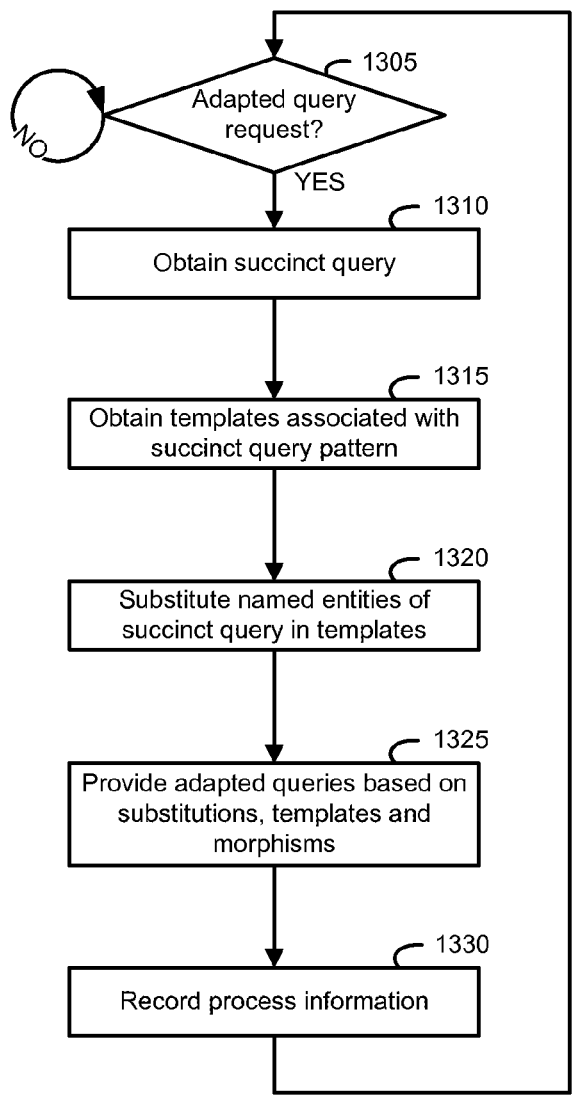
FIG. 13 is a flowchart of providing adapted queries.

An adapted query may be generated in order to determine whether an existing answer may be provided responsive to a request. Adapted queries may be static, and/or may be generated dynamically based on stored information. In at least one embodiment, adapted queries may be programmatically generated based on templates, equivalents, etc., which are associated with a keyword, named entity, succinct query, etc. Morphologies may be applied to any grammatical elements of a succinct query to produce an adapted query. As illustrated in FIG. 13, a process 1300 for creating and/or generating adapted queries is provided. The process 1300 may be performed in whole or in part by any suitable element of the system 100 (FIG. 1). In at least one embodiment, the process 1300 is operative on a server associated with the search system 130 (FIG. 1).

In operation 1305 (FIG. 13), a determination is made as to whether an adapted query request is received. If it is determined in operation 1305 that an adapted query request is not received, control remains at operation 1305 and process 1300 continues. If it is determined in operation 1305 that an adapted query request is received, control is passed to operation 1310 and process 1300 continues.

The determination in operation 1305 may be made using various criteria. In at least one embodiment, if a message is received at a server associated with the search system 130 (FIG. 1), it may be determined that a request is received. For example, if an email message, an SMS, EMS, and/or MMS message, an IM, an IP message, and/or a voice message is received at an address associated with the search system 130 it may be determined that a request for adapted queries is received. In at least one embodiment, a process such as the process 1100 (FIG. 11) may submit a request for adapted queries.

In operation 1310, a succinct query is obtained. For example, a pointer to a record such as the structured dialogue record 800 (FIG. 8) may be used to look up named entities and/or keywords of a succinct query. Control is passed to operation 1315 and process 1300 continues.

In operation 1315, templates associated with a succinct query pattern are obtained. For example, adapted queries associated with a structured dialogue, programmatic templates, morphology rules, etc., associated with a succinct query may be obtained. Control is passed to operation 1320 and process 1300 continues.

In operation 1320, named entities associated with a succinct query may be substituted in query templates. Likewise, synonyms for named entities, keywords, etc., may be inserted in templates, and/or may be morphed according to grammatical rules. For example, some named entities may have accepted misspelling, grammar, case, or other errors which may be inserted into a query template. Similarly, an adapted query may be morphed to generate an accepted grammatical and/or spelling error such as "Who's" might be equivalent to "Whose", depending on context within a template. Control is passed to operation 1325 and process 1300 continues.

In operation 1325, adapted queries based on templates, substitutions and morphologies are provided. For example, a POST message might be used to provide a list and/or a pointer to a list of adapted queries associated with a request. Adapted queries may be provided in any suitable format. For example, adapted queries might be provided as Comma Separated Values (CSV), HTML, xML, etc., based on a source of a request. Control is passed to operation 1330 and process 1300 continues.

In operation 1330, process information is recorded. In at least one embodiment, information of processing a request is recorded in the database 120 (FIG. 1). Information of a request, a source of a request, adapted queries, templates, morphologies, time, etc., may be recorded and/or updated. Control is passed to operation 1305 and process 1300 continues.

Figure 14:
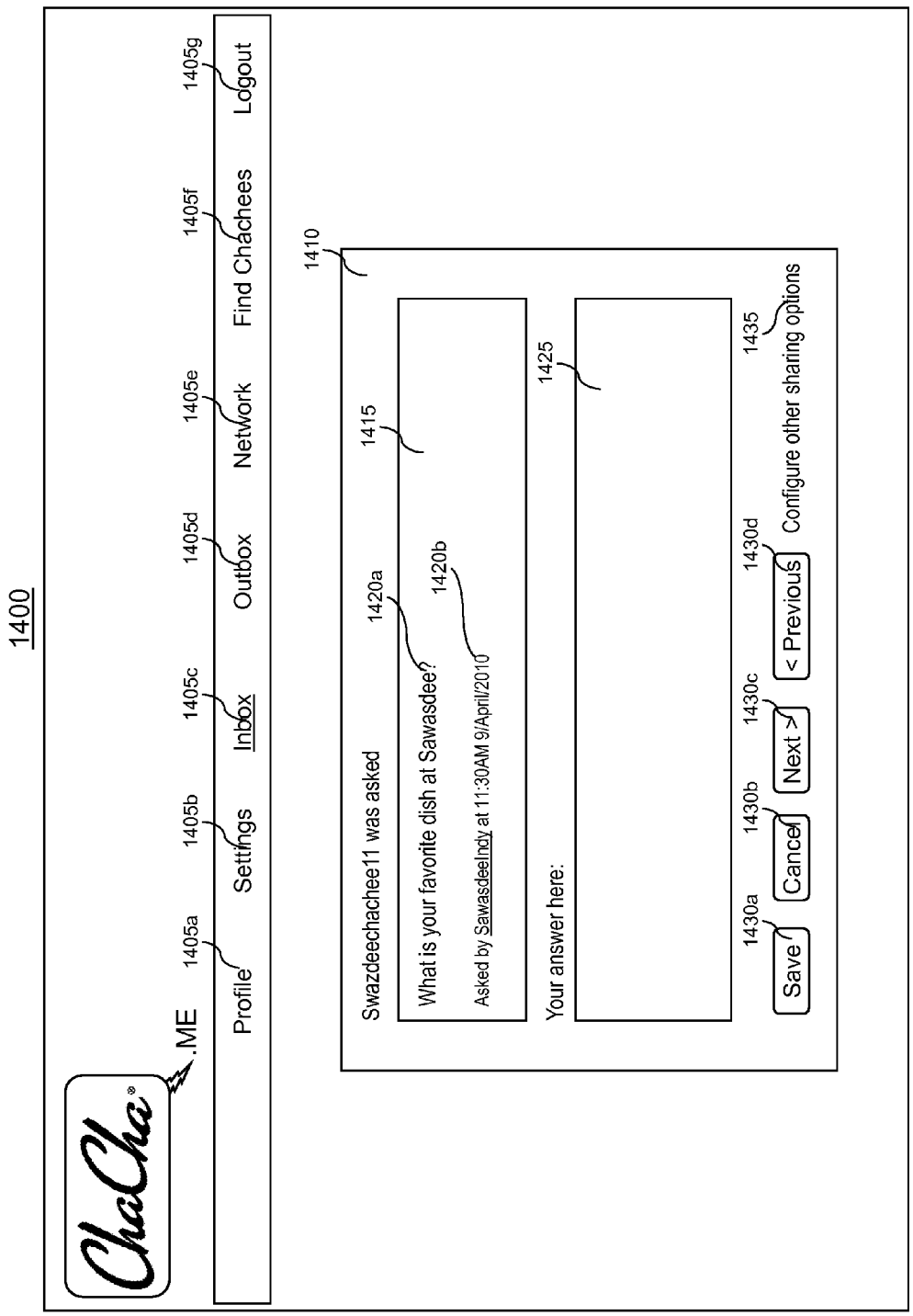
FIG. 14 illustrates a GUI for responding to a conversation.

If a user elects to respond to a dialogue, a GUI 1400 illustrated in FIG. 14 may be provided. The response GUI 1400 may include selection controls 1405, a dialogue window 1410, a query window 1415, dialogue indicators 1420, a response indicator 1425, action buttons 1430, and a sharing options control 1435. The GUI 1400 may be provided on a display device associated with a system such as the user system 110 (FIG. 1).

The selection controls 1405 may be used to select an activity. An active selection control may be indicated in any suitable manner. As illustrated in FIG. 14, the 'Inbox' selection control 1405*c* is active as indicated by the underline. An active selection control may be indicated by color, graphics, or other suitable indication. The 'Profile' selection control 1405*a* may be used to select a profile web page (not shown). The 'Settings' selection control 1405*b* may be used to cause the GUI 1600 (FIG. 16) to be provided. The 'Inbox' selection control 1405*c* may be used to cause the GUI 1400 to be provided. The Outbox' selection control 1405*d* may be used to cause the GUI 1500 (FIG. 15) to be provided. The 'Network' selection control 1405*e* may be used to view social networks of users (not shown). The 'Find Chachees' selection control 1405*f* may cause a search GUI to be provided (not shown). The 'Logout' selection control 1405*g* may be used to login and logoff of the system 100 (FIG. 1).

The dialogue window 1410 may provide information of an active dialogue. The query window 1415 may indicate information of a query requesting a response. The question dialogue indicator 1420*a* may indicate a query such as a succinct query. The owner dialogue indicator 1420*b* may be used to indicate a curator who has submitted a query to a user, and other information regarding a query. The response indicator 1425 may be used to provide a response to the query indicated in the query window 1415. The 'Save' action button 1430*a* may be used to record a response to a dialogue. The 'Cancel' action button 1430*b* may be used to clear the content of the response indicator 1425. The 'Next' action button 1430*c* may be used to advance to a subsequent dialogue. The 'Previous' action button 1430*d* may be used to return to a previous dialogue. The configure other sharing options control 1435 may be used to cause a GUI for sharing dialogues (not shown) to be provided.

Figure 15:
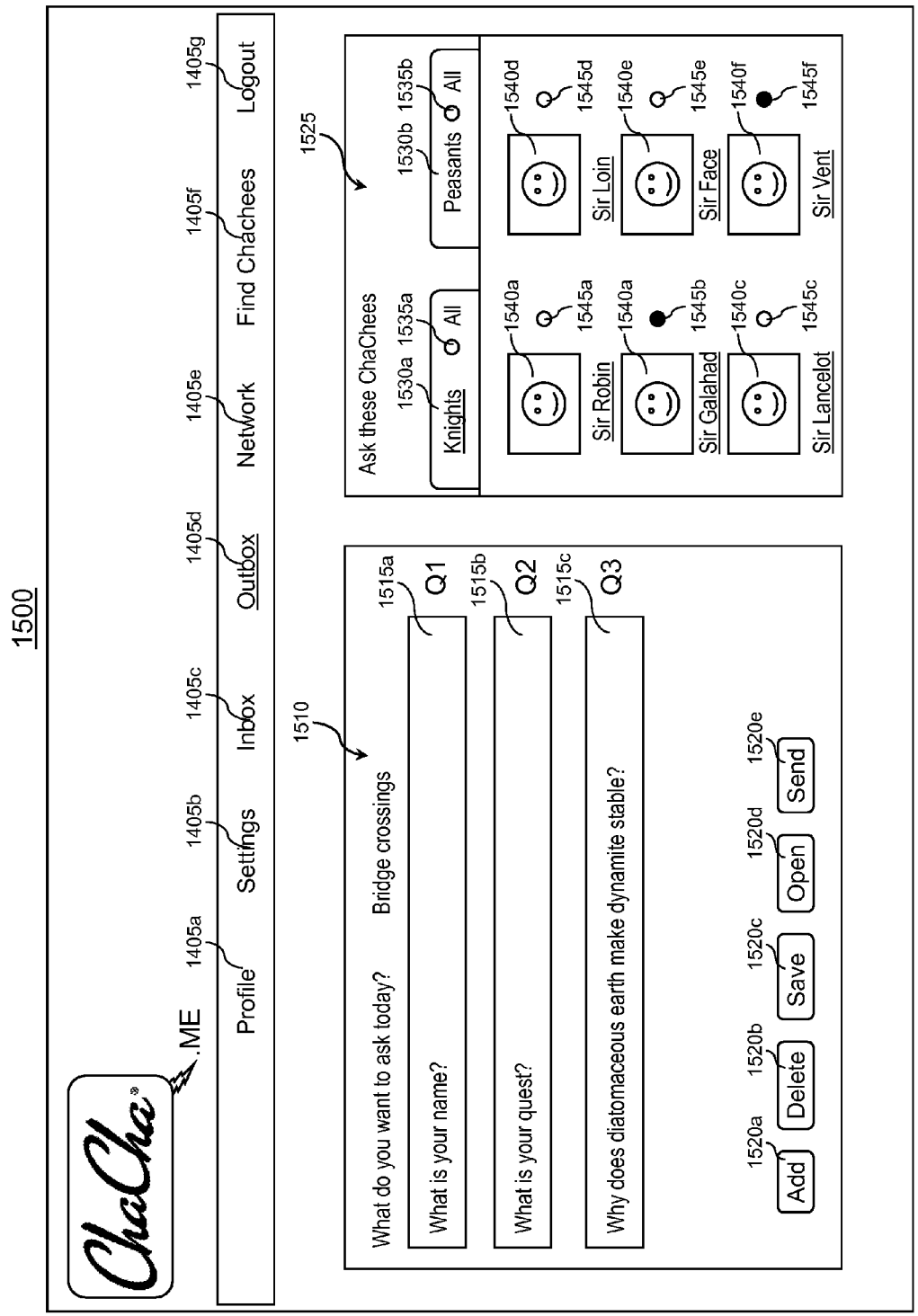
FIG. 15 illustrates a GUI for creating and distributing a conversation.

If a person elects to create a dialogue and/or conversation, a GUI 1500 illustrated in FIG. 15 may be provided. The conversation creation GUI 1500 may include the selection controls 1405, a conversation queries window 1510, query indicators 1515, action controls 1520, a targeting window 1525, group selection controls 1530, group target controls 1535, user indicators 1540, and user selection controls 1545. The GUI 1500 may be provided on a display device associated with a system such as the user system 110 (FIG. 1).

The function of the selection controls 1405 was explained previously with respect to FIG. 14. As illustrated in FIG. 15, the 'Outbox' selection control 1405*d* is active as indicated by the underline. The conversation queries window 1510 may include information of queries associated with dialogues of a conversation. Any number of dialogues may be included in a conversation. The query indicators 1515 may be used to indicate a query which is to be provided as part of a conversation. For example, the query indicator 1515*a* indicates that the query 'What is your name?' will be delivered to designated recipients as a first query of a conversation indicated in the conversation queries window 1510. The 'Add' action control 1520*a* may be used to cause a query indicator 1515 to be added to the conversation queries window 1510. The 'Delete' action control 1520*b* may be used to remove a currently active query indicator from the conversation queries window 1510. The 'Save' action control 1520*c* may be used to save a conversation to a file (e.g., 'bridge crossings') which may be retrieved and edited. The 'Open' action control 1520*d* may be used to open available conversation files. The 'Send' action control 1520*e* may be used to send a current conversation to users indicated in the targeting window 1525.

The targeting window 1525 may be used to indicate a target to which a conversation is directed. The group selection controls 1530 may be used to select a group. A group may be determined based on any shared characteristics. For example, a group may be defined by a user, may include members of an organization, may be formed by searching based on any characteristic, may be persons who have 'opted-in' to a community (e.g., Facebook® friends, Twitter™ followers, etc.), A user may create 'tabs' which indicate such groups. As illustrated in FIG. 15, the group selection control 1530*a* may be used to display information of the group 'Knights'. The group selection control 1530*b* may be used to display information of the group 'Peasants'. The group selection control 1530*a* is active as indicated by the underline. The group target controls 1535 may be used to select all members of a group as targets for a conversation. The group target controls 1535 may be implemented as 'radio buttons', 'check boxes', etc. Using the example in FIG. 15, no groups have been selected as indicated by the absence of a filled spot in the group target controls 1535*a* and 1535*b*. The user indicators 1540 may be used to provide information of a user. For example an 'avatar', a link to a personal page, a user identifier, etc., may be associated with the user indicators 1540. For example, the user indicator 1540*a* indicates the user 'Sir Robin'. The user selection controls 1545 may be used to indicate a user as a target for a conversation. The user selection controls 1545 may be implemented as 'radio buttons', 'check boxes', etc. As illustrated in FIG. 15, the user selection controls 1545*b* and 1545*f* indicate that 'Sir Galahad' and 'Sir Vent' are targets of the conversation 'bridge crossings' as indicated by the filled circles. Any number of group selection controls 1530, and/or user indicators 1540 may be provided as needed to operate the embodiments.

Figure 16:
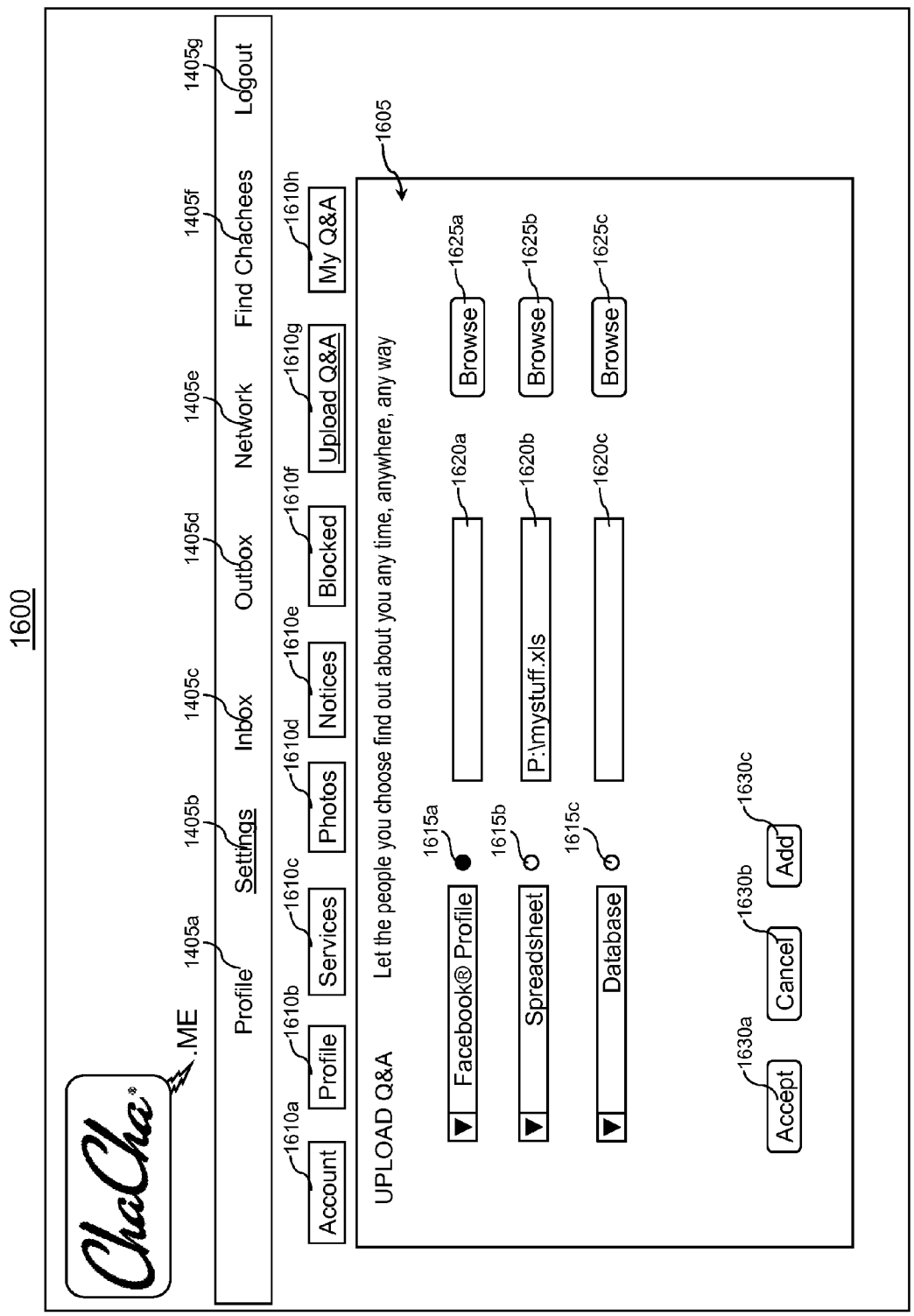
FIG. 16 illustrates a GUI for creating a structured dialogue.

If a person elects to create a dialogue and/or conversation by processing of media, a GUI 1600 illustrated in FIG. 16 may be provided. The conversation upload GUI 1600 may include the selection controls 1405, an upload controls window 1605, settings activity controls 1610, media type indicators 1615, location indicators 1620, browse controls 1625, and action controls 1630. The GUI 1600 may be provided on a display device associated with a system such as the curator system 145 (FIG. 1).

The function of the selection controls 1405 was explained previously with respect to FIG. 14. As illustrated in FIG. 16, the 'Settings' selection control 1405*b* is active as indicated by the underline. The upload controls window 1605 may be used to present information regarding media which is to be processed to produce a dialogue and/or conversation. The settings activity controls 1610 may be used to select an activity which is to be performed. The 'Account' activity control 1610*a* may cause account information to be provided. The 'Profile' activity control 1610*b* may cause profile information to be provided. Any number of settings activity controls 1610 may be provided. Activation of the 'Upload Q&A' activity selection control 1616*g* may cause the upload controls window 1605 to be provided.

The media type indicators 1615 may be used to indicate a type of media which is to be processed. The media type indicators 1615 may include a drop-down list, typing box, and/or other entry device to identify a file type which is to be processed. The media type indicators 1615 may include a 'radio button' to indicate that a particular file is to be processed. For example, the media type indicator 1615*a* indicates that a Facebook® profile is to be processed. A login ID, password, etc., which may provide access to a media file may be indicated in a profile. The location indicators 1620 may be used to indicate a file location where media to be processed may be accessed. For example, the location indicator 1620*b* indicates that 'P:\mystuff.xls' is a file to be processed. The browse controls 1625 may be used to browse for a file location. For example, activation of the browse control 1625*c* may allow a file name to be added to the location indicator 1620*c*. The 'Accept' action control 1630*a* may be used to initiate processing of media indicated in the upload controls window 1605. The 'Cancel' action control 1630*b* may be used to clear the content of the upload controls window 1605. The 'Add' action control 1630*c* may be used to add file upload controls to the upload controls window 1605.

Figure 17:
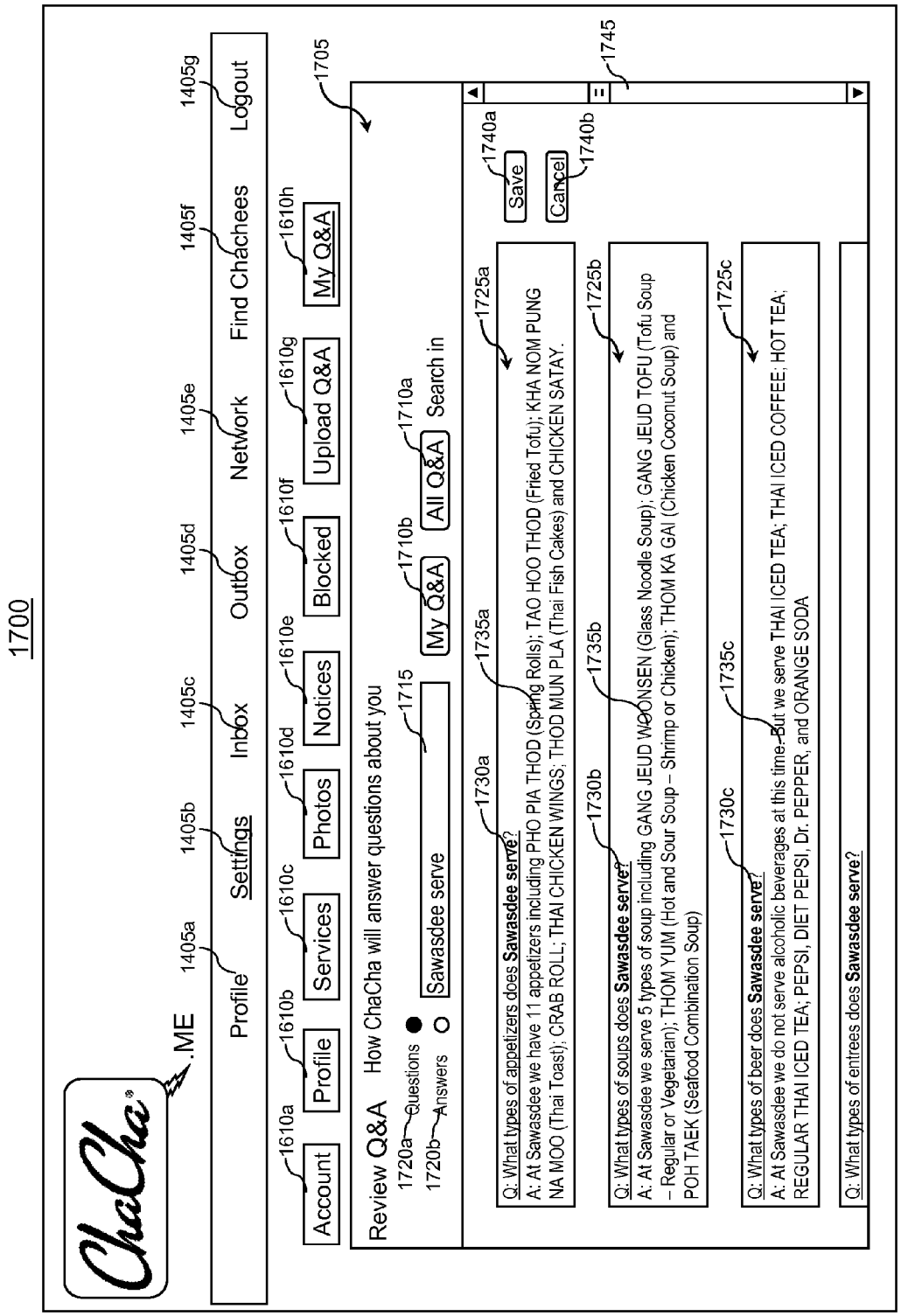
FIG. 17 illustrates a GUI for reviewing and editing a structured dialogue.

If a person elects to edit dialogues, a GUI 1700 illustrated in FIG. 17 may be provided. The dialogue editing GUI 1700 may include the selection controls 1405, the settings activity controls 1610, a dialogue search window 1705, search activation controls 1710, a search query indicator 1715, search space indicators 1720, dialogue windows 1725, query indicators 1730, answer indicators 1735, query action controls 1740, and navigation controls 1745. The GUI 1700 may be provided on a display device associated with a system such as the curator system 145 (FIG. 1). The GUI 1700 may be used to edit any dialogue available. Permission to edit a dialogue may be based on security information associated with a user, a curator, a guide, etc. For example, a user might not be permitted to edit a query associated with a curator.

The function of the selection controls 1405 was explained previously with respect to FIG. 14. The function of the settings activity controls 1610 was explained previously with respect to FIG. 16. As illustrated in FIG. 17, the 'Settings' selection control 1405*b* is active, and the 'My Q&A' settings activity control 1610*h* is active, as indicated by the underline. The dialogue search window 1705 may be used to indicate information of search criteria and results associated with a dialogue. The 'My Q&A' search activation control 1710*b* may be used to initiate a search of dialogues associated with a curator and/or user. The 'All Q&A' search activation control 1710*a* may be used to initiate a search of all accessible dialogues. The search query indicator 1715 may be used to provide a search string which may be used to select a dialogue, and may be implemented as a typing box, etc. The search space indicators 1720 may be used to indicate elements of dialogues which are to be searched. The search space indicators 1720 may be implemented as 'radio buttons', 'check boxes', etc. The 'Questions' search space indicator 1720*a* indicates that questions are to be searched for the phrase 'Sawasdee serve', as indicated by the filled circle. The 'Answers' search space indicator 1720*b* indicates that answers are not to be searched.

The dialogue windows 1725 may be used to indicate information of dialogues located by a search. The dialogue window 1725*a* may indicate a highest ranking dialogue. The query indicators 1730 may indicate a query associated with a dialogue. Query indicator 1730*b* indicates the query 'What types of soups does Sawasdee serve?' The answer indicators 1735 may be used to indicate an answer associated with a query indicated in the query indicators 1730. For example, the answer indicator 1735*c* indicates an answer associated with the query 'What types of beer does Sawasdee serve?' as indicated in the query indicator 1730*c*. The query action controls 1740 may be provided if content of a dialogue window is modified. As illustrated in FIG. 17, if the content of the dialogue window 1725*a* is edited the query action controls 1740 may be presented beside the dialogue window 1725*a*. The 'Save' query action control 1740*a* may be used to save modifications to a dialogue. The 'Cancel' query action control 1740*b* may be used to cancel modifications to a dialogue. The navigation controls 1745 may be used to navigate within content of the dialogue search window 1705.

The GUI 1700 may be used to locate a query related to a particular topic, keyword, etc., which may be of interest to a curator. For example, a business owner might search for queries including the name of the owner's business, a person, an organization, a school, etc., might search for queries regarding the person or entity. A curator might search queries created from processing of media.

Figure 18:
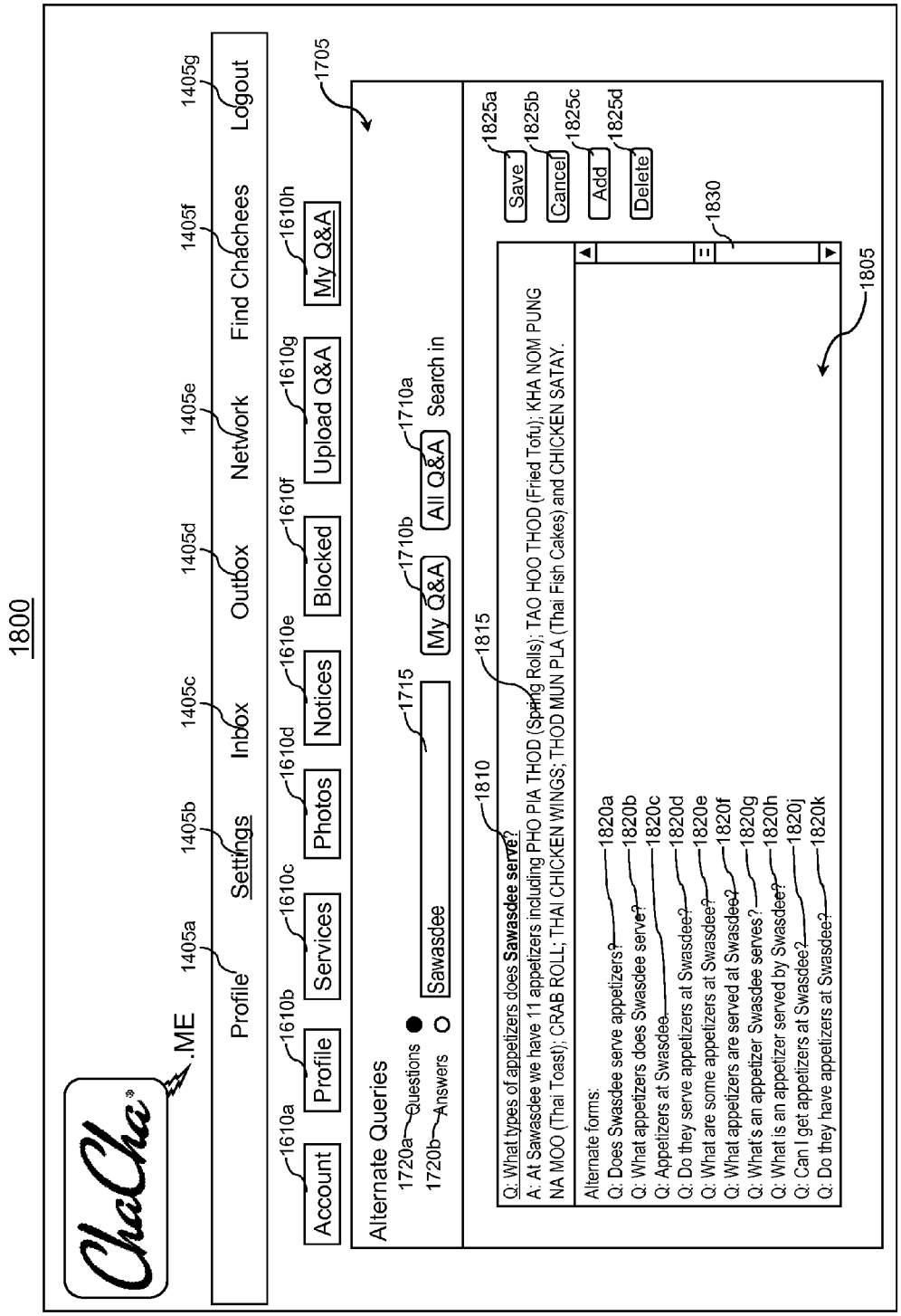
FIG. 18 illustrates a GUI for reviewing and editing an adapted query.

Activation of a query indicator 1730 may cause a GUI 1800 illustrated in FIG. 18 to be provided. The GUI 1800 may be used to review information of adapted or alternate or synthetic queries associated with a query and a response. The alternate query GUI 1800 may include the selection controls 1405, the settings activity controls 1610, the dialogue search window 1705, the search activation controls 1710, the search query indicator 1715, the search space indicators 1720, a dialogue indicator window 1805, a query indicator 1810, a response indicator 1815, alternate query indicators 1820, query action controls 1825 and navigation controls 1830. The GUI 1800 may be provided on a display device associated with a system such as the curator system 145 (FIG. 1). The GUI 1800 may be used to edit any dialogue available.

The function of the selection controls 1405 was explained previously with respect to FIG. 14. The function of the settings activity controls 1610 was explained previously with respect to FIG. 16. As illustrated in FIG. 18, the 'Settings' selection control 1405*b* is active, and the 'My Q&A' settings activity control 1610*h* is active, as indicated by the underline. The dialogue indicator window 1805 may be used to indicate information of a dialogue and associated adapted queries. The query indicator 1810 may indicate a primary or succinct query associated with a dialogue. The response indicator 1815 may be used to indicate a response associated with a dialogue. The alternate query indicators 1820 may be used to provide information of alternate queries which may for example be used to determine whether a response may be provided to a request. For example the alternate query indicator 1820*a* indicates the query 'Does Sawasdee serve appetizers?', and the alternate query indicator 1820*h* indicates the alternate query 'What is an appetizer served by Sawasdee?' Activation of the alternate query indicators 1820 may allow editing of an alternate query. The query action controls 1825 may be used to take actions regarding alternate queries. The 'Save' query action control 1825*a* may be used to record changes made. The 'Cancel' query action control 1825*b* may be used to clear changes made. The 'Add' query action control 1825*c* may be used to add an alternate query indicator 1820. The 'Delete' query action control 1825*d* may be used to delete a selected alternate query indicator. The navigation controls 1830 may be used to navigate within content of the dialogue indicator window 1805.

Figure 19:
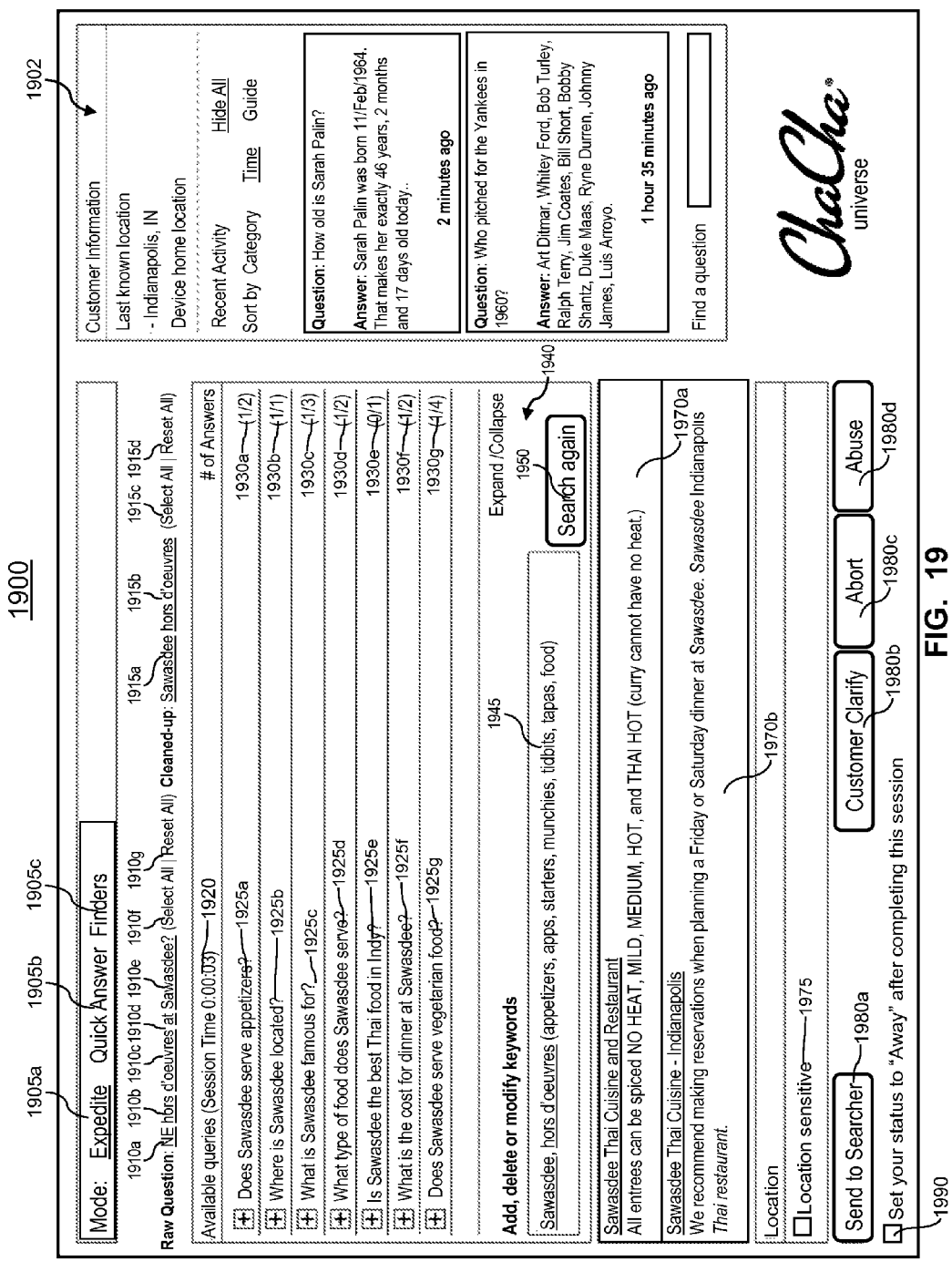
FIG. 19 illustrates a GUI for performing an expedite request based on curated queries.

If a query is submitted to an address associated with curated content, it may be determined that an expediter guide may respond to the query using responses associated with a dialogue. A GUI 1900 which may be provided for responding to a query using curated information is illustrated in FIG. 19. The expediter GUI 1900 may include a customer information window 1902, activity indicators 1905, raw query indicators 1910, modified query indicators 1915, a session timer 1920, dialogue indicators 1925, answer indicators 1930, a query window 1940, a dialogue query box 1945, a dialogue search control 1950, result indicators 1970, a location indicator 1975, action controls 1980, and a status control 1990.

The mode indicators 1905 may be used to indicate a type of task which is performed. The 'Expedite' mode indicator 1905*a* may be used to indicate that an expedite activity is in progress. The 'Quick Answer' mode indicator 1905*b* may be used to indicate that a free form answer is to be sent. The 'Finders' mode indicator 1905*c* may be used to indicate that an automated response is to be provided. The mode indicators 1905 may be activated automatically and/or may be activated by a person. Underline, color, boldface, etc., may be used to indicate an active control. Using the example in FIG. 19, the 'Expedite' mode indicator 1905*a* is active. The raw query indicators 1910 may be used to indicate elements of a request. Activation of the raw query indicators 1910 may cause a corresponding element of the query to be transferred to the dialogue search box 1945. For example activating the raw query indicator 1910*e* may transfer 'Sawasdee' to the dialogue search box 1945. The 'Select All' raw query indicator 1910*f* may transfer all words associated with a raw query to the dialogue search box 1945. The 'Reset All' raw query indicator 1910*g* may remove all words associated with a raw query from the dialogue search box 1945. The modified query indicators 1915 may be used to indicate elements of a processed request. Activation of the modified query indicators 1915 may cause a corresponding element of the query to be transferred to the dialogue search box 1945. For example activating the modified query indicator 1915*b* may transfer 'hors d'oeuvres' to the dialogue search box 1945. The 'Select All' modified query indicator 1915*c* may transfer all words associated with a modified query to the dialogue search box 1945. The 'Reset All' modified query indicator 1915*d* may remove all words associated with a modified query from the dialogue search box 1945.

The session timer 1920 may be used to indicate a time period associated with a search. The dialogue indicators 1925 may be used to indicate dialogues which are highly ranked for content of the dialogue search box 1945. The dialogue indicator 1925*a* may indicate a highest ranking query 'Does Sawasdee server appetizers?'. The answer indicators 1930 may be used to indicate a number of responses associated with a dialogue. For example the answer indicator 1930*b* indicates that there is one curated answer and one total answer for the query 'Where is Sawasdee located?'. The dialogue query box 1945 may include information of a query used to search for dialogues. For example, keywords used to search a database of dialogues may be indicated in the dialogue query box 1945. Activation of a word in the dialogue query box 1945 may cause a list of synonyms which may be used to search for a dialogue to be provided. The dialogue search control 1950 may be provided to trigger a search of a dialogue database. The result indicators 1970 may indicate search results produced by an automated search associated with content of the dialogue query box 1945. The location indicator 1975 may be used to indicate that location information is to be applied to a search. The query window 1940 may include information of a query executed using the dialogue query box 1945 and the dialogue search control 1950 as indicated by the dialogue indicators 1925.

The action controls 1980 may be used to take actions. The 'Send to Searcher' action control 1980*a* may be used to direct a query to a searcher. The 'Customer Clarify' action control 1980*b* may be used to send a clarification request to a user. The 'Abort' action control 1980*c* may be used to end a session and transfer the query to another guide. The 'Abuse' action control 1980*d* may be used to end a session and report inappropriate activity. The status control 1990 may be used to stop receiving tasks after the current task is completed. The customer information window 1902 may be used to indicate information associated with a request. As illustrated in FIG. 19, location information, and previous query information associated with a request may be provided in the customer information window 1902.

Figure 20:
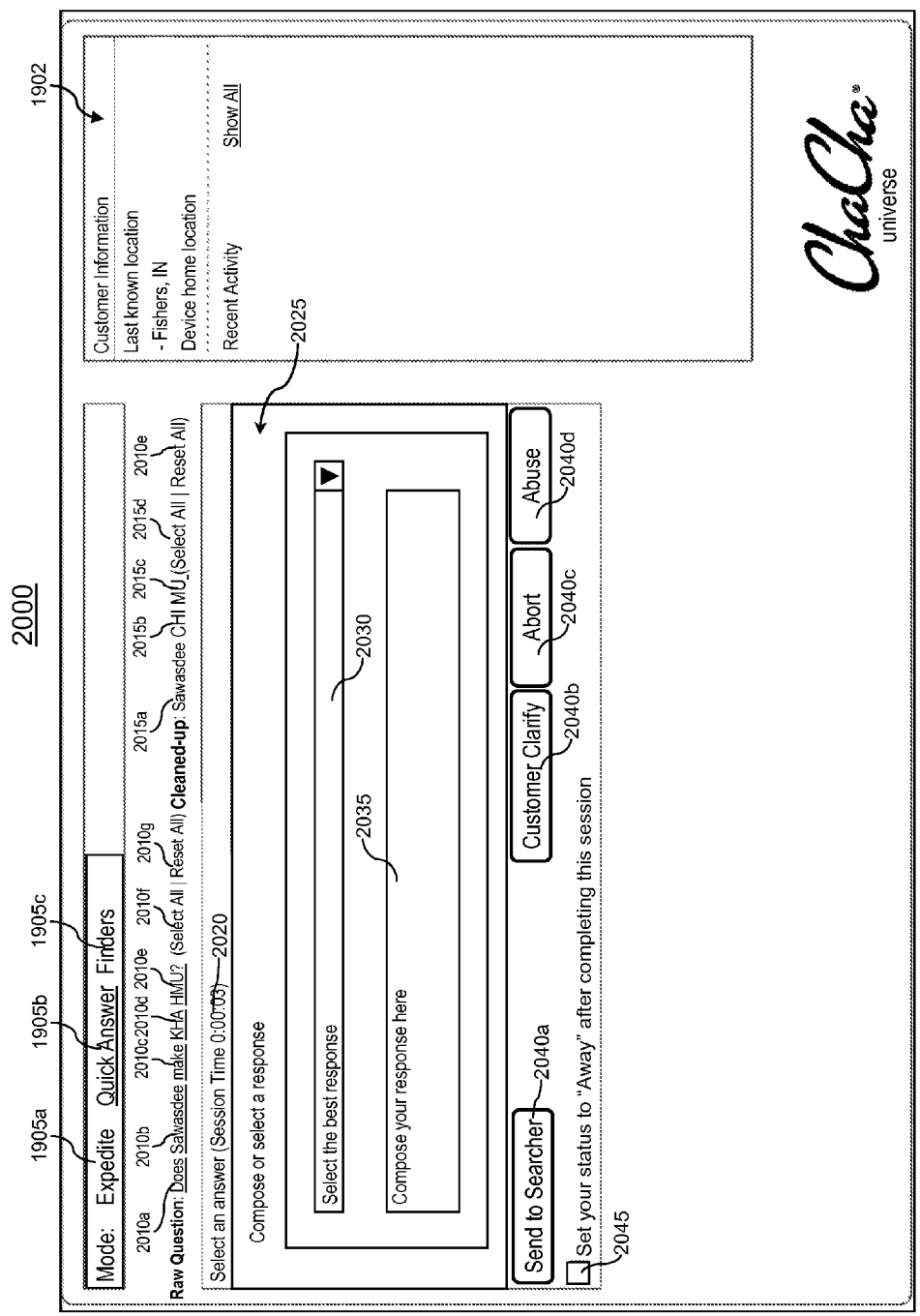
FIG. 20 illustrates a GUI for performing an expedite request including a free form response.

If a query is submitted to an address associated with curated content, it may be determined that an expediter guide may respond to the query with a free form response. A GUI 2000 which may be provided for responding to a query using curated information is illustrated in FIG. 20. The expediter GUI 2000 may include the customer information window 1902, the activity indicators 1905, raw query indicators 2010, modified query indicators 2015, a session timer 2020, a response window 2025, a response selector 2030, a response box 2035, action controls 2040, and a status control 2045.

The functionality of the customer information window 1902 and the activity indicators 1905 was explained previously with respect to FIG. 19. As illustrated in FIG. 20, the 'Quick Answer' activity selector 1905*b* is active as indicated by the underline. The raw query indicators 2010 may be used to indicate elements of a request. Activation of the raw query indicators 2010 may cause a corresponding element of the query to be transferred to the response box 2035. For example activating the raw query indicator 2010*e* may transfer 'HMU' to the response box 2035. The 'Select All' raw query indicator 2010*f* may transfer all words associated with a raw query to the response box 2035. The 'Reset All' raw query indicator 2010*g* may remove all words associated with a raw query from the response box 2035. The modified query indicators 2015 may be used to indicate elements of a processed request. Activation of the modified query indicators 2015 may cause a corresponding element of the query to be transferred to the response box 2035. For example activating the modified query indicator 2015*b* may transfer 'CHI' to the response box 2035. The 'Select All' modified query indicator 2015*d* may transfer all words associated with a modified query to the response box 2035. The 'Reset All' modified query indicator 2015*e* may remove all words associated with a modified query from the response box 2035.

The session timer 2020 may be used to indicate time information of a session. The response window 2025 may include information of a response to be provided. The response selector 2030 may be implemented as a pull-down list, typing box, etc., which may be used to select a predefined response. For example, a response to a confusing, ambiguous, or conversational query may be selected using the response selector 2030. In at least one embodiment, a response may be restricted to responses obtained from the response selector 2030. The response box 2035 may be used to compose text of a response to a query. For example, an expediter might type a response to a query based on the personal knowledge of the expediter, a browser window, etc., in the response box 2035.

The action controls 2040 may be used to take actions. The 'Send to Searcher' action control 2040*a* may be used to direct a query to a searcher. The 'Customer Clarify' action control 2040*b* may be used to send a clarification request to a user. The 'Abort' action control 2040*c* may be used to end a session and transfer the query to another guide. The 'Abuse' action control 2040*d* may be used to end a session and report inappropriate activity. The status control 2045 may be used to stop receiving tasks after the current task is completed. As previously discussed if an expediter is unable to locate a response to a query, a standardized response may be provided and/or a notification may be provided to a curator associated with the query.

If an expediter associated with a curated query determines that a searcher is needed to respond to the request, a GUI 2100 for performing a search using curated content may be provided. The GUI 2100 may include the customer information window 1902, raw query indicators 2110, modified query indicators 2115, a session timer 2120, a search result window 2125, a search activation control 2130, answer controls 2135, action controls 2140, and a status control 2145.

The raw query indicators 2110 may be used to indicate an element of a raw query. Activation of a raw query indicator may transfer an element associated with the raw query to the answer control 2135*a*. The modified query indicators 2115 may be used to indicate an element of a modified query. Activation of a modified query indicator may cause an element associated with the modified query indicator to the answer control 2135*a*. The session timer 2120 may be used to indicate time information of a session. The search result window 2125 may be used to indicate information of a response provided by a searcher. The search activation control 2130 may be used to initiate a search using a query indicated in the raw query indicators 2010. Activation of the search activation control 2130 may cause a GUI such as the GUI 2200 (FIG. 22) to be provided. A direct or succinct or definite answer to a user request may be indicated using the answer control 2135*a*. For example, a searcher may provide a text response in the answer control 2135*a*. A reference location from which a search result was obtained may be indicated in the answer control 2135*b*. In at least one embodiment, content of the answer control 2135*b* may be provided automatically based on a selection by a searcher.

The action controls 2140 may be used to take actions. The 'Send Answer' action control 2140*a* may be used to send a response to a user. The 'Customer Clarify' action control 2140*b* may be used to send a clarification request to a user. The 'Abort' action control 2140*c* may be used to end a session and transfer the query to another guide. The 'Abuse' action control 2140*d* may be used to end a session and report inappropriate activity. The status control 2145 may be used to stop receiving tasks after the current task is completed.

As previously discussed a searcher may perform a search of curated content. In at least one embodiment, a search may be restricted to content selected and/or provided by a curator. A curated search GUI 2200 for performing a search of curated content is illustrated in FIG. 22. The GUI 2200 may include query indicators 2205, search controls 2210, search space selectors 2220, search result indicators 2225, and search resource indicators 2230.

The query indicators 2205 may be used to indicate content of a query. For example, the query indicators 2205 may indicate a raw query. Activation of the query indicators 2205 may cause elements of a query to be transferred to the search control 2210*a*. Activation of the query indicator 2205*h* may cause the location indicated to be transferred to the search control 2210a. Activation of the query indicator 2205c might transfer the word 'make' to the search control 2210a. The search controls 2210 may be used to formulate a query and perform a search. The search control 2210a may include a search phrase to be used for a search. The search control 2210b may be used to initiate a selected type of search for the query indicated in the search control 2210a. The search control 2210c may be used to select a type of search which is to be performed by activation of the search control 2210b. For example, activation of the search control 2210c might cause a drop-down list of available search engines and/or methods to be provided.

The search space selectors 2220 may be used to view search results associated with various types of search applied to a search space indicated by the search space selectors 2220. The 'Sawasdee' search space indicator 2220a may indicate a search space selected by a curator. The 'Restaurants' search space indicator 2220b may indicate a search space selected by an administrator. The 'Yahoo' search space indicator 2220c may indicate a search space selected by a generalized search engine. As illustrated in FIG. 22, the 'Sawasdee' search space indicator 2220a is active as indicated by the underline. The search result indicators 2225 may be used to indicate a URL associated with a search result. Activation of a URL associated with a search result indicator may cause a web page associated with the search result to be provided, from which a response may be obtained. The search result indicators 2225 may be presented in rank order. The search resource indicators 2230 may be used to indicate search resources which may be available to a searcher. For example, the search resource indicator 2230a indicates resources associated with 'Food and Dining', the search resource indicator 2230b indicates resources associated with 'Cooking', and the search resource indicator 2230c indicates resources associated with 'Thailand'. A searcher may activate links presented in the search resource indicators 2230 to access a search resource. In at least one embodiment, access to restricted resources such as the resource 165 (FIG. 1) may be provided. Selection of a search result by a searcher may cause the GUI 2100 to be provided in order that a search result may be sent.

Figure 23:
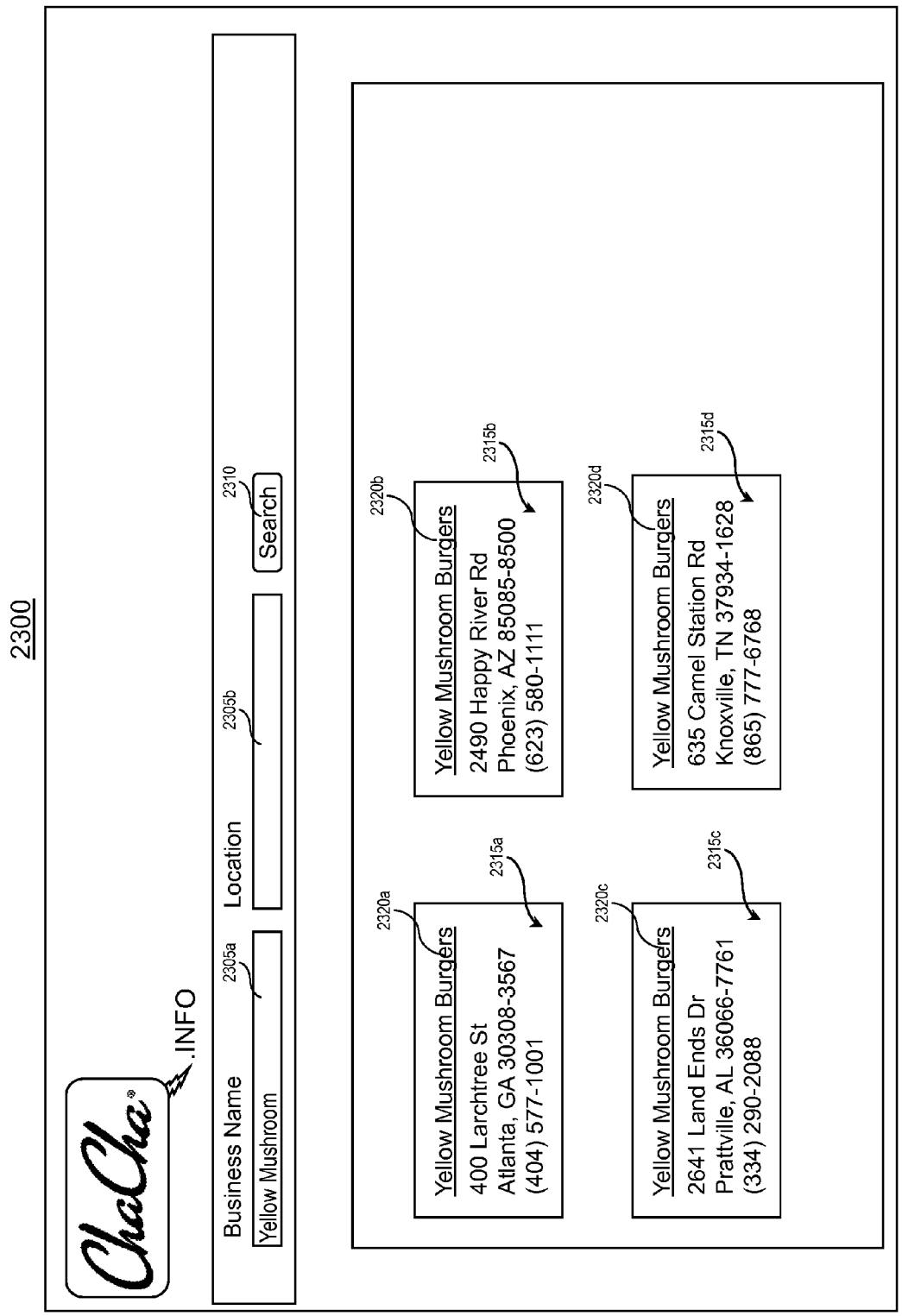
FIG. 23 illustrates a GUI for selecting a repository.

As discussed herein above, a business, individual, or entity may be an owner or curator of any or all information associated with the business, individual or entity. However, there may be various levels of control which are desirable. For example, a national organization such as the Boy Scouts of America or a chain of franchise restaurants may desire to have certain content which is under centralized control, while other content may be modified at the discretion of a local troop or a local franchise. As there may be a large number of repositories, a search functionality to locate a particular entity may be desirable. A listing selection GUI 2300 for selecting an entity is illustrated in FIG. 23. The GUI 2300 may include search indicators 2305, an action control 2310, listing information windows 2315, and listing selection controls 2320.

The name search indicator 2305a may be used to indicate a keyword. The location search indicator 2305b may be used to indicate a location. The action control 2310 may be used to initiate a search using information in the search indicators 2305. The listing information windows 2315 may display information of results of a search. For example, the listing information window 2315a indicates information associated with "Yellow Mushroom Burgers" in Atlanta, Ga. Likewise the listing information window 2315b indicates information of a franchise located in Phoenix, Ariz. The listing selection controls 2320 may be implemented as hyperlinks and/or similar controls. Activation of the listing selection control 2320a may cause a GUI such as the GUI 2400 (FIG. 24) to be provided associated with a repository including information of the franchise in Atlanta, Ga.

Figure 24:
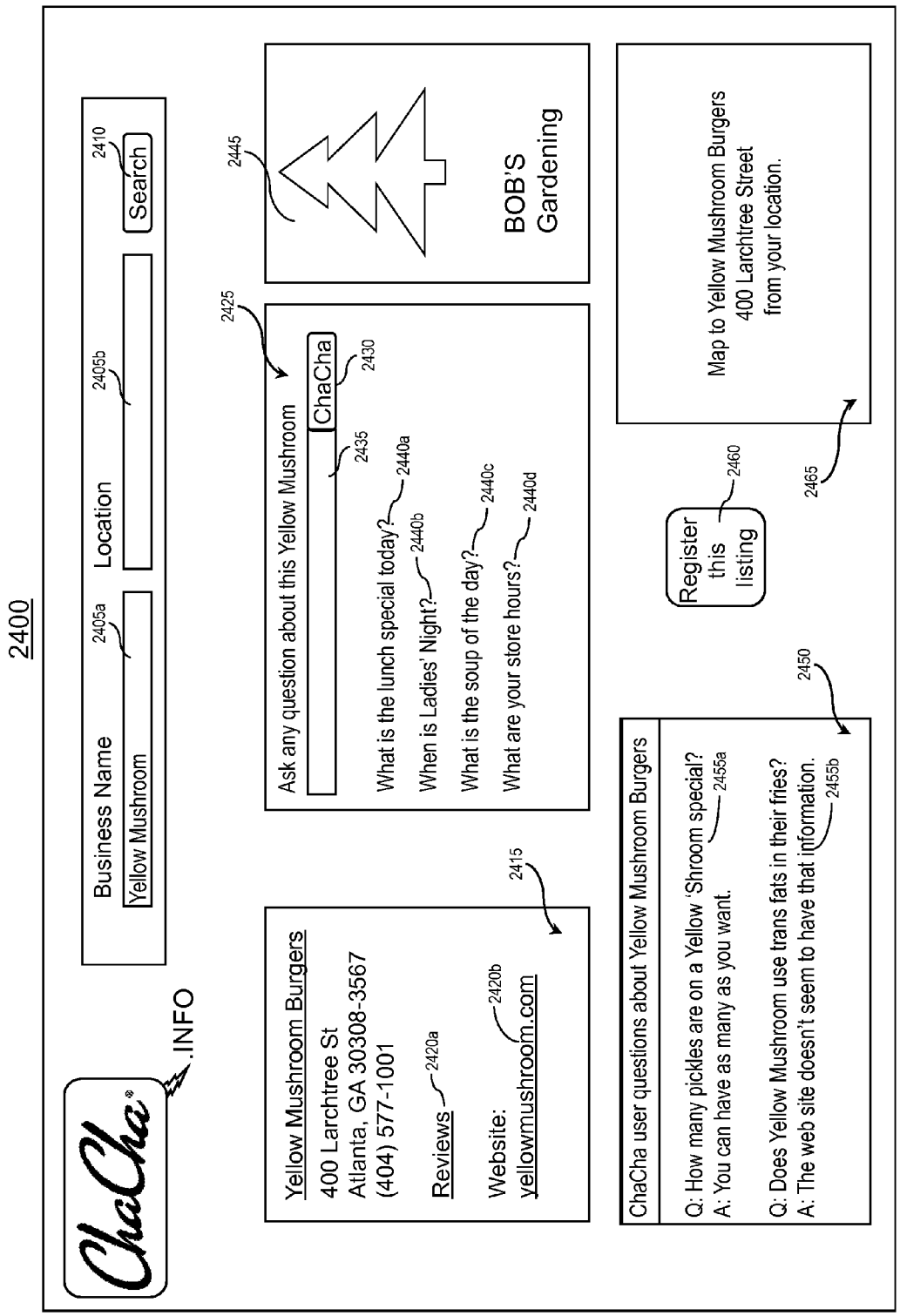
FIG. 24 illustrates a GUI for providing information of a repository.

If a repository of curated information is available, it may be displayed in a web page which is accessible to users of the search system 130 (FIG. 1). A custom listing GUI 2400 is illustrated in FIG. 24. The GUI 2400 may include search information indicators 2405, an action control 2410, a basic information window 2415, custom information indicators 2420, a curated query window 2425, a curated search activator 2430, a curated search indicator 2435, curated query indicators 2440, an advertising window 2445, a user query window 2450, user query indicators 2455, a registration control 2460, and a location information window 2465.

The name search indicator 2405a may be used to indicate a keyword. The location search indicator 2405b may be used to indicate a location. The action control 2410 may be used to initiate a search using information in the search indicators 2405. The basic information window 2415 may display information from a repository which may be customized by a curator associated with the repository. For example, a local franchise might include a link to a localized website, reviews of the local franchise, events associated with the franchise, etc. The custom information indicator 2420a may provide a link to reviews. The custom information indicator 2420b may provide a link to a website.

The curated query window 2425 may provide customized information of queries directed to the associated repository. The curated search indicator 2435 may be used to indicate a query for a search which prioritizes information indicated in a curated repository. The curated search activator 2430 may be used to initiate a search using information indicated in the curated search indicator 2435. The curated query indicators 2440 may indicate a number of queries which have been selected by a custodian of a curated repository. For example, the curated query indicator 2440a indicates the query "What is the lunch special today?" Activation of the curated query indicators 2440 may cause related responses to be provided. The advertising window 2445 may provide an advertisement, which may be targeted in any suitable manner. In at least one embodiment, a curator is compensated based on an advertisement.

The user query window 2450 may provide information of queries and responses from users regarding a person or entity associated with the GUI 2400. For example, if a query is submitted using the curated search activator 2430, the query and a response may be indicated in the user query indicators 2455. As illustrated, the question "How many pickles are on a Yellow 'Shroom special?", and the answer "You can have as many as you want." are indicated in the user query indicator 2455a. The location information window 2465 may provide geographic information such as a map, directions, etc. The registration control 2460 may be used to request to access a curated repository associated with the entity identified in the basic information window 2415. In at least one embodiment, activation of the registration control 2460 may cause a registration GUI (not shown) to be provided.

Figure 25:
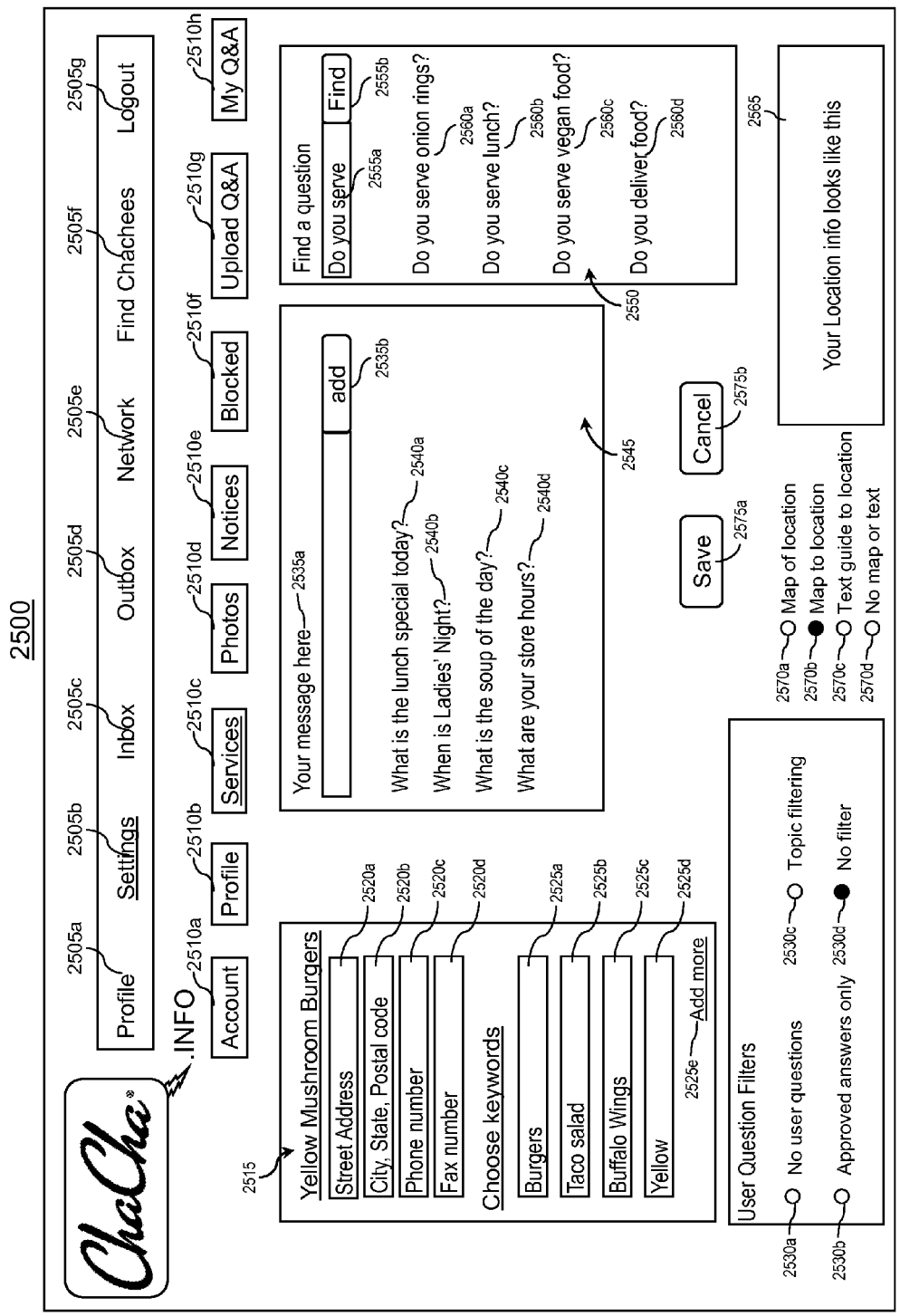
FIG. 25 illustrates a GUI for editing information displayed from a repository.

After registration, a curator associated with a listing may desire to modify information associated with the listing. A listing modification GUI 2500 is illustrated in FIG. 25. The GUI 2500 may include selection controls 2505, activity controls 2510, a listing editing window 2515, listing entry indicators 2520, listing reference indicators 2525, user query filter controls 2530, curated search personalization controls 2535, curated query indicators 2540, a curated search customization window 2545, a curated query search window 2550, curated query search controls 2555, curated query search result indicators 2560, location preview window 2565, location indicator selection controls 2570, and action controls 2575.

The selection controls 2505 may be used to select an activity. An active selection control 2505 may be indicated in any suitable manner. As illustrated in FIG. 25, the 'Settings' selection control 2505b is active as indicated by the underline. An active selection control may be indicated by color, graphics, or other suitable indication. The 'Profile' selection control 2505a may be used to select a profile web page (not shown). The 'Settings' selection control 2505b may be used to cause the GUI 2500 (FIG. 25) to be provided. The 'Inbox' selection control 2505c may be used to cause the GUI 1400 (FIG. 14) to be provided. The Outbox' selection control 2505d may be used to cause the GUI 1500 (FIG. 15) to be provided. The 'Network' selection control 2505e may be used to view social networks of users (not shown). The 'Find Chachees' selection control 2505f may cause a search GUI to be provided (not shown). The 'Logout' selection control 2505g may be used to login and logoff of the system 100 (FIG. 1).

The settings activity controls 2510 may be used to select an activity which is to be performed. The 'Account' activity control 2510a may cause account information to be provided. The 'Profile' activity control 2510b may cause profile information to be provided. Any number of settings activity controls 2510 may be provided. Activation of the 'Services' activity control 2510c may cause the GUI 2500 to be provided. As illustrated in FIG. 25, the 'Services' activity control is selected as indicated by the underline.

The listing editing window 2515 may present listing information associated with an element of a repository. The listing entry indicators 2520 may be used to provide information of a listing. The listing entry indicator 2520a may be used to provide address information. The listing entry indicator 2520b may be used to provide city, state and postal code information. The listing entry indicator 2520c may be used to provide a phone number. The listing entry indicator 2520d may be used to provide a fax number. Any number of listing entry indicators 2520 may be provided. The listing reference indicators 2525 may be used to select keywords, categories and/or other information which may be used to index a listing. As illustrated, the listing reference indicators 2525a to 2525d indicate the keywords "Burgers", "Taco salad", "Buffalo Wings" and "Yellow" respectively. Activation of the listing reference indicator 2525e may cause additional listing reference indicators to be provided. Listing reference indicators may be provided as drop-down lists, typing boxes, etc., which may provide keyword suggestions based on queries associated with a listing.

The user query filter controls 2530 may be used to selectively apply filters to user queries which will be displayed in the user query window 2450 (FIG. 24). The user query filter controls 2530 may be implemented as "radio buttons". A variety of options may be provided such as the "No user questions" filter control 2530a, the "Approved answers only" filter control 2530b, the "Topic filtering" filter control 2530c, and the "No filter" filter control 2530d. As shown the "No filter" filter control 2350d is active as indicated by the filled circle.

The curated search customization window 2545 may include controls for customizing the curated query window 2425 (FIG. 24). The curated search personalization controls 2535 (FIG. 25) may be used to indicate messages to be presented. The curated search personalization control 2535a may be used to customize a query invitation. The curated search personalization control 2535b may be used to customize a message displayed on the curated search activator 2430 (FIG. 24). The curated query indicators 2540 may be used to indicate a query which is to be displayed in the curated query window 2425 (FIG. 24). A curated query may be removed from the curated query customization window 2545 (FIG. 25) by, for example, 'dragging' the curated query indicator outside the curated query customization window 2545. For example, deleting the curated query indicator 2540c from the curated query customization window 2545 may remove the query "What is the soup of the day?" from the curated query window 2425 (FIG. 24) if the change is recorded.

The curated query search window 2550 may be used to present information to locate curated queries and answers. The curated query search controls 2555 may be used to locate curated queries, which may be indicated by the curated query search result indicators 2560. The curated query search control 2555a may be used to indicate a search query. The curated search query control 2555b may be used to initiate a search using information indicated in the curated search query control 2555a. A result of a curated query search may be indicated in the curated query search result indicators 2560. The curated query search result indicators 2560 may be added to the curated query customization window 2545 by 'dragging' and/or cutting and pasting the respective curated query search result indicator 2560 from the curated query search window 2550. For example, adding the curated query search result indicator 2560c to the curated query customization window 2545 may cause the query "Do you serve vegan food?" to be displayed in the curated query window 2425 (FIG. 24) if the change is recorded. The curated query indicators 2540 and/or the curated query search result indicators 2560 may include additional information such as an answer associated with the relevant query and/or may include a hyperlink to the response associated with the relevant query.

The location preview window 2565 may be used to preview and/or edit location information which is to be provided in the location information window 2465 (FIG. 24). The location indicator selection controls 2570 (FIG. 25) may be used to customize location information provided in the location information window 2465 (FIG. 24). The location indicator selection controls 2570 may be implemented as 'radio buttons'. A map showing the location of the location indicated in the listing entry indicators 2520 might be provided if the location indicator selection control 2570a is selected. The location indicator selection control 2570b is selected as indicated by the filled circle and may cause a map from a user's current location to the location indicated in the listing entry indicators 2520. The location indication selection controls 2570c and 2570d may provide text guidance and suppress location information respectively. The action controls 2575 may be used to take actions regarding information provided in the GUI 2500. The 'Save' action control 2575a may be used to store information indicated in the GUI 2500. The 'Cancel' action control 2575b may be used to close the GUI 2500 without recording information indicated in the GUI 2500.

Using the methods and systems described herein curated content may be generated, maintained and presented to users. A single query or dialogue may be delivered to one or more users for a response. A dialogue may be combined with other dialogues in a grouping or conversation. A conversation may be composed by a person such as a user, guide or curator, an entity, and/or system administrator. A conversation may be used to obtain profile information regarding a user.

A dialogue may be created using structured and/or unstructured information. A person and/or entity may have rights to control content and/or responses associated with a dialogue. A controlling person or entity may be referred to as a curator. Resources and/or dialogues associated with a curator may be referred to as curated items. Content of dialogues may be used to respond to requests. In at least one embodiment, if a query exactly matches a dialogue, an answer associated with the dialogue may be provided responsive to the query.

A dialogue may be associated with any number of queries. A structured, succinct or initial query may be selected by a curator. Variant, adapted, altered, modified, adjusted, equivalent or morphological queries may be associated with a dialogue based on a succinct query. A curator may select a response associated with a succinct query, which may be provided responsive to a request matching a variant query. A curator may review adapted queries associated with a dialogue.

A curator may create a dialogue based on a search of existing queries. If a curator provides a response associated with a query, a dialogue may be created. A response provided responsive to a request may indicate a curator who has provided the response. In at least one embodiment, if a request is received at an address associated with a curator, a response associated with the curator may have a higher ranking for responding to the request.

A curator may designate that a query processing guide or expediter may respond to a query if a matching response is not found. A curator may designate an expediter who is to respond to queries associated with the curator. An expediter responding to a query associated with a curator or "curated query" may be provided with a toolset which is specific to the curator. In at least one embodiment, an expediter may be able to select a response based on curated content, but may be unable to respond otherwise. In at least one embodiment, an expediter may be able to respond to a query using a free form response. A curator may review and/or rate an expediter. A ranking of a guide may be associated with a curator. If an expediter is unable to locate a response to a request, an automated response may be provided. If an expediter associates a request with a dialogue, a curator associated with the dialogue may review the dialogue, and may determine if the query is acceptable as a variant query for the dialogue.

A curator may designate that a curated query may receive a response using resources associated with the curator. A searcher may be provided with a curated query and search resources associated with a curator. A curated resource may be accessible to all guides, and/or may be accessible on a selective basis to a guide based on a qualification of the guide. If a searcher associates a search result with a curated request, a curator associated with the request may review a dialogue associated with the query, and may determine if the dialogue is to be accepted in curated content.

A curator may provide a natural dialogue response to a user submitting a query to a portal associated with the curator without the need to respond to identical queries repeatedly. While the example of a business is used for the purposes of illustration various businesses and/or individuals might practice the methods and systems described herein. For example, a celebrity might elect to use the system to provide a natural response to questions from fans; a business might provide natural language replies to requests for information, a club or organization might respond to members and/or the general public, etc. As human languages are intrinsically ambiguous, an exact match is used to ensure that a response is only delivered if a query is unambiguously mapped to a high quality response. If a query is not recognized with sufficient certainty, the query is directed to a human guide who is able to rapidly resolve ambiguity, and may provide a high quality response using approved information. If an expediter determines that a response cannot be found, a searcher may be used to locate a response from reliable curated information. A high quality response may be provided while decreasing human effort required per response.

Narrowing the scope of a query by using a designated portal may allow a higher rate of matching to submitted queries. Resources selected to cover a designated domain may increase the breadth of queries which may map to a response. Production of alternate or variant queries may increase the probability that a query will map to an existing response.

A curator may manage what type of information is presented, and how the information is presented in various situations. A curated database or repository may be managed with various levels of access. For example, general answers regarding a corporate entity may be managed by a central authority while queries regarding store hours, local inventory, and/or other types of information which may vary from one outlet or unit of an organization to another may be managed by the owner or curator of the respective unit. This may allow a large organization to obtain the benefits of scale while retaining local flexibility to manage the relevant data without disruption, and/or the need to recreate a database of answers which already exists.

In an advertising supported business, targeting of published materials to customers is important to profitability. As is well known in the practice of internet advertising, a more relevant advertisement will generate more responses and more traffic. Likewise other types of advertising such as printed media, email, or mobile message (SMS, MMS) based marketing may be more valuable to an advertiser if it is better targeted. A publisher of advertisements may be paid on a cost per impression (CPM), or a cost per action (CPA). Improved targeting for CPM advertising is desirable as it allows more impressions to be served to the audience specified by the advertiser. For example, local advertisements would not be served outside the service area of the advertiser. Improved targeting of CPA advertisements increases the probability that an action will be taken by the recipient responsive to the advertisement, which results in a higher number of actions per advertisement delivered.

Various forms of targeting are well known in the publishing business. For example, targeting may be based on keywords of a user query in a search system such as the Google® or ChaCha® services. In the case of mobile advertising, location data may be used to target advertising and/or other information. Use of location data for various purposes is well known in the art. Many customers may not be willing and/or able to provide location information which may be obtained by a mobile carrier due to cost and/or privacy concerns. Likewise, a provider of mobile services or publisher may find that the value added of location information is not sufficient to justify the cost associated with obtaining the data.

For at least these reasons, a method for targeting advertising based on membership of a user in a media distribution list would be greatly appreciated.

An administrator or 'anchor user' may establish a distribution group or subscription group which may receive messages as determined by the anchor user. An anchor user may provide various characteristics associated with the subscription group to a publishing system which may be used to distribute messages. If a user elects to become a member of the subscription group or 'subscriber', characteristics of the group may be associated with the subscriber. Messages distributed to the subscription group may be targeted based on characteristics associated with the subscription group. If a subscriber submits a request to the publisher system, the publisher system may utilize characteristics of subscription groups associated with the subscriber to select a number of advertisements which are targeted to users with characteristics determined from the subscription groups of the subscriber. Improved characterization of a user may be used to improve a user experience provided to the user as well as providing more effective use of advertising inventory.

A system is provided for 'micro-publishing' of messages by electronic messaging. For example, email, SMS, IM, or other types of mobile message distribution is provided. An 'anchor user' or administrator for the list of members or 'subscription group' is determined. An administrator registers a distribution group and provides background information of the group, which may include geographic, demographic, and affiliation information of the membership. For example, a social organization might provide location, membership requirements, activities, etc., which are associated with the organization. Likewise, a political, religious, charitable, athletic, etc., organization might provide information of itself for registration.

Subsequent to registration, a message may be sent to any member of the group and/or all members of the group by an administrator or 'anchor member'. For example, an administrator may send a message including a keyword to a short code which causes a message to be distributed to registered members of the group, or may use a web form to submit a message for distribution. In at least one embodiment, the group members or 'subscribers' may be required to opt-in before receiving messages as a member of a distribution group.

If a person opts in to a subscription group or distribution group, information regarding membership in the subscription group is associated with a unique identifier of the person. Information of a subscription group membership provided by an administrator may be used to target advertising to members. For example, in order to subsidize the cost of distribution of electronic messages associated with a subscription group, an advertisement may be included in a message submitted for distribution. In at least one embodiment, a message distribution system is part of a larger publishing system such as a search service. In a search system embodiment, a user may be associated with any number of distribution groups or subscription groups or subscription lists or distribution lists or subscriber groups which may be used to infer user characteristics, and may be used to target advertisements. For example, a keyword of a message provided by an administrator and a characteristic associated with members of a distribution group may be used to select an advertisement which is presented before, with, or after the message.

Membership in multiple subscription groups may be used to build a profile of a user which may include a blend of information from multiple sources. Items such as a calendar, historical information of messages, a document archive, a web page, etc., might be associated with a group, which might be used to determine characteristics such as locations, affiliations, keywords, etc., associated with a distribution group, and its members. Any type of group, individual, organization, entity, etc., might create any number of subscription lists.

A system is provided which includes an administrator or 'anchor user' system which may be used to register a distribution group and to send messages to members of the distribution group, a user system which may be used to receive messages and advertisements, submit requests, and respond to messages and/or advertisements, a publisher system receiving registration information of the distribution group, a message to be distributed and advertisements, an advertiser system providing advertisements and targeting information, and a database storing information of an administrator, a user, an advertiser, and an advertisement. Optionally the publisher system may include an information search functionality which enables a user to submit a request for information and receive a search result responsive to the request. Optionally the system may include a guide system which may be operated by a human searcher receiving a request and providing a search result. The system includes a network. The network may include a wireless carrier system and/or a messaging aggregator system which may route messages between elements of the system. The network may include a public network of networks (the Internet) and/or a number of private networks. The network communicatively couples the various elements of the system.

A distribution group may send and receive messages using any available communication services which are accessible by the system. These may include SMS, MMS, IM, email, voice, Voice over Internet Protocol (VoIP), etc. The system may use various and wired and/or wireless communication systems such as WiFi, GSM, WiMax, LTE, etc.

As used herein, a "request" means a request for information, products, and/or services. A request, search request or query may include various types of media and may be provided by any user system which may establish communication with a server and/or other device associated with a search service or publishing service.

A "user" is a person who submits a request and may receive any type of information responsive to a request. A "guide" or searcher is a human assistant who may perform a task to assist in obtaining a search result. A "transcriber" guide may convert a spoken request into a text request. An "expediter" guide may categorize, clarify, modify, and/or otherwise process a request, which may assist in the processing of the request. A "generalist" guide may perform a search for information responsive to a request which is broadly categorized or uncategorized. A "specialist" guide may perform an information search responsive to a request which is narrowly categorized. Any guide may perform any tasks associated with various designations of guides who perform a task to assist in processing a request.

An "advertiser" is any person and/or entity which may provide promotional information or "advertisements" to be delivered to a user. An advertisement may take various forms and/or may include media of any sort which can be delivered to a user device. A "resource" or search resource may be an automated system, a person, a database, and/or any other source of information which may be used to obtain a "result" or search result. A search result is any information which has been determined to be a response to a request. A search result may include an advertisement.

The terms voice and speech are used interchangeably herein. A user, a resource, an advertiser, a publisher and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail and/or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, portable, or server system might be used to establish a communication session. A landline phone, a specialized communication terminal, and/or any other communication device might be used to establish a communication session.

Communication between a guide, a user, an advertiser, and/or a search system may include conversion of text to speech and/or speech to text. Any type of conversion and/or other processing of information which may facilitate communication between a user, a guide, an advertiser, a resource and/or a search system or publisher system may be performed. Any type of media which can be sent and/or received using a communication system may be part of a communication session. A communication session may be conducted using any or all communication service associated with a user, an advertiser, a resource and/or a guide. Any communication session may include communication via multiple services and/or devices. For example, a request may be submitted as a voice query, which might indicate an image located on a resource accessible to a user and/or a guide, the voice query might be converted to a text message, the image might be processed in order to associate a tag and/or other images with the image, and a response might be provided as a spoken reply to a mobile phone associated with a user, and a video presentation which is accessible via a high-speed connection, which might be delivered to a browser functionality of a different user device.

An advertisement may be transmitted including during any or all communication sessions. Items including a resource, a guide, an advertiser, a user, a search result, a keyword, a category, and/or an advertisement may be rated and/or ranked. Rating information may be obtained from a user, a guide, an advertiser, a resource and/or a search system. Rating information may be used to select a resource, a guide, an advertisement and/or any item based on information associated with an item indicated in a database. A search service may be compensated by advertising revenue. Advertising and/or content may be delivered to a user, an advertiser, and/or guide using any service associated with a user, an advertiser and/or a guide. A "member" or subscriber user is a user who is associated with a number of subscription lists or subscription groups.

Figure 26:
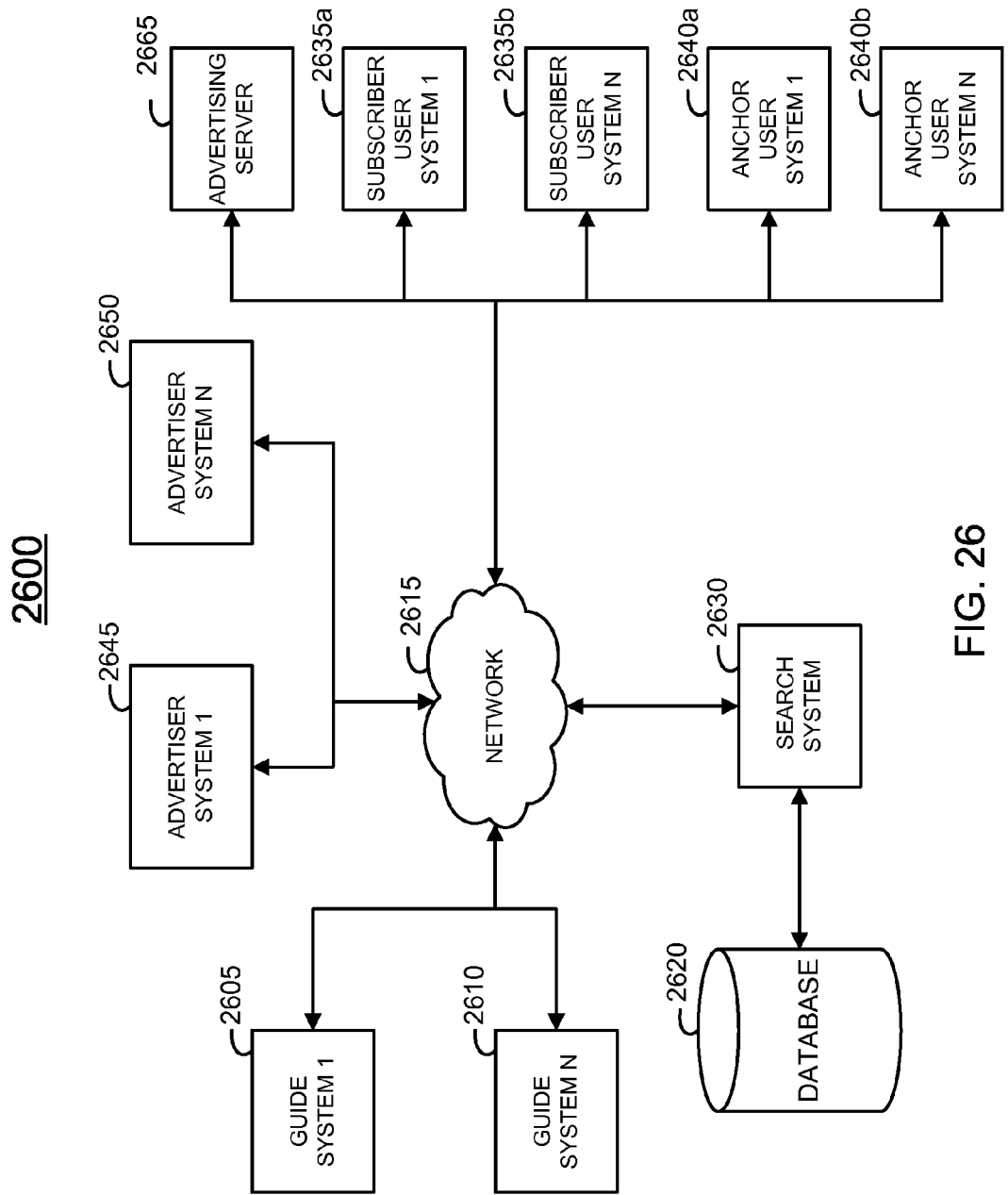
FIG. 26 is a block diagram of an exemplary system embodiment.

As illustrated in FIG. 26, system 2600 includes guide systems 2605, 2610, a network 2615 such as the Internet, a search system 2630, subscriber user systems 2635a, 2635b, anchor user systems 2640a, 2640b, a database 2620 which may comprise various records, advertiser systems 2645, 2650, and advertising server 2665.

While only a few systems associated with a guide, user, advertiser, advertising server, and a search system are depicted in FIG. 26, it is within the scope of the disclosure for multiple systems for guide, user, advertiser, advertisement server and search services to be utilized. In particular it is envisioned that many guide, user, advertising servers and advertiser systems may be implemented. The search system 2630 may be a composed of any number components as described further herein.

Any user system (e.g. the subscriber user system 2635a) can be used to submit a search request to the search system 2630 and/or receive a search result, advertisement, message, notice, and/or other information. Any guide system (e.g., the guide system 2605) can be operated by a human searcher to obtain a search result responsive to a request which may have been submitted by an information seeker located at a user system (e.g., the anchor user system 2640a).

The network 2615 may be a global public network of networks (the Internet) and/or may consist in whole or in part of one or more private networks and communicatively couples the guide systems 2605, 2610, the user systems 2635, 2640, the advertiser systems 2645, 2650, and the advertising server 2665 with the other components of the system such as the search system 2630, and the database 2620. The network 2615 may include one or more wireless networks which may enable wireless communication between the various elements of the system 2600. A wireless service carrier or service provider may receive messages from a user device via a wireless network which is a part of the network 2615, and provide the messages to a wireless messaging aggregator via an internet connection which is part of the network 2615. A wireless messaging aggregator may provide user messages to the search system 2630 via an Internet Protocol (IP) connection. The same routing might be used in reverse in order that the search system 2630 may provide a message to the subscriber user systems 2635 using the network 2615. Similarly a voice communication via wired and/or wireless communication might be established between any elements of the system 2600 using the network 2615. In at least one embodiment, communication is established without a messaging aggregator, and messages are passed directly from the search system 2630 to a wireless carrier system. Likewise, an email server, IM server, etc., which may be used to facilitate communication between the elements of the system, may be provided as part of the system 2600.

The search system 2630 allows interaction to occur among the guide systems 2605, 2610, the user systems 2635, 2640, the advertiser systems 2645, 2650, and the advertising server 2665. For example, an information search query or request can be transmitted from the subscriber user system 2635a to the search system 2630, where a search query can be accessed by the guide system 2605. Similarly, a search result produced using the guide system 2610 in response to a search query submitted by the anchor user system 2640b may be transmitted to the search system 2630, where it may be stored by the search system 2630 and/or may be transmitted to the anchor user system 2640b. An advertisement might be obtained from the advertising server 2665 and transmitted to the user system 2635a as an SMS or MMS message. Any type of communication between a user, a guide, and/or an advertiser may be mediated and/or facilitated by the search system 2630, and/or other elements of the system 2600.

The search system 2630 is communicatively coupled with the database 2620. As will be described herein in further detail below, the database 2620 includes data that is processed in association with operation of the embodiments. Although FIG. 26 illustrates the database 2620 as a separate component of the system, the database 2620 may be integrated with the search system 2630. Further, the records maintained in the database 2620 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 2620 may reside in any suitable elements of the system 2600. Any or all elements of the system 2600 may include any part or the entirety of the database 2620.

The guide systems 2605, 2610, the user systems 2635, 2640, the advertiser systems 2645, 2650, and the advertising server 2665 may include equipment, software, systems and personnel required to send and/or receive messages between a user system, a guide system, an advertiser system, and/or the search system 2630 using the network 2615. The database 2620 includes information which may allow the search system 2630 to establish communication between any or all of the elements of the system 2600.

A user system, a guide system, an advertiser system, and/or a resource may be a desktop or portable PC or Mac® computer, a mobile phone, a smart phone, a PDA, a server system, a landline phone, a specialized communication terminal, a terminal connected to a mainframe, or any other communication device and/or system. The search system 2630 may include one or more servers, computers, etc. For example, servers such as the PowerEdge® 2900 by Dell, the BladeCenterJS22 by IBM, or equivalent systems might be used to implement elements of the search system 2630. The search system 2630 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems or communication devices known in the art may be used as user systems, guide systems, advertiser systems, resources, voice routing systems, message routing systems, and/or to implement the search system 2630.

A guide may be required to register with the search system 2630. As part of a registration process, at least one communication method is associated with a guide. In at least one embodiment, a guide may register with the search system 2630 and establish a username and password which are associated with the guide. A guide may login to the search system 2630 using a web browser functionality of the guide system 2605 in order to communicate with the search system 2630. Multiple communication services may be associated with a guide and may allow a communication session to be established between a guide system such as the guide system 2605 and a user system, a resource and/or the search system 2630. Multiple identifiers of a guide may be associated with each other. Information such as IM credentials, an email address, a phone number, a URL, a username, etc., of a guide may be identified which may allow the search system 2630 to establish a communication session between a guide system and a user system, a resource, an advertiser system, and/or the search system 2630.

When a guide registers with the search system 2630 the guide may be associated with one or more keywords, categories, and/or other information. For example a keyword or category may be selected by a guide, or may be associated with a guide based on a test administered to a guide and/or other information provided during and/or after a registration process. Profile characteristics such as geographic, demographic, affiliation, personality and/or other types of information may be associated with a guide. Information associated with a guide may be stored in the database 2620 and may be used for purposes such as matching a guide to a user request, determining and/or providing compensation for a guide, communicating with a guide, etc., as will be described further herein below. A guide may be associated with one or more advertisers. Registration and/or other information of a guide may be provided by an advertiser.

A user may be identified by the search system 2630. When a user system such as the subscriber user system 2635b establishes a communication session with the search system 2630, an identifier of a user system is determined. An identifier of a user system may be associated with other information regarding a user. A user system may be identified using an email address, a telephone number, an IM credential, a username, a cookie, and/or any other identifier which may be used to associate information with a user. Multiple identifiers of a user may be associated with each other. Using information of communication services associated with a user, a communication session may be established between a user system such as the subscriber user system 2635b and a guide system, an advertiser system, a resource and/or the search system 2630. Information such as a keyword, a category, a user profile, a previous search request, a search result, etc., may be associated with a user. Profile information may be associated with a user as further described herein. Information of a user may be stored in the database 2620.

A resource, which may be a person, an entity, a search engine, a database, a software application, a corpus of one or more types of media such as text or printed information, images, audio, video, etc., or any combination thereof, may be identified by the search system 2630. Any source of information may be a resource within the context of the disclosure herein. Information of at least one method of communication is associated with a resource which allows a communication session to be established between the search system 2630, the user systems 2635, 2640, the advertising server 2665 and/or the guide system 2605, 2610 and the resource. An identifier of a resource may be associated with other information regarding a resource. A resource may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource and a user system, a guide system, an advertiser system, and/or the search system 2630. Information such as a keyword, a category, a profile, and/or other information may be associated with a resource. Information of a resource may be stored in the database 2620.

A resource may include any systems, software, hardware, personnel and/or other facilities which may provide information to a guide, a user, an advertiser and/or the search system 2630. For example, a resource may be a search engine, a database system, a library, a personal hard drive and/or other local storage, printed materials, recordings of any sort, a software program, a person or persons, an organization, etc. A resource may be freely accessible to any user and/or guide and/or may be available on a restricted basis. A resource may include resources which are available on an unrestricted and/or restricted basis. A resource may not be accessible using the network 2615, but may be accessible to a selected guide, user, and/or advertiser.

An advertiser may be required to register with the search system 2630. As part of a registration process, at least one communication method is associated with an advertiser. In at least one embodiment, an advertiser may register with the search system 2630 and establish a username and password which are associated with the advertiser. An advertiser may login to the search system 2630 using a web browser functionality of the advertiser system 2645 in order to communicate with the search system 2630. Multiple communication services may be associated with an advertiser and may allow a communication session to be established between an advertiser system such as the advertiser system 2645 and a user system, a guide system, a resource system and/or the search system 2630. Multiple identifiers of an advertiser may be associated with each other. Information such as IM credential, an email address, a phone number, a URL, a username, etc., of an advertiser may be identified which may allow the search system 2630 to establish a communication session between an advertiser system and a user system, a guide system, an advertiser system, a resource, and/or the search system 2630.

When an advertiser registers with the search system 2630 the advertiser may be associated with one or more keywords, categories, and/or other information. For example a keyword and/or category may be selected by an advertiser, or may be associated with an advertiser based on activities of an advertiser and/or persons associated with an advertiser and/or other information provided during and/or after a registration process. Information associated with an advertiser may be stored in the database 2620 and may be used for purposes such as matching an advertiser to a request, a user, a guide, etc., determining and/or obtaining compensation from and/or for an advertiser, communicating with an advertiser, etc., as will be described further herein below. An advertiser may be associated with one or more guides. Registration and/or other information of an advertiser may be provided by a guide and/or other person. An advertiser may provide information of a resource which may be associated with the advertiser, and may provide access information for a resource.

An advertiser system may provide information of any type of content and/or other information which may be associated with sponsorship information. For example, audio, video, web pages, interactive games, software, etc., which might be sponsored by an advertiser, may be provided by an advertiser system such as the advertiser systems 2645, 2650.

The advertising server 2665 may be provided by a third party advertising service such as DoubleClick. An advertising server may provide advertisements approved and/or created by advertisers to publishers. In at least one embodiment, the advertising server 2665 provides advertisements to the search system 2630. Advertisements may be obtained from multiple advertising servers. Advertisements which are indicated in the database 2620 may be compared to advertisements provided by an advertising server. A URL, login ID and password, and/or other information associated with an advertising server may be stored in the database 2620. An advertiser may designate information of an advertising server which is to be used to provide advertisements. Multiple communication services may be associated with an advertising server and may allow a communication session to be established between an advertising server such as the advertising server 2665 and a user system, a guide system, an advertiser system, and/or the search system 2630. Multiple identifiers of an advertising server may be associated with each other. Information such as IM credential, an email address, a phone number, a URL, a username, etc., of an advertising server may be identified which may allow the search system 2630 to establish a communication session between an advertising server and a user system, a guide system, an advertiser system, a resource, and/or the search system 2630.

The search system 2630 may establish a communication session between any user system, guide system, or advertiser system using information indicated in the database 2620. For example, the user system 2635 may establish a voice communication session with the search system 2630, the search system 2630 may establish a voice communication session between the user system 2635 and the guide system 2605, and the search system 2630 may establish a voice communication session between the user system 2635 and the advertiser system 2650. While a voice communication session is used in this example, any type of communication session using one or more services such as SMS, EMS, MMS, email, IM, chat, web based communication, etc., may be established between any user system, guide system, advertiser system and/or resource and/or the search system 2630.

Information associated with a user, a guide, an advertiser, and/or a resource may be obtained in various ways. For example, a registration process may be performed using a web form provided by the search system 2630, and/or information may be obtained from an external database, and/or information may be obtained based on analysis of information indicated by a user, a guide, an advertiser, and/or a resource.

A 'profile' is one or more characteristics which may be associated with a number of individuals. A profile characteristic may include inherent, innate or anthropic characteristics associated with persons. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device, service, transaction and/or any information which might be associated with a user, a guide, an advertisement, a resource, and/or an advertiser.

As illustrated in FIG. 27, an exemplary subscriber record 2700 of which one or more may be associated with or resident in the database 2620 (FIG. 26) is provided. The subscriber record 2700 may include a subscriber record ID field 2705, a subscriber channel ID field 2710, a subscriber request ID field 2715, a subscriber list ID 2720, a subscriber keywords field 2725, a subscriber message ID field 2730, a subscriber advertisement ID field 2735, a subscriber action trigger ID field 2740, and a subscriber action ID field 2745. Any user may be a subscriber or member of a subscription or distribution or communication group The subscriber record ID field 2705 includes an identifier of a user which is preferably unique and is preferably used consistently. The subscriber record ID serves to distinguish a subscriber record associated with a subscriber from a subscriber record associated with a different subscriber. Any number of characters, numbers, and/or other indicators may be used to indicate a subscriber record ID. In at least one embodiment, a username associated with a user is included in the subscriber record ID field 2705. In at least one embodiment, a phone number associated with a user device is indicated in the subscriber record ID field. Using the example in FIG. 27, 'Subscriber2' is the subscriber record ID associated with the subscriber record 2700.

The subscriber channel ID field 2710 may include information of a number of communication services associated with a user. Any information which may be used to establish communication with a user may be indicated in the subscriber channel ID field 2710. For example, a telephone number, an email address, an IM credential, a URL, a username, a password, and/or other communication information may be indicated in the subscriber channel ID field 2710. Using the example in FIG. 27, the phone number '317.555.2204' and the email 'usertom@chacha.com' are associated with the user ID 'Subscriber2'.

The subscriber request ID field 2715 may include information of a number of requests associated with a user. A subscriber request ID may be, for example, a pointer to a request record such as the request record 3300 (FIG. 33). If a user submits a request, a request ID may be added to the subscriber request ID field 2715. Using the example illustrated in FIG. 27, '317.555.2204, 12.12.08, 30 Jan. 2011' and 'usertom@chacha.com, 12.48.08, 31 Jan. 2011' are associated with 'Subscriber2'.

The subscriber list ID field 2720 may include information of a number of subscription groups associated with a user. Content of the subscriber list ID field 2720 may be used to obtain information of a subscription list associated with a user. For example, the subscriber list ID field 2720 may include an identifier of a subscription list record such as the subscription list record 3600 (FIG. 36). In at least one embodiment, if a user elects to opt-in to a subscription list, an indicator of the subscription list may be added to the subscriber list ID field 2720. Using the example in FIG. 27, 'Western Kentucky University Caving Club' and 'ChiChiChi Legal Society' are associated with 'Subscriber2'.

The subscriber keywords field 2725 may include information of a number of keywords associated with a user. A keyword associated with a user may be determined in various ways. A user may select a keyword. Keywords may be obtained based on queries, responses, advertisements, etc., associated with a user. A guide may be used to select a keyword associated with a user. Using the example in FIG. 27, the keywords 'pizza' and 'dancing' are associated with 'Subscriber2'.

The subscriber message ID field 2730 may include information of messages delivered to a user based on membership in a subscription list. For example, if a user joins or opts-in to a subscription list, and a message is transmitted to any or all members of the distribution list, an identifier of the message may be recorded in the subscriber message ID field 2730. Any number of messages may be indicated in the subscriber message ID field 2730. Content of the subscriber message ID field 2730 may be used to retrieve information using a record such as the subscriber message record 3200 (FIG. 32). Using the example in FIG. 27, 'WKUCC14', 'WKUCC15', 'CCCLS3' and 'CCCLS4' are associated with 'Subscriber2'.

The subscriber advertisement ID field 2735 may include information of a number of advertisements associated with a user. For example, if an advertisement is provided to a user and/or if a user responds to an advertisement, an indicator of the advertisement may be recorded in the subscriber advertisement ID field 2735. Content of the subscriber advertisement ID field 2735 may be used to retrieve information of an advertisement using a record such as the advertisement record 3000a (FIG. 30). Using the example in FIG. 27, 'Advert1' and 'Advert2' are associated with 'Subscriber2'.

The subscriber action trigger ID field 2740 may include information of a number of trigger events associated with a user. If a user takes an action which is indicated in the subscriber action trigger ID field 2740, an associated response indicated in the subscriber action ID field 2745 may be performed. An action may be added to and/or removed from the subscriber action trigger ID field 2740 based on various criteria. For example, if a user receives a particular advertising message, an action trigger may be associated with the user as further described in U.S. application Ser. No. 12/568,293 entitled "METHOD AND SYSTEM FOR MANAGING USER INTERACTION" inventor Scott A. Jones, et al., filed Sep. 29, 2009. Using the example in FIG. 27, the triggers keyword 'casavas', keyword 'STOP WKUCC', keyword 'STOP CCCLS', keyword 'wilgo', and keyword 'notgoin' are the trigger actions associated with the user 'Subscriber2'. While keyword responses are used for illustration, any type of response by a user may be an action trigger.

The subscriber action ID field 2745 may include information of an action to be taken responsive to a trigger identified in the subscriber action trigger ID field 2740. Any sort of action may be initiated responsive to an action identified in the subscriber action trigger ID field 2740. In at least one embodiment, a detection of a trigger event may cause a corresponding action to be initiated by the search system 2630 (FIG. 26). For example, detection of the keyword 'wilgo' in a message received from the user 'Subscriber2' may cause a command associated with the URL <<'http://wkucc.wku.edu/calendar/respond=yes'>> to be executed. Likewise, detection of the keyword 'STOPWKUCC' in a message from the user 'Subscriber2' may cause 'Subscriber2' to be removed from the 'WKUCC' distribution list.

As illustrated in FIG. 28, an exemplary guide record 2800 is provided, of which one or more may be associated with or resident in the database 2620 (FIG. 26). The guide record 2800 may include a guide record ID field 2805, a guide channel ID field 2810, a guide request ID field 2815, a guide rating field 2820, a guide category ID field 2825, a guide keyword ID field 2830, a guide result ID field 2835, and a guide profile information field 2840.

The guide record ID field 2805 preferably contains a unique identifier of a guide, which is preferably used consistently. For example, in at least one embodiment, the guide ID field 2805 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 28, 'Guide6' is the guide ID associated with the guide record 2800.

The guide channel ID field 2810 may include information of a device and/or service associated with a guide. Content of the guide channel ID field 2810 may be modified based on actions of a guide. If a guide establishes communications with the search system 2630 (FIG. 26) using a device and/or service information regarding the device and/or service may be included in the guide channel ID field 2810. Any type of communication service and/or system may be indicated in the guide channel ID field 2810. For example, a username and/or password associated with a guide may be indicated in the guide channel ID field 2810. Communication services such as Instant Messaging (IM), e-mail, SMS, MMS, EMS, telephone, wireless or wired communication, etc., may be indicated in the guide channel ID field 2810. A telephone number, an email address, an IM provider and login ID, a keyword(s) associated with a service, an IP address, a MAC address, etc., may be indicated in the guide channel ID field 2810. Using the example illustrated in FIG. 28, the email 'guidebob@chacha.com', and the phone number '270.244.2444' are associated with the guide 'Guide6'.

The guide request ID field 2815 may include information of a number of requests associated with a guide. Content of the guide request ID field 2815 may be modified based on actions of a guide. If a guide produces a search result responsive to a search request, an identifier of the search request may be included in the guide request ID field 2815. A rating and/or ranking associated with a search request associated with a guide may affect compensation for a guide. A request may be associated with a guide based on a vote cast by a guide regarding items associated with the search request. Using the example illustrated in FIG. 28, the requests '317.555.2204, 12.12.08, 30 Jan. 2011', and '270.455.3301, 12.48.08, 13 Feb. 2011' are associated with 'Guide6'. This may indicate that 'Guide6' has responded to the requests '317.555.2204, 12.12.08, 30 Jan. 2011', and '270.455.3301, 12.48.08, 13 Feb. 2011'.

The guide rating field 2820 may include information of a number of ratings associated with a guide. A guide may perform various types of tasks, and may be rated regarding the tasks. For example, a guide may be rated to perform tasks such as transcribing a query from voice to text, responding to requests regarding a particular advertiser or merchant, searching for information, etc. As illustrated in FIG. 28, 'Guide6' has the rating 'Expedite-Master' and 'Concierge—Amazin'. This may indicate that 'Guide6' may be a preferred guide for performing a query processing task, and may be able to act as a concierge guide for interactions with the merchant 'Amazin'. Any guide may perform any type of task.

The guide category ID field 2825 may include information of a number of categories associated with a guide. Content of the guide category ID field 2825 may be modified based on actions of a guide. A guide and/or other person may select a category and/or keyword associated with a guide. A category may be associated with a guide based on testing of a guide. A category may be associated with a guide based on an affiliate group associated with a guide. For example, if a guide has chosen to be affiliated with affiliate groups associated with a type of music, a category associated with the type of music might be associated with the guide. A category associated with a guide may be used to select items which are to be presented to the guide. For example, if a search request is associated with a category, a guide with a high rating associated with the category may be more likely to be selected to respond to the request. Using the example illustrated in FIG. 28, the categories 'shopping>music>jazz', 'entertainment>dining', 'recreation>outdoors', and 'sports>professional>bass fishing' are associated with 'Guide6'.

The guide keyword ID field 2830 may include information of a topic or "interest" or keyword associated with a guide. Content of the guide keyword ID field 2830 may be modified based on actions of a guide. A person may select an interest associated with a guide. For example, a guide may select a topic or keyword to be associated with the guide during a registration process. A topic may be associated with a guide based on testing of a guide. For example, a guide may be required to demonstrate knowledge of a category and/or topic in order to be associated with the topic. Content indicated in the guide keyword ID field 2830 may be compared to content of a search request in order to determine a ranking of a guide for responding to a search request. Using the example illustrated in FIG. 28, the topics 'John coltrane', 'thelonius monk', 'vegan', 'fast food', 'spelunking', 'hiking', 'oregon' and 'utah' are associated with 'Guide6'. This may for example indicate that 'Guide6' has indicated an interest in those topics.

The guide result ID field 2835 may include information of a number of results associated with a guide. Content of the guide result ID field 2835 may be modified based on actions of a guide. If a guide produces a search result responsive to a search request, an identifier of the search result may be included in the guide result ID field 2835. A rating and/or ranking associated with a search result associated with a guide may affect compensation for a guide. An action of a guide such as voting, rating, selecting, etc., of a search result may cause a result to be associated with a guide. Likewise a usage indicator associated with a search result provided by a guide may affect a rating and/or ranking associated with a guide. Using the example illustrated in FIG. 28, the results 'result1g6' and 'result2g6' are associated with 'Guide6'.

The guide profile information field 2840 may include information of a number of profile characteristics associated with a guide. Content of the guide profile information field 2840 may be modified based on actions of a guide. For example, if a guide provides profile information as part of a registration process, such as demographic, geographic, or personality information, the guide profile information field 2840 may include that information. Likewise, activities of a guide such as testing, polling, membership in a subscription list, etc., may be used to determine profile information directly and/or indirectly. Using the example illustrated in FIG. 28, 'Geoprofileg6', 'Demoprofileg6' and 'Persprofileg6' are associated with 'Guide6'.

As illustrated in FIG. 29, an exemplary advertiser record 2900 of which one or more may be associated with or resident in the database 2620 (FIG. 26) is provided. The advertiser record 2900 may include an advertiser record ID field 2905, an advertiser channel ID field 2910, an advertiser advertisement ID field 2915, and an advertiser category ID field 2920.

The advertiser record ID field 2905 may include an identifier of an advertiser which is preferably unique and is preferably used consistently. An advertiser record ID serves to distinguish an advertiser record associated with an advertiser from an advertiser record associated with a different advertiser. Any number of characters, numbers, and/or other indicators may be used to indicate an advertiser record ID. In at least one embodiment, a username associated with an advertiser is included in the advertiser record ID field 2905. In at least one embodiment, a phone number associated with an advertiser device is indicated in the advertiser record ID field. Using the example in FIG. 29, 'Advertiser1' is the advertiser record ID associated with the advertiser record 2900.

The advertiser channel ID field 2910 may include information of a number of communication services associated with an advertiser. Any information which may be used to establish communication with an advertiser may be indicated in the advertiser channel ID field 2910. For example, a telephone number, an email address, an IM credential, a URL, a username, a password, and/or other communication information may be indicated in the advertiser channel ID field 2910. Using the example in FIG. 29, the phone number '270.331.2224', the email 'advertiser1@chamail.com', and the URL 'orders.advertiser1.com' are associated with 'Advertiser1'.

The advertiser advertisement ID field 2915 may include information of a number of advertisements associated with an advertiser. An advertiser advertisement ID may be, for example, a pointer to an advertisement record such as the advertisement record 3000*b* (FIG. 30). An advertisement may be provided directly by a merchant, by an advertising agency or service, etc. Using the example in FIG. 29, 'Advert1', 'Advert3', and 'Advert5' are associated with 'Advertiser1'.

The advertiser category ID field 2920 may include information of a number of categories associated with an advertiser. Content of the advertiser category ID field 2920 may be modified based on actions of an advertiser. An advertiser and/or other person may select a category and/or keyword associated with an advertiser. For example, a guide, a system administrator and/or a user might select a category associated with an advertiser. A category associated with an advertiser may be used to select items which are to be presented to a person such as a guide, a user, etc. For example, if a search request is associated with a category, an advertisement of an advertiser with a high rating associated with the category may be more likely to be selected be presented responsive to the request. Using the example illustrated in FIG. 29, the categories 'recreation>outdoors', 'sports>equipment', and 'fitness>training' are associated with 'Advertiser1'.

As illustrated in FIG. 30, an exemplary advertisement record table 3002 is provided. The advertisement record table 3002 may be composed of a number of advertisement records 3000 of which one or more may be associated with or resident in the database 2620 (FIG. 26). The advertisement records 3000 may include an advertisement record ID field 3005, an advertisement access information field 3010, an advertisement category ID field 3015, an advertisement profile ID field 3020, an advertisement usage information field 3025, an advertisement action trigger ID field 3030, an advertisement action ID field 3035, and an advertisement advertiser ID field 3040. An advertisement record may indicate any type of advertisement.

The advertisement record ID field 3005 may include an identifier of an advertisement which is preferably unique and is preferably used consistently. An advertisement record ID serves to distinguish an advertisement record associated with an advertisement from an advertisement record associated with a different advertisement. Any number of characters, numbers, and/or other indicators may be used to indicate an advertisement record ID. In at least one embodiment, a name selected by an advertiser associated with an advertisement is included in the advertisement record ID field 3005. Using the example in FIG. 30, 'Advert2' is the advertisement record ID associated with the advertisement record 3000b.

The advertisement access information field 3010 may include information regarding how an advertisement may be accessed. For example, the advertisement access information may indicate a server, URL, password, etc., which may be used to obtain information of an advertisement. Using the example in FIG. 30, the URL <<'https://repubs.adtwo.adsrvr2.net'>> is associated with the advertisement record 3000b.

The advertisement category ID field 3015 may include information of a number of categories associated with an advertisement. Content of the advertisement category ID field 3015 may be modified based on actions of an advertiser. An advertiser and/or other person may select a category and/or keyword associated with an advertisement. For example, a guide and/or a user might select a category associated with an advertisement. A category associated with an advertisement may be used to select items which are to be presented to a person such as a guide, a user, etc. For example, if a search request is associated with a category, an advertisement with a high rating associated with the category may be more likely to be selected be presented responsive to the request. Using the example illustrated in FIG. 30, the category 'society>politics' is associated with the advertisement record 3000b.

The advertisement profile ID field 3020 may include information of a profile associated with an advertisement. Profile information associated with an advertisement may be used to select an advertisement. For example, if a query is associated with a profile, a match between a profile associated with the query and profile information associated with an advertisement may be used to select an advertisement to be provided responsive to the query. In at least one embodiment, a location associated with an advertisement may affect the probability that an advertisement will be provided responsive to a request which is not associated with the location. Using the example in FIG. 30, 'Profile1' is associated with 'Advert1' and 'Advert2'.

The advertisement usage information field 3025 may include information regarding usage of an advertisement. For example, if an advertisement has been provided to a user, information regarding a number of times the advertisement has been supplied may be indicated in the advertisement usage information field 3025. Any type of usage indication may be provided. Using the example in FIG. 30, 'served 1212' may indicate that 'Advert1' associated with the advertisement record 3000a has been served to a user one thousand two hundred and twelve times. Usage information may be used for various purposes such as determining efficacy of advertising, compensation for a guide, compensation due to a publisher, etc.

The advertisement action trigger ID field 3030 may include information of a response or trigger associated with an advertisement. For example, if an advertisement includes a keyword which may be used to trigger an action responsive to a message including the keyword, the keyword may be indicated in the advertisement action trigger ID field 3030. Using the example in FIG. 30, the action trigger <<keyword 'casavas'>> is associated with the advertisement 'Advert1'.

The advertisement action ID field 3035 may include information of an action which is to be associated with a user responsive to an advertisement being provided to the user. Using the example illustrated in FIG. 30, if the advertisement 'Advert1' is presented to a user, the action 'connect to 270.999.9999' may be executed responsive to a message from the user including the keyword 'casavas'.

The advertisement advertiser ID field 3040 may include information of an advertiser associated with an advertisement. For example, the advertisement advertiser ID field 3040 may include a pointer to a number of advertiser records such as the advertiser record 2900 (FIG. 29). Using the example in FIG. 30, 'Advertised' is associated with the advertisement 'Advert1'.

As illustrated in FIG. 31 an exemplary anchor user record 3100 of which one or more may be associated with or resident in the database 2620 (FIG. 26) is provided. The anchor user record 3100 (FIG. 31) may include an anchor user record ID field 3105, an anchor user channel ID field 3110, an anchor user request ID field 3115, an anchor user list ID field 3120, an anchor user payment information field 3125, and an anchor user profile information field 3130.

The anchor user record ID field 3105 may include an identifier of a user which is preferably unique and is preferably used consistently. An anchor user record ID serves to distinguish an anchor user record associated with an anchor user from an anchor user record associated with a different anchor user. Any number of characters, numbers, and/or other indicators may be used to indicate an anchor user record ID. In at least one embodiment, a username associated with a user is included in the anchor user record ID field 3105. In at least one embodiment, a phone number associated with a user device is indicated in the anchor user record ID field 3105. Using the example in FIG. 31, 'Anchor2' is the anchor user record ID associated with the anchor user record 3100.

The anchor user channel ID field 3110 may include information of a number of communication services associated with a user. Any information which may be used to establish communication with a user may be indicated in the anchor user channel ID field 3110. For example, a telephone number, an email address, an IM credential, a URL, a username, a password, and/or other communication information may be indicated in the anchor user channel ID field 3110. Using the example in FIG. 31, the phone number '212.555.2224', the email 'anchor2@chamail.com', and the user login 'anchor2' and the password 'anchor2pass' are associated with 'Anchor2'.

The anchor user request ID field 3115 may include information of a number of requests associated with a user. A user request ID may be, for example, a pointer to a request record such as the request record 3300 (FIG. 33). If a user submits a request, a request ID may be added to the anchor user request ID field 3115. Using the example illustrated in FIG. 31, the requests '212.555.2224, 11.25.09, 12 Apr. 2011' and 'anchor2@chamail.com, 12.48.08, 16 Apr. 2011' are associated with 'Anchor2'.

The anchor user list ID field 3120 may include information of a number of subscription lists associated with an anchor user. If a user creates a subscription list, an identifier of the subscription list may be indicated in the anchor user list ID field 3120. Content of the anchor user list ID field 3120 may, for example, be a pointer to a subscription list record such as the subscription list record 3600 (FIG. 36). Using the example in FIG. 31, 'Western Kentucky University Caving Club' and 'Bowling Green Party' are the subscription lists associated with the anchor user 'Anchor2'.

The anchor user payment information field 3125 may include information of payment methods. Any type of payment information such as a debit or credit card, payment system account, communication services account, etc., may be indicated in the anchor user payment information field 3125. Using the example in FIG. 31, 'Mastercard 123456789ABC' and 'PayPal Anchor2' are the payment information associated with the user 'Anchor2'. Content of the anchor user payment information field 3125 may be used to obtain payment from a user. In at least one embodiment, a user may not be required to provide payment for a subscription list if the user accepts inclusion of advertisements with messages delivered to users associated with the subscription list.

The anchor user profile information field 3130 may include information of a profile associated with a user. For example, an anchor user may be required to provide various profile information in order to register a subscription list. Profile information may be obtained in any suitable way. For example a user may fill out a web from, may designate a resource, etc., which may be used to provide geographic, demographic, personality, affiliation, and/or other types of profile information. Using the example in FIG. 31, the profiles 'Geoprofileau2', 'Demoprofileau2', and 'Persprofileau2' are associated with 'Anchor2'.

As illustrated in FIG. 32 an exemplary subscriber message record 3200 of which one or more may be associated with or resident in the database 2620 (FIG. 26) is provided. The subscriber message record 3200 may include a subscriber message record ID field 3205, a subscriber message access information field 3210, a subscriber message target information field 3215, a subscriber message usage information field 3220, a subscriber message action trigger ID field 3225, a subscriber message action ID field 3230, a subscriber message anchor ID field 3235, and a subscriber message content field 3240.

The subscriber message record ID field 3205 includes an identifier of a subscriber message which is preferably unique and is preferably used consistently. A subscriber message record ID serves to distinguish a subscriber message record associated with a subscriber message from a subscriber message record associated with a different a subscriber message. Any number of characters, numbers, and/or other indicators may be used to indicate a subscriber message record ID. In at least one embodiment, a name selected by an anchor user associated with a subscriber message is included in the subscriber message record ID field 3205. Using the example in FIG. 32, 'WKUCC15' is the subscriber message record ID associated with a subscriber message record 3200.

The subscriber message access information field 3210 may include information regarding how a subscriber message may be accessed. For example, subscriber message access information may indicate a server, URL, password, etc., which may be used to obtain information of a subscriber message. Using the example in FIG. 32, the URL <<'https://WKUCC15.msgserverchacha.com'>> is associated with the subscriber message 'WKUCC15'.

The subscriber message target information field 3215 may include information of a subscription list associated with a subscriber message. Content of the subscriber message target information field 3215 may be modified based on actions of a user. An anchor user may determine and/or invite members of a subscription list associated with a subscriber message. Target information associated with a subscriber message may be used to select items which are to be presented to a person such as a guide, a user, etc. For example, characteristics associated with members of the subscription list 'WKUCC' may be used to select an advertisement provided with the subscriber message 'WKUCC15'. In at least one embodiment, the subscriber message target information field 3215 may include a pointer to a record such as the subscription list record 3600 (FIG. 36).

The subscriber message usage information field 3220 may include information regarding usage of a subscriber message. For example, if a subscriber message has been provided to a subscription list, information regarding a number of times the subscriber message has been supplied may be indicated in the subscriber message usage information field 3220. Any type of usage indication may be recorded. Using the example in FIG. 32, 'served=60', 'response=50' may indicate that the subscriber message 'WKUCC15' was provided to sixty users, and that fifty users responded to the subscriber message. Usage information may be used for various purposes such as selecting an advertisement. For example, if a number of responses to a subscriber message are high, keywords, profile information, etc., associated with the subscriber list may be given a higher weighting in selection of an item such as an advertisement, search result, guide, etc.

The subscriber message action trigger ID field 3225 may include information of a response or trigger or reaction associated with a subscriber message. For example, if a subscriber message includes a keyword which may be used to trigger an action responsive to a message including the keyword, the keyword may be indicated in the subscriber message action trigger ID field 3225. Using the example in FIG. 32, the keywords 'wilgo' and 'notgoin' are associated with the subscriber message record ID 'WKUCC15'

The subscriber message action ID field 3230 may include information of an action which is to be associated with a user responsive to a subscriber message being provided to the user. In at least one embodiment, the subscriber message action trigger ID field 3225 and the subscriber message action ID field 3230 may be linked by, for example, a pointer. Using the example illustrated in FIG. 32, if the subscriber message 'WKUCC15' is presented to a user, the action <<'http://wkucc.wku.edu/calendar/respond=yes'>> may be executed responsive to a message from the user including the keyword 'wilgo' and the action <<'http://wkucc.wku.edu/calendar/respond=no'> may be executed responsive to a message from the user including the keyword 'notgoin'. This may, for example, allow a subscriber to indicate whether the subscriber will participate in an activity.

The subscriber message anchor ID field 3235 may include information of an anchor user associated with a subscriber message. For example, the subscriber message anchor ID field 3235 may include a pointer to a number of user records such as the anchor user record 3100 (FIG. 31). Using the example in FIG. 32, 'Anchor2' is associated with the subscriber message 'WKUCC15'.

The subscriber message content field 3240 may include information of a communication service and/or medium which may be used to deliver a subscriber message. For example, a subscriber list may include information of users who may be associated with multiple types of communication services. A subscriber message may be designated to be delivered using any or all of the associated services as available. Using the example in FIG. 32, the services 'IM' and 'SMS' have been associated with 'WKUCC15' which may indicate that a subscriber message may be delivered by SMS and IM services which are associated with subscribers of the subscriber message record ID 'WKUCC'

As illustrated in FIG. 33, an exemplary request record 3300 of which one or more may be associated with or resident in the database 2620 (FIG. 26) is provided. A request record may be used to record information of processing a request and/or providing a search result and/or other item to a user responsive to a request. The request record 3300 may include a request record ID field 3305, a request user ID field 3310, a request category ID field 3315, a request guide ID field 3320, a request raw query ID field 3325, a request keyword ID field 3330, a request succinct query ID 3335, a request result ID 3340, and a request advertisement ID field 3345.

The request record ID field 3305 includes an identifier of a request which is preferably unique and is preferably used consistently. A request record ID serves to distinguish a request record associated with a request from a request record associated with a different request. Any number of characters, numbers, and/or other indicators may be used to indicate a request record ID. In at least one embodiment, user ID and a time stamp with a request is included in the request record ID field 3305. Using the example in FIG. 33, '317.555.2204, 12.12.08, 30 May 2011' is the request record ID associated with the request record 3300.

The request user ID field 3310 may include an identifier of a number of users associated with a request. For example, the request user ID field 3310 may include a pointer to a user record such as the subscriber record 2700 (FIG. 27) which may be used to obtain information regarding a user. Using the example in FIG. 33, the user 'Subscriber2' is associated with the query '317.555.2204, 12.12.08, 30 May 2011'.

The request category ID field 3315 may include an identifier of a category associated with a request. A category may be associated with a request in various ways. For example, a category may be associated with a request based on an automated and/or human assisted analysis or evaluation or interpretation of information of a query such as a keyword, a profile, a history, a user, etc., which may be used to determine a number of categories to be associated with a query. In at least one embodiment, an automated analysis may be performed, followed by a human assisted analysis. An ambassador guide, who may be a specialist in query processing, may be assigned to a request in order to determine a category associated with a request. Using the example in FIG. 33, the category 'BizDA>Restaurants' is associated with the request '317.555.2204, 12.12.08, 30 May 2011'.

The request guide ID field 3320 may include information of a number of guides associated with a request. Any number of guides may be associated with a request. For example a guide may be associated with a request if the guide is selected to respond to the request, selects the request, reviews the request, etc. Using the example in FIG. 33, 'Guide6' is associated with '317.555.2204, 12.12.08, 30 May 2011'. This may indicate that 'Guide6' has expedited or processed or modified the request '317.555.2204, 12.12.08, 30 May 2011', and the search system 2630 (FIG. 26) has provided a search result responsive to the request.

The request raw query ID field 3325 (FIG. 33) may include information of a raw query associated with a request. A "raw query" is any information provided by a user. A guide may process a raw query, which may assist in providing a search result. Any type of information such as audio, video, image, text, or other media may be indicated in the raw query ID field 3325. Using the example in FIG. 33, 'need the number for Greeks Pizza' is the raw query ID associated with the request '317.555.2204, 12.12.08, 30 May 2011'.

The request keyword ID field 3330 may include information of a number of keywords associated with a request. A keyword may be determined or selected or synthesized or established automatically and/or using the assistance of a guide. A keyword may be an explicit and/or implicit element of a raw query and/or a succinct query. A keyword may include any number of words up to and including the entire content of a query. Using the example in FIG. 33, the keywords 'pizza', 'number', and 'Greeks Pizza' are associated with the request '317.555.2204, 12.12.08, 30 May 2011'.

The request succinct query ID field 3335 may include information of a succinct query associated with a request. A "succinct query" is a query which is based at least in part on a raw query provided by a user. A succinct query may be used to more efficiently index a raw query to a resource, a guide, an advertisement, and/or other information. An ambassador guide or expediter may generate, synthesize, and/or select a succinct query to be associated with a request, and/or an automated process may associate a succinct query with a request. Using the example in FIG. 33 the succinct query 'Business Directory Assistance: Greeks Pizza: 42104' is the succinct query associated with the request '317.555.2204, 12.12.08, 30 May 2011'.

The request result ID field 3340 may include information of a number of results associated with a request. For example, text, a URL, audio, video, images, and/or other information which may provide information associated with a request may be indicated in the request result ID field 3340. Any number of results may be associated with a request. In at least one embodiment, a text message which indicates a precise, succinct, or direct response to a user request may be indicated in the request result ID field 3340. Using the example in FIG. 33, 'Greeks Pizza Ph. 270-555-2222 101W 11th Street Bowling Green Ky. 42104' is the result associated with the request '317.555.2204, 12.12.08, 30 May 2011'.

The request advertisement ID field 3345 may include information of a number of advertisements associated with a request. For example, an interstitial, trailer, and/or follow-on type advertisement may be associated with a request. In at least one embodiment, association of an advertisement with a request may cause an action trigger and an action to be associated with a user. Using the example illustrated in FIG. 33, the advertisements 'Advert1' and 'Advert2' are associated with the request '317.555.2204, 12.12.08, 30 Jan. 2011', which may cause the action trigger keyword='casavas' and the action 'connect 270.999.9999' to be associated with the user 'Subscriber2' (FIG. 27).

As illustrated in FIG. 34, an exemplary category record 3400 is provided, of which one or more may be associated with or resident in the search database 2620 (FIG. 26). The category record 3400 may include a category record ID field 3405, a category advertisement ID field 3410, a category advertisement rating field 3415, a category keyword ID field 3420, a category related category ID field 3425, a category resource ID field 3430, a category resource rating field 3435, a category guide ID field 3440, and a category guide rating field 3445.

The category record ID field 3405 contains an identifier of a category, which is preferably unique and preferably used consistently. For example, in at least one embodiment, the category record ID field 3405 can include a randomly generated numerical code and/or a string indicating a category. A category record ID serves to distinguish a category record associated with a category from a category record associated with another category. Although particular examples of identifiers are described herein, other types of identifiers uniquely indicating a category may be utilized without departing from the spirit and scope of the embodiments herein. In at least one embodiment, the category record ID is a text string. A category record ID may include a category description, a random number, and/or any other information which uniquely identifies a category. Using the example in FIG. 34, 'recreation>outdoors' is the category record ID associated with the category record 3400.

The category advertisement ID field 3410 may include information of an advertisement associated with a category. Content of the category advertisement ID field 3410 may be used to select an advertisement to be associated with a request. For example, a ranking of an advertisement associated with a category may affect the probability that the advertisement will be presented to a user responsive to a request associated with the category. Using the example in FIG. 34, 'Advert3', 'Advert1', and 'Advert6' are associated with the category 'recreation>outdoors'.

The category advertisement rating field 3415 may include information of ratings of an advertisement associated with a category. Content of the category advertisement rating field 3415 and the category advertisement ID field 3410 may be linked by, for example, a pointer. Any type of rating information may be indicated in the category advertisement rating field 3415. A higher advertisement rating may increase the probability that an advertisement will be selected to be associated with a request. For example, a list of advertisements may be presented to a guide in an order based at least in part on an advertisement rating associated with a category associated with a request. Using the example in FIG. 34, 'Advert3' has a rating of 'B−', Advert1' has a rating of 'A', and 'Advert6' has a rating of 'B' associated with the category 'recreation>outdoors'. Any rating system may be utilized within the scope of the disclosure herein. A rating may be based on factors such as guide ratings, user ratings, advertiser ratings, information of an external database, time, etc. A ranking of an advertisement may be determined based on ratings associated with an advertisement and information associated with a request such as a keyword, a category, a profile, geographic location information, a user, a guide, etc. A selection of an advertisement may be done automatically and/or using the assistance of a person.

The category keyword ID field 3420 may include information of a topic or keyword or subject associated with a category. Content of the category keyword ID field 3420 may be used to associate a category with a request. For example, text of a raw query and/or a structured query may be compared to any or all of the content of the category keyword ID field 3420 to rate and/or rank a category which is associated with a query. In at least one embodiment, a match between keywords of a query and keywords associated with a category may be used to select a category to be associated with the query. A ranking of a category may affect an order in which a category is presented responsive to a query. Using the example illustrated in FIG. 34, the keywords 'spelunking', 'caving', 'camping' and 'scuba gear' are associated with the category 'recreation>outdoors'. The category 'recreation>outdoors' may receive a high ranking associated with a query including any or all of the keywords identified in the category keyword ID field 3420.

The category related category ID field 3425 may include information of a related category associated with a category. Content of the category related category ID field 3425 may be used to associate a category with a request. For example, text of a query may be compared to any or all of the content of the topics and/or interests associated with a category identified in the category related category ID field 3425 to rate and/or rank a category. Such ranking or rating information may affect the order in which a category is presented and/or selected responsive to a request. Using the example illustrated in FIG. 34, 'shopping>camping' and 'travel>camping' are associated with 'recreation>outdoors'. Related categories may be associated with a category in various ways. In at least one embodiment, a system administrator may associate a related category with a category. In at least one embodiment, a guide may recommend a related category to be associated with a category and/or a voting and/or review process may be utilized to approve or reject a recommended addition. Content of the related category ID field 3425 may be used to link items associated with the related category to a query associated with a category, which may allow a broader and/or larger selection of items to be ranked for various purposes.

The category resource ID field 3430 may include information of a resource associated with a category. Content of the category resource ID field 3430 may be used to select a resource to be associated with a request. Using the example in FIG. 34, the resources 'rangerslist.com', 'survivalistorg', and 'northwoods.net' are associated with the category 'recreation>outdoors'. In at least one embodiment, information of resources associated with a category may be provided to a generalist and/or specialist guide selected to respond to a request.

The category resource rating field 3435 may include information of ratings of a resource associated with a category. Content of the category resource rating field 3435 and the category resource ID field 3430 may be linked by, for example, a pointer. Any type of rating information may be indicated in the category resource rating field 3435. A higher resource rating may increase the probability that a resource will be selected to be associated with a request. For example, a list of resources may be presented to a guide in an order based at least in part on a resource rating associated with a category associated with a request. Using the example in FIG. 34, 'rangerslist.com' has a rating of '9', 'survivalistorg' has a rating of '8' and 'northwoods.net' has a rating of '5'. Any rating system may be utilized within the scope of this disclosure. A rating may be based on factors such as guide ratings, user ratings, advertiser ratings, information of an external resource, time, etc. A ranking of a resource may be determined based on ratings associated with a resource and information associated with a request such as a keyword, a category, a profile, geographic location information, a user, a guide, etc. Selection of a resource may be done automatically and/or using the assistance of a guide.

The category guide ID field 3440 may include information of a guide associated with a category. Content of the category guide ID field 3440 may be used to select a guide. Using the example in FIG. 34, 'Guide6', 'Bob Smith', and 'Dave Green' are associated with 'recreation>outdoors'.

The category guide rating field 3445 may include information of ratings of a guide associated with a category. Content of the category guide rating field 3445 and the category guide ID list field 3440 may be linked by, for example, a pointer. Any type of rating information may be indicated in the category guide rating field 3445. A higher guide rating may increase the probability that a guide will be selected. For example, a list of guides may be presented to a user in an order based at least in part on a guide rating associated with a category associated with a request, or a highly ranked guide may be notified first of a request. Using the example in FIG. 34, 'Guide6' has a rating of 'Master', 'Bob Smith' has a rating of 'Apprentice', and 'Dave Green' has a rating of 'Pro'. This may indicate for example that 'Guide6' may be more likely to be selected to respond to a request associated with the category 'recreation>outdoors'. Any rating system may be utilized within the scope of this disclosure. A rating may be based on factors such as guide ratings, user ratings, advertiser ratings, data obtained from a proprietary database, time, etc.

A ranking of a guide may be determined based on ratings associated with a guide and information associated with a request such as a keyword, a category, a profile, geographic location information, a user, a guide, etc. A selection of a guide may be done automatically and/or using the assistance of a person, such as a guide.

As illustrated in FIG. 35, an exemplary profile record 3500 is provided, of which one or more may be associated with or resident in the database 2620 (FIG. 26). The profile record 3500 may include a profile record ID field 3505, a profile demographic information field 3510, a profile geographic information field 3515, a profile personality information field 3520, a profile user ID field 3525, and a profile user rating field 3530.

The profile record ID field 3505 contains an identifier of a profile, which is preferably unique and preferably used consistently. For example, in at least one embodiment, the profile record ID field 3505 can include a randomly generated numerical code and/or a string indicating a profile. A profile record ID serves to distinguish a profile record associated with a profile from a profile record associated with other profiles. Although particular examples of identifiers are described herein, other types of identifiers uniquely indicating a profile may be utilized without departing from the spirit and scope of the embodiments. In at least one embodiment, the profile record ID is a text string. A profile record ID may include a profile description, a random number, and/or any other information which uniquely identifies a profile. Using the example in FIG. 35, 'Profile1' is the profile record ID associated with the profile record 3500.

The profile demographic information field 3510 may include information of a demographic parameter or characteristic associated with a profile. For example, age, gender, race, etc., may be indicated in the profile demographic information field 3510. Using the example in FIG. 35, '18 to 25 yearolds' is associated with 'Profile1', which may indicate that a user between eighteen and twenty-five years of age may have a higher rating and/or ranking associated with 'Profile1'.

The profile geographic information field 3515 may include information of a location or geographic parameter associated with a profile. For example, any type of location information such as GPS coordinates, names of locations, postal codes, street addresses, etc., may be indicated in the profile geographic information field 3515. Using the example in FIG. 35, 'Zip 42104' and 'Zip 42220, 40205' are associated with 'Profile1', which may indicate that a user within those postal codes may have a higher ranking associated with 'Profile1'.

The profile personality information field 3520 may include information of a personality or affiliation parameter associated with a profile. For example, a personal preference, an affiliation, psychometric information, etc., may be indicated in the profile personality information field 3520. Using the example in FIG. 35, 'nature lover' and 'republican' are associated with 'Profile1', which may indicate that a user who enjoys the outdoors and is affiliated with the Republican Party may have a higher ranking associated with 'Profile1'.

The profile user ID field 3525 may include information of a user associated with a profile. Content of the profile user ID field 3525 may be used to select a user. Using the example in FIG. 35, 'WKUCC members', 'Anchor2' and 'BBRV' are associated with the profile 'Profile1'.

The profile user rating field 3530 may include information of a rating of a user and/or group of users associated with a profile. In at least one embodiment, the content of the profile user rating field 3530 and the profile user ID field 3525 may be linked by, for example, a pointer. Any type of rating information may be indicated in the profile user rating field 3530.

In at least one embodiment, a higher rating may increase the probability that a user will be selected to receive an advertisement associated with a profile. For example, a user with a higher ranking associated with 'Profile1' may preferentially receive an advertisement associated with 'Profile1'. Using the example in FIG. 35, 'WKUCC members' has a rating of '80%', 'Anchor2' has a rating of '100%', and 'BBRV' has a rating of '20%'. This may indicate that a member of the subscription list 'WKUCC members' would more likely receive 'Advert1', which is targeted to 'Profile1' as indicated in the advertisement profile ID field 3020, of the advertisement record 3000a (FIG. 30) than a subscriber of 'BBRV'.

While a profile associated with users has been used for the purposes of illustration in FIG. 35, no limitation is implied thereby. Any item such as a guide, a resource, an advertisement, etc., may have a ranking and/or rating associated with a profile. Similarly an item may be targeted or delivered based on a ranking of the item for another item such as a keyword, a category, etc. A bid by an advertiser may influence a ranking of an item. For example, if two advertisements have a similar ranking for a profile, an advertisement with a higher bid may be preferentially selected.

As illustrated in FIG. 36, an exemplary subscription list record 3600 is provided, of which one or more may be associated with or resident in the database 2620 (FIG. 26). The subscription list record 3600 may include a subscription list record ID field 3605, a subscription list anchor ID field 3610, a subscription list message ID field 3615, a subscription list registration message field 3620, a subscription list user ID field 3625, a subscription list keyword ID field 3630, a subscription list demographic field 3635, a subscription list geographic field 3640, and a subscription list personality field 3645.

The subscription list record ID field 3605 contains an identifier of a subscription list, which is preferably unique and preferably used consistently. For example, in at least one embodiment, the subscription list record ID field 3605 can include a randomly generated numerical code and/or a string indicating a subscription list. A subscription list record ID serves to distinguish a subscription list record associated with a subscription list from a subscription list record associated with another subscription list. Although particular examples of identifiers are described herein, other types of identifiers uniquely indicating a subscription list may be utilized without departing from the spirit and scope of the embodiments herein. In at least one embodiment, the subscription list record ID is a text string. A subscription list record ID may include a subscription list description, a random number, and/or any other information which uniquely identifies a subscription list. Using the example in FIG. 36, 'WKUCC' is the subscription list record ID associated with the subscription list record 3600, and 'Western Kentucky University Caving Club' is a description associated with 'WKUCC'.

The subscription list anchor ID field 3610 may include information of an anchor user associated with a subscription list. Content of the subscription list anchor ID field 3610 may be used to obtain information of a user. For example, the user ID 'Anchor2' indicated in the subscription list anchor ID field 3610 may be used to obtain communication information indicated in the anchor user channel ID field 3110 (FIG. 31) of the anchor user record 3100, which may be used to send a message to 'Anchor2'. Using the example in FIG. 36, 'Anchor2' is an anchor user associated with the subscription list 'WKUCC'.

The subscription list message ID field 3615 may include information of a number of messages associated with a subscription list. Content of the subscription list message ID field 3615 may be used to obtain information of a message which has been associated with members of a subscription list. For example, the message ID 'WKUCC2' indicated in the subscription list message ID field 3615 may be used to obtain information indicated in a subscriber message record such as the subscriber message record 3200 (FIG. 32). For example, content of a subscriber message might be obtained, which might be used to determine a profile of the user 'Anchor2'. Using the example in FIG. 36, 'WKUCC1' and 'WKUCC2' are the messages associated with the subscription list 'WKUCC'. Any number of subscription list messages might be indicated in a subscription list record.

The subscription list registration messages field 3620 may include information of a number of standardized messages associated with a subscription list. Content of the subscription list registration message field 3620 may be used to designate messages which are to be delivered responsive to various actions associated with a subscription list. For example, one or more actions associated with a subscription list may cause a standardized message to be provided to a user. Using the example in FIG. 36, the standardized message 'WKUCC invite' might be delivered to a user when the user is invited to join the subscription list 'WKUCC'. Use of standardized messages may improve the uniformity of user experience, compliance with regulations, etc. Any number of messages might be indicated in the subscription list registration message field 3620.

The subscription list user ID field 3625 may include information of a number of users associated with a subscription list. Content of the subscription list user ID field 3625 may be used to designate users who may receive messages associated with a subscription list. For example, if a user is currently indicated in the subscription list user ID field 3625, the user may receive any new messages provided by an anchor user for distribution to the subscription list. Using the example in FIG. 36, a message designated by 'Anchor2' might be delivered to 'Subscriber2', 'Subscriber4', 'Subscriber9' and 'Subscriber10' using, for example, information indicated in user records. The subscriber list user ID field 3625 may, for example, indicate information such as a time at which a user subscribes and/or cancels a subscription to a subscription list. Any number of users might be indicated in the subscription list user ID field 3625.

The subscription list keyword ID field 3630 may include information of a number of keywords associated with a subscription list. Content of the subscription list keyword ID field 3630 may be used to identify, record, and/or indicate keywords associated with a subscription list. For example, if a user is indicated in the subscription list user ID field 3625, keywords indicated in the subscription list keyword ID field 3630 may be associated with the user. Using the example in FIG. 36, the keywords 'caving', 'spelunking', 'western kentucky university', 'bowling green', 'diving', 'adventure', and 'outdoors' are associated with 'WKUCC'. The subscription list keyword ID field 3630 may, for example, indicate keywords associated with a subscription list by an anchor user, an administrator, a user, analysis of subscriber messages, user messages, etc. Any number of keywords might be indicated in the subscription list keyword ID field 3630.

The subscription list demographic field 3635 may include information of a number of demographic parameters associated with a subscription list. Content of the subscription list demographic field 3635 may be used to identify demographic information associated with a subscription list. For example, if a user is indicated in the subscription list user ID field 3625, demographic information indicated in the subscription list demographic field 3635 may be associated with the user.

Using the example in FIG. 36, the demographic parameters 'college student', '18 to 25 yearolds', and 'GPA 2.5' are associated with 'WKUCC'. The subscription list demographic field 3635 may for example indicate parameters associated with a subscription list by an anchor user, an administrator, a user, etc. Any number of parameters might be indicated in the subscription list demographic field 3635.

The subscription list geographic field 3640 may include information of a number of geographic parameters associated with a subscription list. Content of the subscription list geographic field 3640 may be used to identify geographic information associated with a subscription list. For example, if a user is indicated in the subscription list user ID field 3625, geographic information indicated in the subscription list geographic field 3640 may be associated with the user. Using the example in FIG. 36, the geographic parameters 'Bowling Green', 'Warren County', and 'Kentucky' are associated with 'WKUCC'. The subscription list geographic field 3640 may for example indicate parameters associated with a subscription list by an anchor user, an administrator, a user, etc. Any number of parameters might be indicated in the subscription list geographic field 3640.

The subscription list personality field 3645 may include information of a number of personality parameters associated with a subscription list. Content of the subscription list personality field 3645 may be used to identify personality information associated with a subscription list. For example, if a user is indicated in the subscription list user ID field 3625, personality information indicated in the subscription list personality field 3645 may be associated with the user. Using the example in FIG. 36, the personality parameters 'curious', 'nature lover', and 'confident' are associated with 'WKUCC'. The subscription list personality field 3645 may for example indicate parameters associated with a subscription list by an anchor user, an administrator, a user, etc. Any number of parameters might be indicated in the subscription list personality field 3645.

Figure 37:
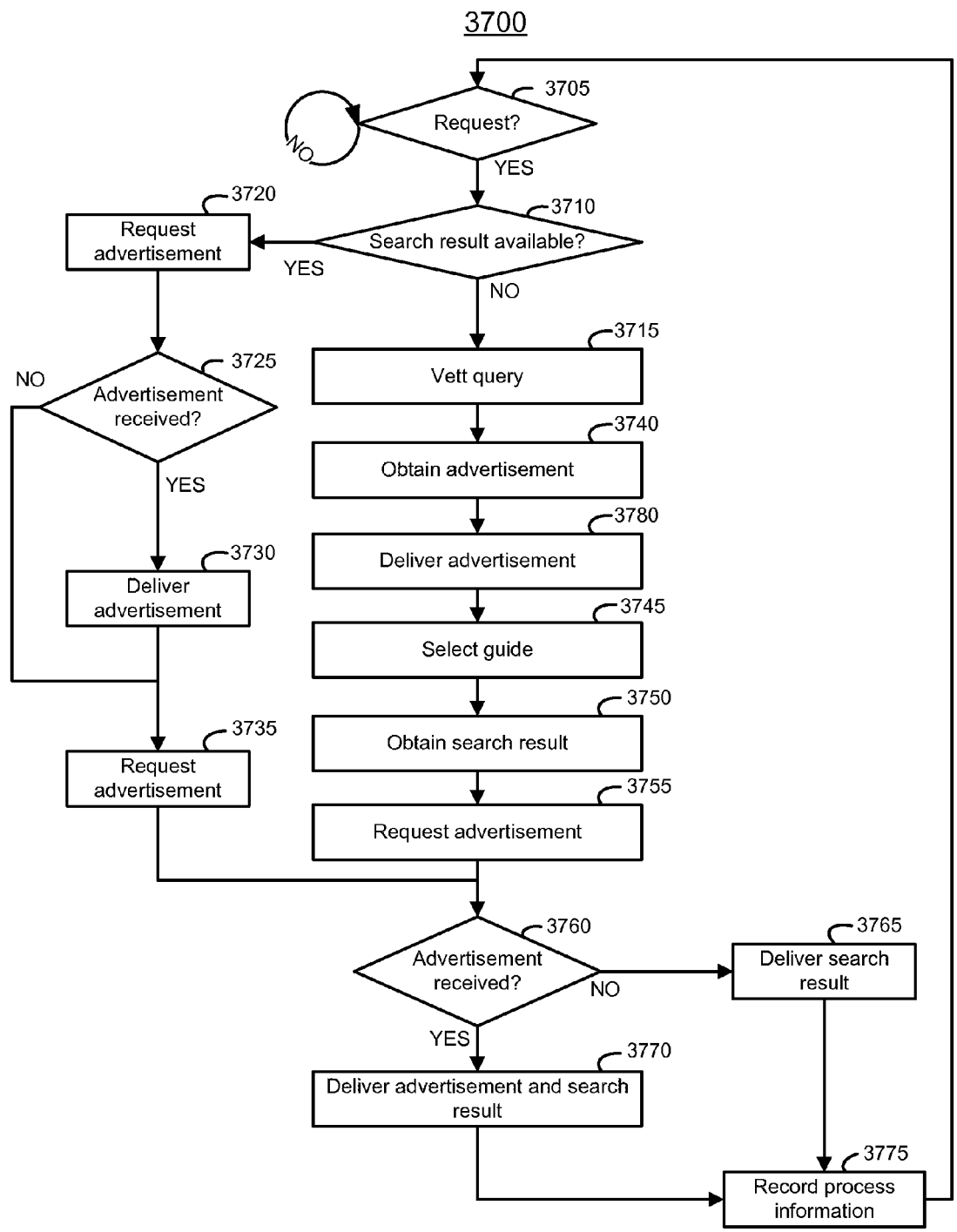
FIG. 37 is a flowchart of processing a request.

As illustrated in FIG. 37, a process 3700 for processing a request is provided. The process 3700 may be performed in whole or in part by any suitable element of the system 2600 (FIG. 26). In at least one embodiment, the process 3700 is operative on a server associated with the search system 2630.

In operation 3705 (FIG. 37), a determination is made as to whether a request is received. If it is determined in operation 3705 that a request is not received, control remains at operation 3705 and process 3700 continues. If it is determined in operation 3705 that a request is received, control is passed to operation 3710 and process 3700 continues.

The determination in operation 3705 may be made using various criteria. In at least one embodiment, if a message is received at a server associated with the search system 2630, it may be determined that a request is received. For example, if an email message, an SMS, EMS, and/or MMS message, an IM, an IP message, and/or a voice message is received at an address associated with the search system 2630 (FIG. 26), it may be determined that a request is received.

In operation 3710, a determination is made as to whether a search result is available. If in operation 3710 it is determined that a search result is not available, control is passed to operation 3715 and process 3700 continues. If in operation 3710 it is determined that a search result is available, control is passed to operation 3720 and process 3700 continues.

The determination in operation 3710 may be made using various criteria. In at least one embodiment, comparison to a database of previous queries, automated processing, processing by an external resource and/or any combination thereof may be applied to a query to determine if a search result is available.

In operation 3715, a query is vetted. Vetting may include various forms of analysis, modification, augmentation, interpretation, etc., which may be performed automatically and/or using the assistance of a person. Vetting preferable results in associating a structured query and/or a category with a request. Control is passed to operation 3740 and process 3700 continues.

In operation 3720, an advertisement is requested. An "interstitial ad" is an advertisement which is presented prior to a search result. In at least one embodiment, an interstitial advertisement is requested. In at least one embodiment, an interstitial ad may be targeted based on content of a search result identified in operation 3710. Information of a subscription list associated with a user submitting a request may affect selection of an advertisement. For example, a match between a location associated with an advertisement, and a location associated with a subscription list associated with a user submitting a request may affect a probability that the advertisement will be presented responsive to the request. Control is passed to operation 3725 and process 3700 continues.

In operation 3725, a determination is made as to whether an advertisement is received. If in operation 3725 it is determined that an advertisement is not received, control is passed to operation 3735 and process 3700 continues. If in operation 3725 it is determined that an advertisement is received, control is passed to operation 3730 and process 3700 continues.

The determination in operation 3725 may be made based on various criteria. In at least one embodiment, if an advertisement is not received at a server associated with the search system 2630 from a server associated with an advertiser system (e.g. the advertising server165) within a pre-determined time interval following a request it may be determined that an advertisement is not received. In at least one embodiment, if a user has a status indicator which indicates that interstitial ads are not to be served to the user it may be determined that an advertisement is not received. In at least one embodiment, if an advertisement received has been previously provided to a user, it may be determined that an advertisement is not received.

In operation 3730, an advertisement is delivered. In at least one embodiment, more than one advertisement may be provided, delivered, served and/or transmitted. Content of an advertisement may be modified based on a time interval, user history, etc. Any service associated with a user may be used to deliver an advertisement to the user. Control is passed to operation 3735 and process 3700 continues.

In operation 3735, an advertisement is requested. A "contextual ad" is an advertisement which is presented simultaneously with a search result. A contextual ad may for example be a text and/or media message which is appended to a response to a request to create a longer message which is provided as an SMS message response to a user. In at least one embodiment, a contextual ad may be requested. In at least one embodiment a programmatic delay may be executed in operation 3735, which may allow a user sufficient time to process information of an advertisement delivered in operation 3730. A contextual ad may include items such as a Uniform Resource Locator (URL), an audio and/or video clip, etc. Control is passed to operation 3760 and process 3700 continues.

In operation 3740, an advertisement is obtained. In at least one embodiment, an interstitial ad may be obtained based on results of a query vetting process. Control is passed to operation 3780 and process 3700 continues.

In operation 3780, an advertisement is delivered. In at least one embodiment, multiple advertisements are delivered during a time interval which is required to select a guide and/or obtain a search result. Control is passed to operation 3745 and process 3700 continues.

In operation 3745, a guide is selected to respond to a request. A guide may be selected based on various criteria. For example, a first available guide, a highest ranking guide associated with a category associated with a request, a guide who most closely matches a profile associated with a user associated with a request, and/or a guide meeting a combination of criteria may be selected to respond to a request. Multiple guides may respond to a request. Control is passed to operation 3750 and process 3700 continues.

In operation 3750, a search result is obtained. A search result may be obtained based on any action of a guide. In at least one embodiment, a guide may obtain a text snippet and a reference URL from a web page as a search result. A search result may include any media such as audio, video, text, graphics, computer readable media, scripting language such as Java® or Flash®, etc., which may be indicated to a user. Control is passed to operation 3755 and process 3700 continues.

In operation 3755, an advertisement is requested. In at least one embodiment a contextual ad is requested. In at least one embodiment, an advertisement request may include information regarding a result which may be used to select an advertisement. A category, a profile, a constraint and/or other information associated with a search result and/or a request may be used to select an advertisement. For example, if a URL associated with a search result is associated with an advertiser, an advertisement from the advertiser may be ranked higher, or if a search result is obtained from a resource associated with an age group, an advertisement associated with the age group may be ranked higher. Control is passed to operation 3760 and process 3700 continues.

In operation 3760, a determination is made as to whether an advertisement is received. If in operation 3760 it is determined that an advertisement is not received, control is passed to operation 3765 and process 3700 continues. If in operation 3760 it is determined that an advertisement is received, control is passed to operation 3770 and process 3700 continues.

The determination in operation 3760 may be made based on various criteria. In at least one embodiment, if an advertisement is not received at a server associated with the search system 2630 from a server associated with an advertiser system (e.g. the advertising server 2665) within a pre-determined time interval following a request made in operation 3755 it may be determined that an advertisement is not received. In at least one embodiment, if a user has a status indicator which indicates that contextual ads are not to be served to the user it may be determined that an advertisement is not received. In at least one embodiment, if an advertisement received has been previously transmitted to a user, it may be determined that an advertisement is not received.

In operation 3765, a search result is transmitted. A search result may be transmitted using any communication service and/or system associated with a user. Control is passed to operation 3775 and process 3700 continues.

In operation 3770, a search result and/or an advertisement is transmitted to a user. In at least one embodiment, a contextual ad is provided to a user. A search result and/or a contextual ad may be provided using any service, device, system, etc., associated with a user. Control is passed to operation 3775 and process 3700 continues.

In operation 3775, information of the process 3700 is recorded. Information of a guide, a user, an advertisement, a request, a structured query, a category, a keyword and/or other item may be recorded. Information regarding usage of an advertisement, a selection by a guide, a user, the search system 2630, etc., may be recorded. For example, information of advertisements delivered to a user, search resources used by a guide, advertisements provided by an advertising server, etc., may be recorded in the database 2620 (FIG. 26). Control is passed to operation 3705 and process 3700 continues.

Figure 38:
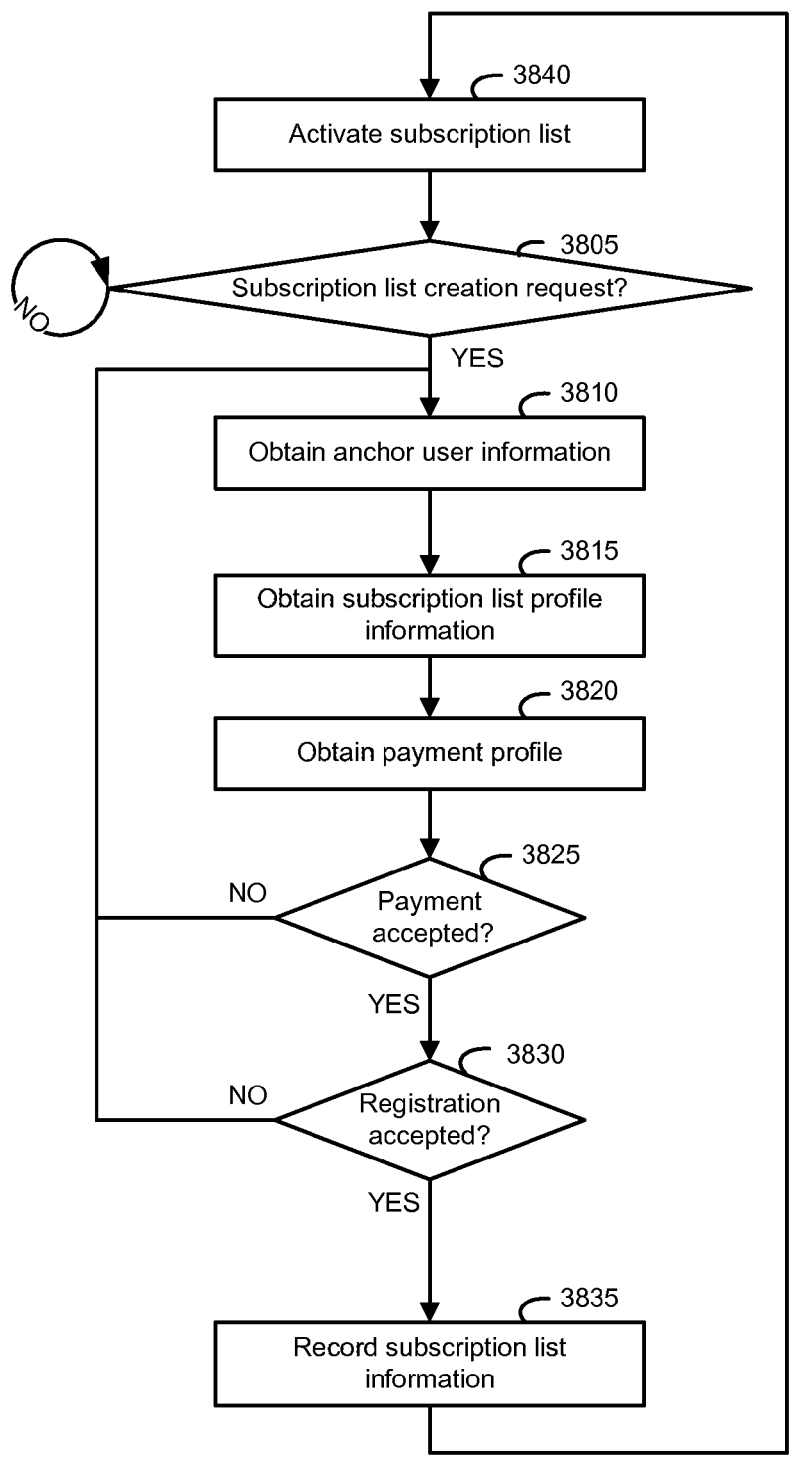
FIG. 38 is a flowchart of registering a subscription group.

As illustrated in FIG. 38, a process 3800 for creating a subscriber list is provided. The process 3800 may be performed in whole or in part by any suitable elements of the system 2600 (FIG. 26). In at least one embodiment, the process 3800 is operative on a server associated with the search system 2630.

In operation 3805 (FIG. 38), a determination is made as to whether a subscription list creation request is received. If it is determined in operation 3805 that a subscription list creation request is not received, control remains at operation 3805 and process 3800 continues. If it is determined in operation 3805 that a subscription list creation request is received, control is passed to operation 3810 and process 3800 continues.

The determination in operation 3805 may be made using various criteria. In at least one embodiment, if a message is received at a server associated with the search system 2630, it may be determined that a subscription list creation request is received. For example, if an email message, an SMS, EMS, and/or MMS message, an IM, an IP message, and/or a voice message is received at an address associated with the search system 2630 (FIG. 26) it may be determined that a subscription list creation request is received.

In operation 3810, information of an anchor user is obtained. In at least one embodiment, anchor user information may be provided using a web form provided by the search system 2630 (FIG. 26). In at least one embodiment, anchor user information may be specified using a text or SMS message. Anchor user information may include an identifier of an anchor user, contact information of an anchor user such as email, physical address, confirmation of identity, profile information, etc., as may be required. Control is passed to operation 3815 and process 3800 continues.

Figure 44:
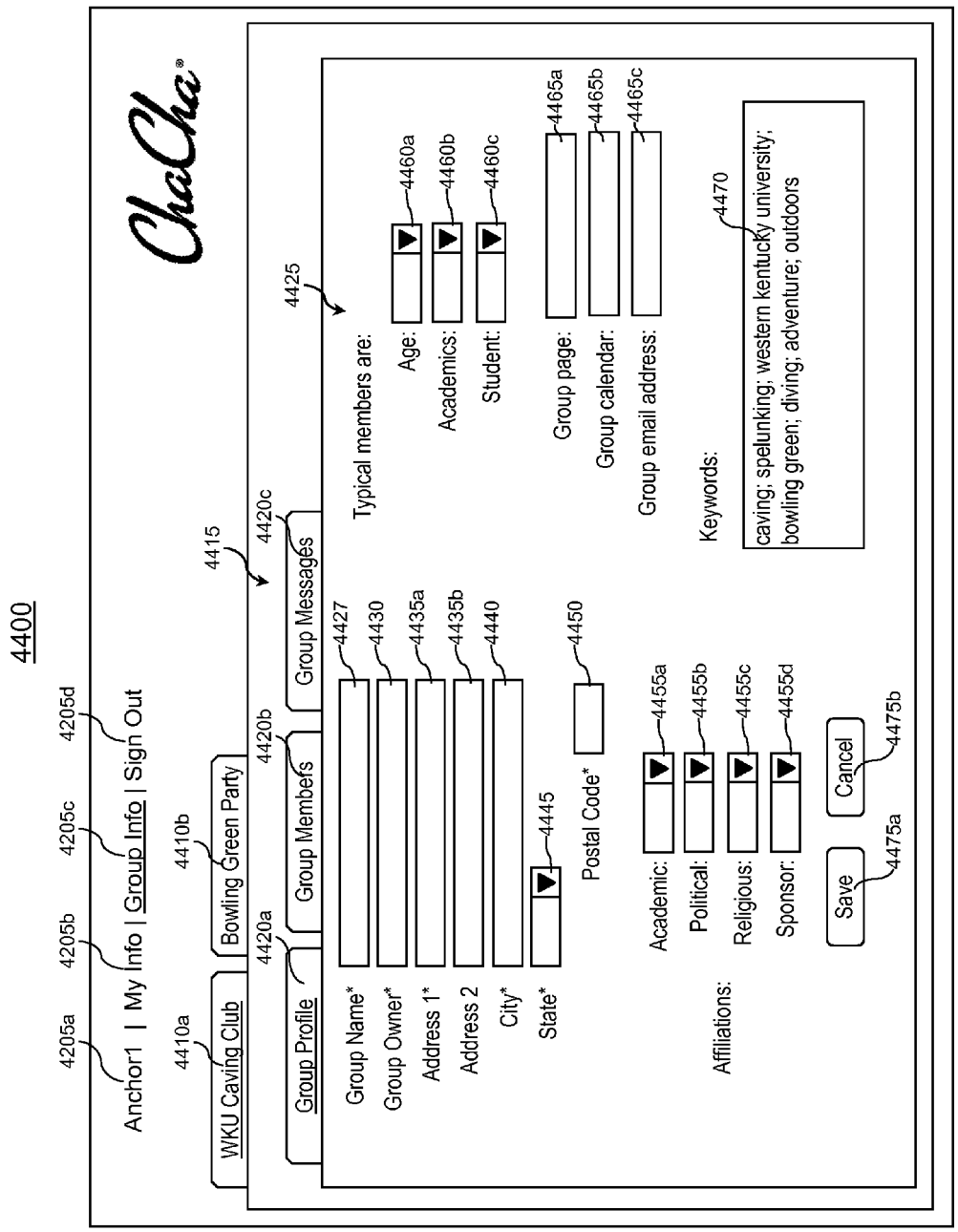
FIG. 44 illustrates a GUI for providing subscription group registration.

In operation 3815, subscription list profile information is obtained. In at least one embodiment, subscription list profile information may be provided using a web form provided by the search system 2630 (FIG. 26), such as the GUI 4400 (FIG. 44). Subscription list profile information may include parameters such as those indicated in the subscriber list record 3600 (FIG. 36). Control is passed to operation 3820 and process 3800 continues.

In operation 3820, payment profile information is obtained. In at least one embodiment, payment information may be provided using a web form provided by the search system 2630 (FIG. 26). Payment information may include credit, debit, payment system, and/or verification information which may be used to provide compensation in return for distribution of subscription list messages. In at least one embodiment, if a subscription list accepts advertisements, payment may not be required, and/or may be reduced. Control is passed to operation 3825 and process 3800 continues.

In operation 3825, a determination is made as to whether payment information of a subscription list is accepted. If it is determined in operation 3825 that payment information of a subscription list is not accepted, control is passed to operation 3810 and process 3800 continues. If it is determined in operation 3825 that payment information of a subscription list is accepted, control is passed to operation 3830 and process 3800 continues.

The determination in operation 3825 may be made in various ways. In at least one embodiment, payment information may be verified by contacting a provider of payment services such as a credit card processing center. In at least one embodiment, a payment service such as the PayPal® service or an Automated Clearing House (ACH) transfer may be used to determine if payment information is accepted. In at least one embodiment, an anchor user, or owner may elect to pay for the subscription service by delivery of advertisements.

In operation 3830, a determination is made as to whether registration of a subscription list is accepted. If it is determined in operation 3830 that registration of a subscription list is not accepted, control is passed to operation 3810 and process 3800 continues. If it is determined in operation 3830 that registration of a subscription list is accepted, control is passed to operation 3835 and process 3800 continues.

The determination in operation 3830 may be made in various ways. In at least one embodiment, registration of a subscription list may be reviewed by automated and/or human assisted methods to determine whether registration of a subscription list is accepted. Verification of any or all user and/or subscription list information may be used to determine whether registration of a subscription list is accepted.

In operation 3835, information of a registration of a subscription list is recorded. In at least one embodiment, information of a registration of a subscription list is recorded in the database 2630 (FIG. 26). Profile, anchor user, messaging, affiliation, membership, time of creation, etc., information of a subscription list may be recorded. Control is passed to operation 3840 and process 3800 continues.

In operation 3840 a subscription list is activated. In at least one embodiment, the search system 2630 may begin delivering subscriber messages to users based on information indicated in the database 2620 regarding the subscription list. For example, if an anchor user designates users to be invited to join a subscription list, an invitation message associated with the subscription list might be delivered to the designated users. Control is passed to operation 3805 and process 3800 continues.

Figure 39:
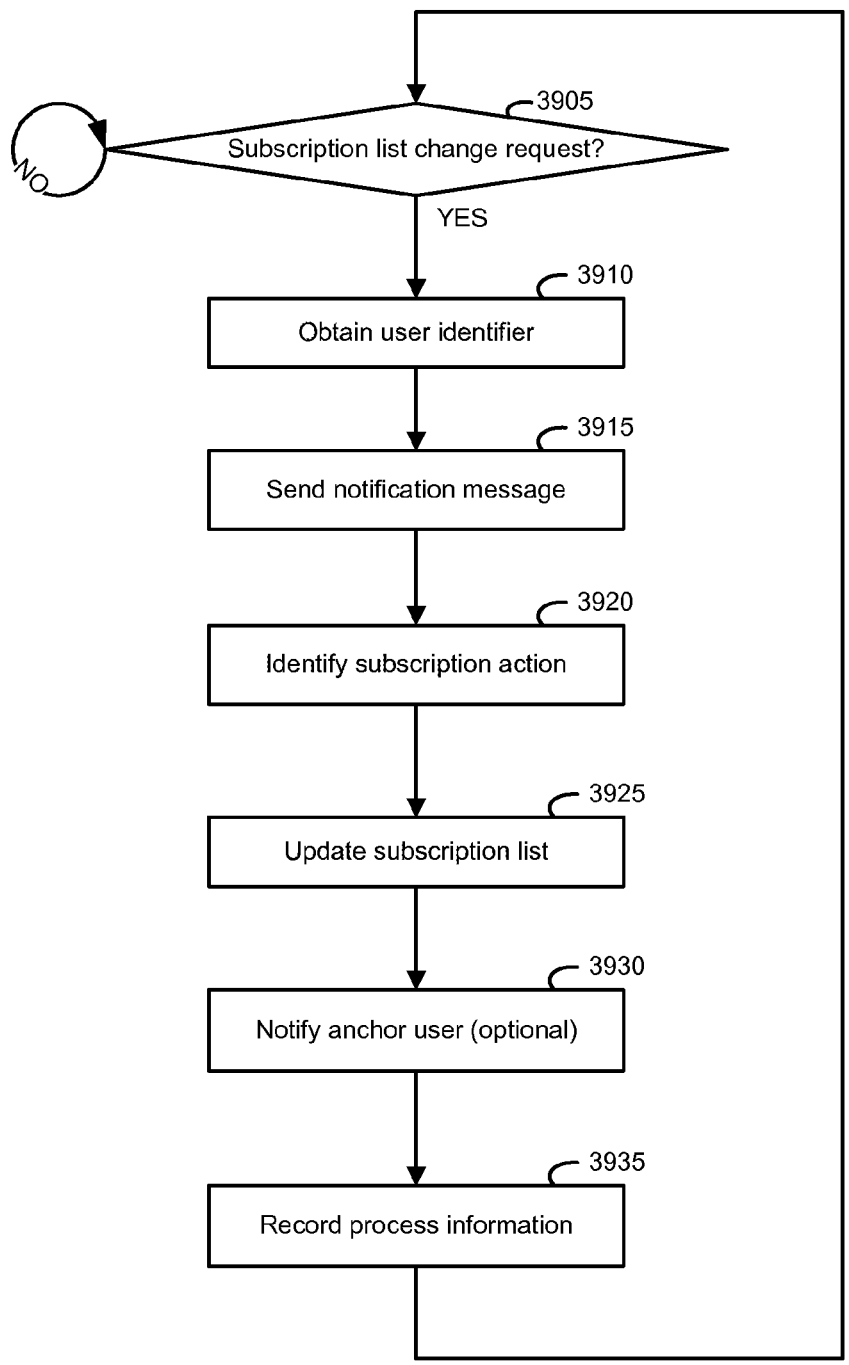
FIG. 39 is a flowchart of maintaining membership of a subscription group.

As illustrated in FIG. 39, a process 3900 for maintaining a subscription list is provided. The process 3900 may be performed in whole or in part by any suitable elements of the system 2600 (FIG. 26). In at least one embodiment, the process 3900 is operative on a server associated with the search system 2630 (FIG. 26).

In operation 3905 (FIG. 39), a determination is made as to whether a subscription list change request is received. If it is determined in operation 3905 that a subscription list change request is not received, control remains at operation 3905 and process 3900 continues. If it is determined in operation 3905 that a subscription list change request is received, control is passed to operation 3910 and process 3900 continues.

The determination in operation 3905 may be made using various criteria. In at least one embodiment, if a message is received at a server associated with the search system 2630 (FIG. 26), it may be determined that a subscription list change request is received. For example, if an email message, an SMS, EMS, and/or MMS message, an IM, an IP message, and/or a voice message is received at an address associated with the search system 2630, it may be determined that a subscription list change request is received. For example, an opt-in, opt-out, acceptance, add and/or other message affecting membership of a subscription list may be received.

In operation 3910, an identifier of a user is obtained. In at least one embodiment, an identifier of a user submitting a message may be obtained such as an originating phone number, a browser "cookie", email, password, etc. An identifier of a user may be used to determine whether the user is a member of a subscription list. An identifier of a user may be provided by an anchor user. For example, an anchor user may provide a list of phone numbers, email addresses, etc., which may be added to and/or removed from a subscription list. Control is passed to operation 3915 and process 3900 continues.

In operation 3915, a notification message is sent. For example, an invitation message, a confirmation message, and/or an opt-out message may be sent to a user associated with an identifier provided. In at least one embodiment, an SMS message is sent to a mobile phone associated with a user identifier. Control is passed to operation 3920 and process 3900 continues.

In operation 3920 a subscription action is identified. Content of a message may be analyzed to identify a type of action to be taken regarding a subscription list. For example, status of a user associated with a subscription list may be changed to pending, active, or inactive. Control is passed to operation 3925 and process 3900 continues.

In operation 3925, a subscription list is updated. For example, a user ID associated with a subscription list may be added, a start or stop time associated with a user ID might be modified, etc. Control is passed to operation 3930 and process 3900 continues.

In operation 3930, an anchor user may be optionally notified. For example, an anchor user may elect to be notified of a change in status associated with a subscription list. In at least one embodiment, no notification is provided to an anchor user. In at least one embodiment, a message regarding a status change is sent to an anchor user using a service designated by the anchor user. Control is passed to operation 3935 and process 3900 continues.

In operation 3935, process information is recorded. For example, time, user ID, user status, etc., may be recorded. In at least one embodiment, information is recorded in the database 2620 (FIG. 26). Control is passed to operation 3905 and process 3900 continues.

A user may modify any information of a subscription list as authorization may permit. For example, an anchor user may edit any or all information associated with a subscription list, a subscribing user might recommend other potential subscribers, etc.

Figure 40:
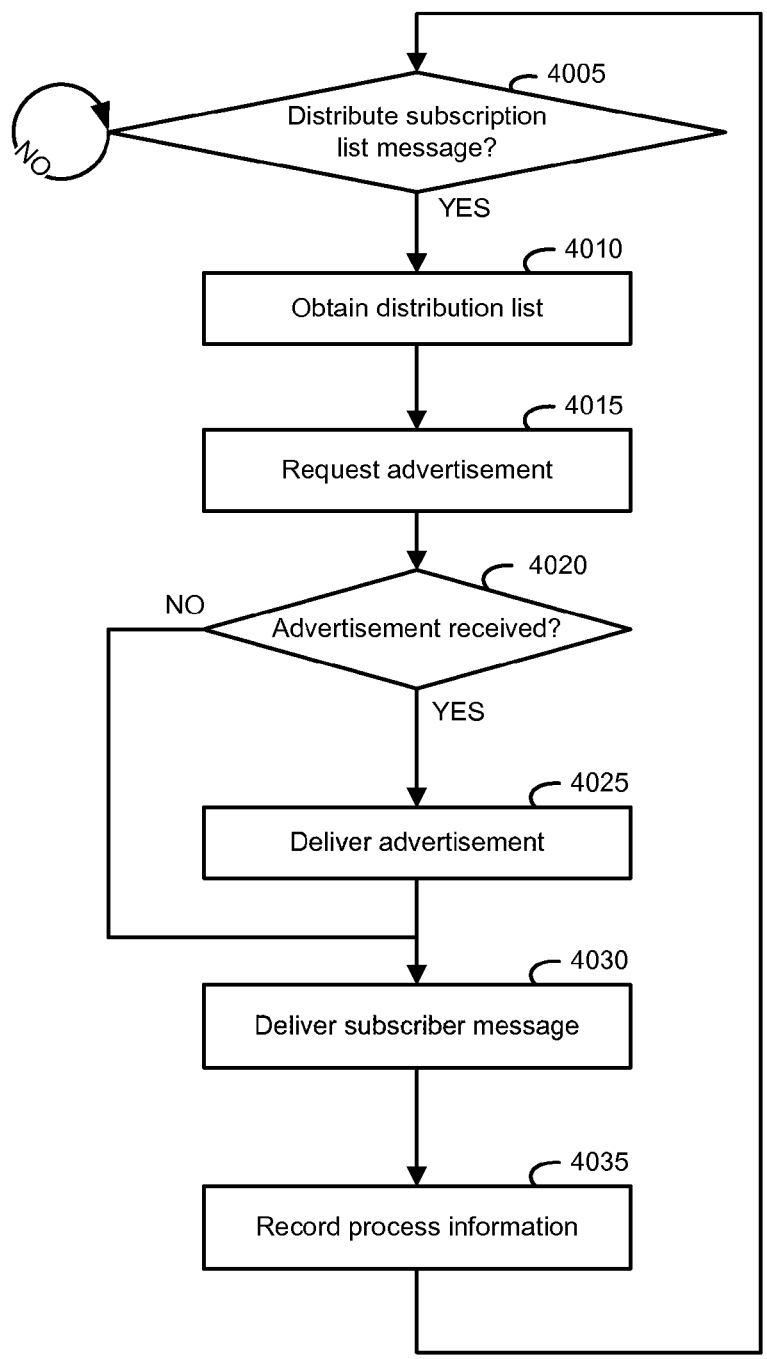
FIG. 40 is a flowchart of distributing a message to a subscription group.

As illustrated in FIG. 40, a process 4000 for distributing a message to a subscription list is provided. The process 4000 may be performed in whole or in part by any suitable elements of the system 2600 (FIG. 26). In at least one embodiment, the process 4000 is operative on a server associated with the search system 2630 (FIG. 26).

In operation 4005 (FIG. 40), a determination is made as to whether a subscription message distribution request is received. If it is determined in operation 4005 that a subscription message distribution request is not received, control remains at operation 4005 and process 4000 continues. If it is determined in operation 4005 that a subscription message distribution request is received, control is passed to operation 4010 and process 4000 continues.

The determination in operation 4005 may be made using various criteria. In at least one embodiment, if a message is received at a server associated with the search system 2630 (FIG. 26), it may be determined that a subscription message distribution request is received. For example, if an email message, an SMS, EMS, and/or MMS message, an IM, an IP message, and/or a voice message is received at an address associated with the search system 2630 it may be determined that a subscription message distribution request is received. For example, an anchor user might send an SMS message to a short code, send an email to an email address, post a message to a web form, send an IM to a designated address, etc., which might cause a subscription message distribution request to occur.

In operation 4010, a distribution list is obtained. In at least one embodiment, a list of subscriber users associated with a subscription list is processed to determine a number of destination addresses for a subscription message. Content of a subscription message distribution request may be processed to determine a distribution list associated with a subscription message. For example a keyword of a subscription distribution message might be used to determine a distribution list to which a message is directed. Control is passed to operation 4015 and process 4000 continues.

In operation 4015, an advertisement is requested. For example, an advertisement may be requested based on content of a subscription message, a profile of a subscription list, a profile associated with a user, etc. Control is passed to operation 4020 and process 4000 continues.

In operation 4020 a determination is made as to whether an advertisement is received. If in operation 4020 it is determined that an advertisement is not received, control is passed to operation 4030 and process 4000 continues. If in operation 4020 it is determined that an advertisement is received, control is passed to operation 4025 and process 4000 continues.

The determination in operation 4020 may be made based on various criteria. In at least one embodiment, if an advertisement is not received at a server associated with the search system 2630 from a server associated with an advertiser system (e.g. the advertising server 2665) within a pre-determined time interval following a request, it may be determined that an advertisement is not received. In at least one embodiment, if a subscriber list has a status indicator which indicates that ads are not to be served to the subscribers it may be determined that an advertisement is not received. In at least one embodiment, if an advertisement received has been previously transmitted to a subscriber list, it may be determined that an advertisement is not received.

In operation 4025, an advertisement is delivered. For example, an SMS, MMS, IM, email, etc., message which may include an advertisement provided responsive to an advertisement request, may be delivered to an address associated with a subscriber list. Control is passed to operation 4030 and process 4000 continues.

In operation 4030, a subscriber message is delivered. For example, an SMS, MMS, IM, email, etc., message which may include content associated with a subscriber message and/or an advertisement may be delivered to an address associated with a subscriber list. Control is passed to operation 4035 and process 4000 continues.

In operation 4035, process information is recorded. For example, information associated with a user, a message, an advertisement, an advertiser, etc., may be recorded. In at least one embodiment, information is recorded in the database 2620 (FIG. 26). Control is passed to operation 4005 and process 4000 continues.

Figure 41:
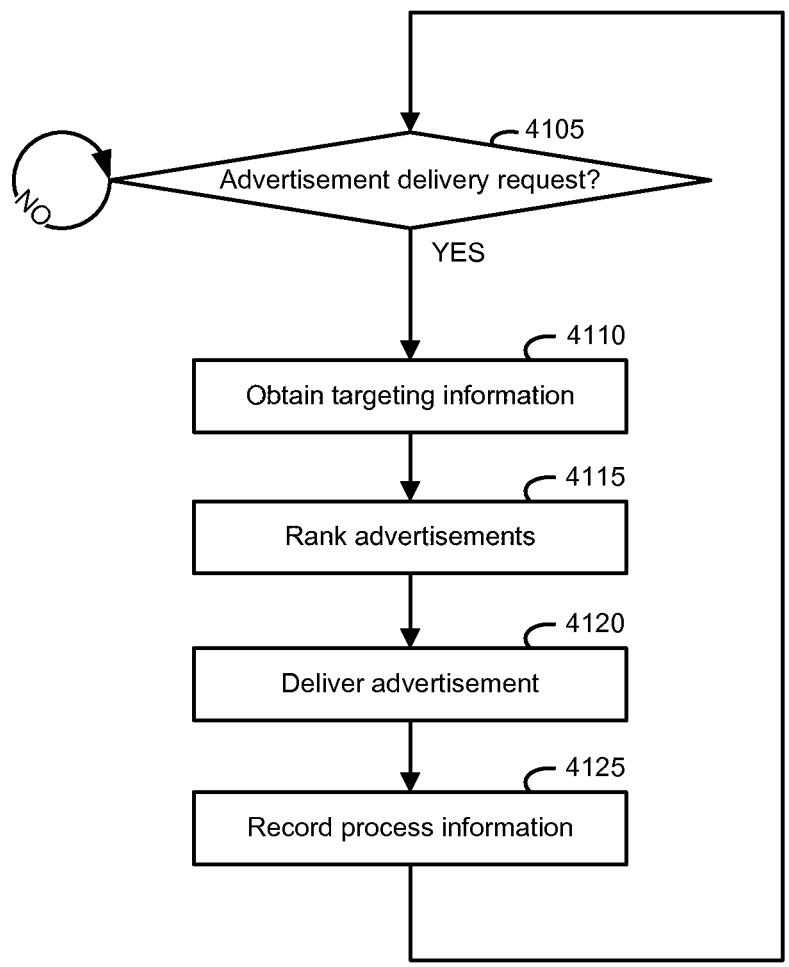
FIG. 41 is a flowchart of processing a request for an advertisement.

As illustrated in FIG. 41, a process 4100 for delivering an advertisement is provided. The process 4100 may be performed in whole or in part by any suitable elements of the system 2600 (FIG. 26). In at least one embodiment, the process 4100 is operative on a server associated with the advertising server 2665.

In operation 4105 (FIG. 41), a determination is made as to whether an advertisement delivery request is received. If it is determined in operation 4105 that an advertisement delivery request is not received, control remains at operation 4105 and process 4100 continues. If it is determined in operation 4105 that an advertisement delivery request is received, control is passed to operation 4110 and process 4100 continues.

The determination in operation 4105 may be made using various criteria. In at least one embodiment, if a message is received at a server associated with the advertising server 2665, it may be determined that an advertisement delivery request is received. For example, if an email message, an SMS, EMS, and/or MMS message, an IM, an IP message, and/or a voice message is received at an address associated with the advertising server 2665 it may be determined that an advertisement delivery request is received.

In operation 4110, targeting information is obtained. In at least one embodiment, targeting information for a campaign or advertisement may be provided using a web form provided by the search system 2630 (FIG. 26). In at least one embodiment, targeting information may be specified using a text or SMS message. Targeting information may include an identifier of a user, a profile, time information, location information and/or any conditions which may be associated with delivery of an advertisement. In at least one embodiment, targeting information may be associated with a user based on a subscription list associated with the user. Control is passed to operation 4115 and process 4100 continues.

In operation 4115, advertisements are ranked. In at least one embodiment, advertisements may be ranked based on a profile, a keyword, a category, a user, etc. In at least one embodiment, advertisements may be ranked based on compensation provided. For example, compensation provided to a publisher, an advertising service, etc., may be considered in a ranking of an advertisement. Any or all targeting information may be used to rank an advertisement. Control is passed to operation 4120 and process 4100 continues.

In operation 4120, an advertisement is delivered. A highest ranking advertisement based on targeting information may be provided. In at least one embodiment, a web response is provided to the search system 2630 (FIG. 26). In at least one embodiment, a message is sent to a server associated with a messaging service such as IM, SMS, EMS, email, etc. For example, a requested advertisement might be provided to a wireless carrier system which might deliver the advertisement via a messaging service, WAP, internet protocol (IP), 3G and/or 4G wireless protocol, etc. Control is passed to operation 4125 and process 4100 continues.

In operation 4125, process information is recorded. In at least one embodiment, information is recorded in the advertising server 2665. In at least one embodiment, information is recorded in the database 2620 (FIG. 26). Information of inventory, targeting, ranking, delivery, etc., may be updated and/or recorded. Control is passed to operation 4105 and process 4100 continues.

Figure 42:
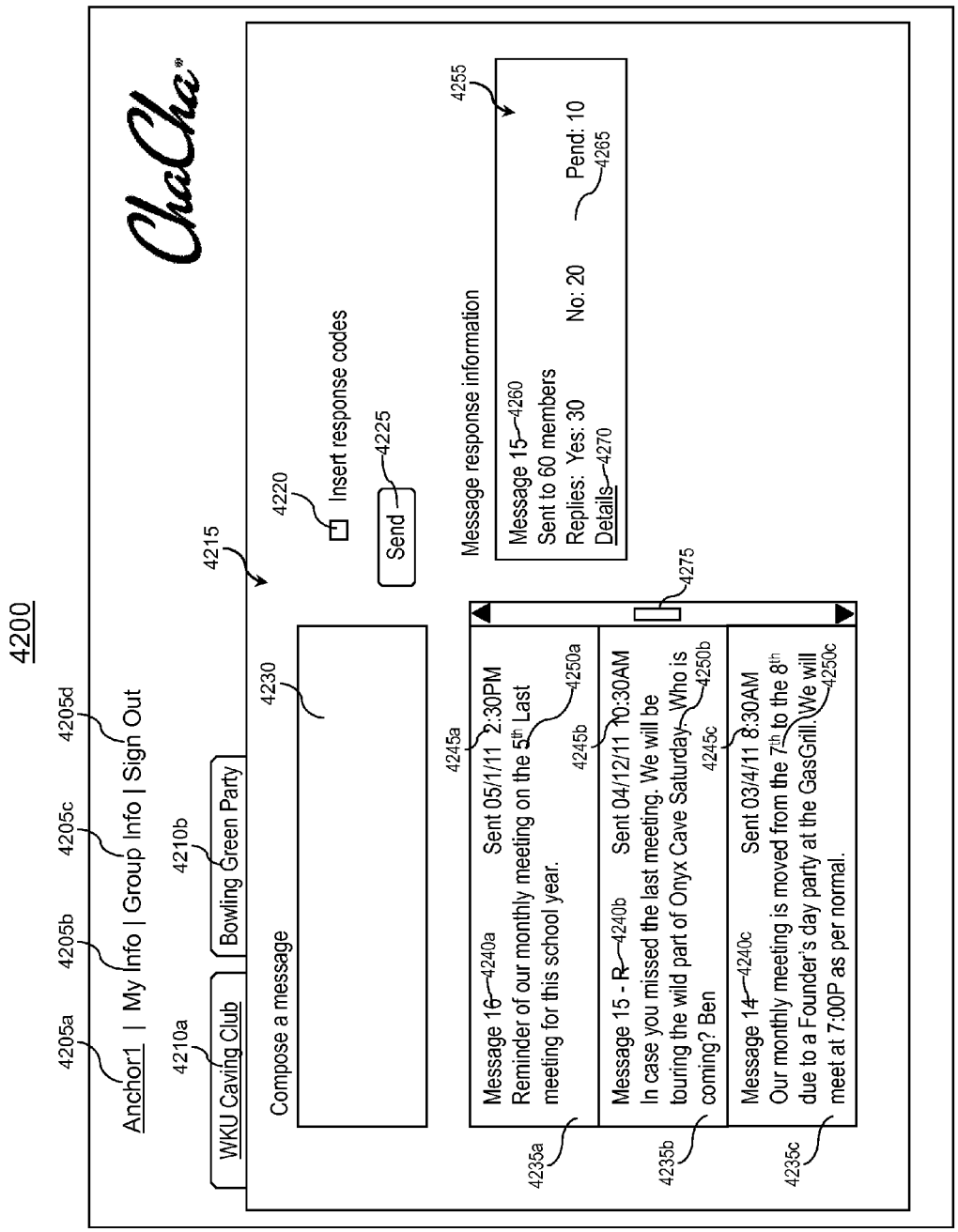
FIG. 42 illustrates a graphical user interface (GUI) for messaging to subscribers of a subscription group.

A GUI 4200 for managing subscription distribution messages is illustrated in FIG. 42. The GUI 4200 may be presented on a display device associated with a user system such as the anchor user system 2640b (FIG. 26). The GUI 4200 may include activity selection controls 4205, group selection controls 4210, a message management window 4215, a message option control 4220, a message send control 4225, a messaging box 4230, message indicator windows 4235, message ID indicators 4240, message time indicators 4245, message content indicators 4250, a message response window 4255, a response message ID indicator 4260, a response indicator 4265, a response detail indicator 4270, and navigation control 4275.

The activity selection controls 4205 may be used to select an activity. The 'Anchor1' activity selection control 4205a may cause the GUI 4200 to be provided. The 'My Info' activity selection control 4205b may cause the GUI 4300 (FIG. 43) to be provided. The 'Group Info' activity selection control 4205c may cause the GUI 4400 (FIG. 44) to be provided. The 'Sign Out' activity selection control 4205d may be used to logon or logoff. An active control may be indicated in any suitable way such as color, shading, etc. Using the example in FIG. 42, the underline indicates that the activity selection control 4205a is active.

The group selection controls 4210 may be used to indicate a subscription list. The group selection controls 4210 may be any type of selection control. The group selection control 4210a indicates the group 'WKU Caving Club', which is associated with 'Anchor1'. The group selection control 4210b indicates the group 'Bowling Green Party'. As indicated by the underline, the group selection control 4210a is currently active. The message management window 4215 may include information associated with messages for the selected group.

The message option control 4220 may be used to insert a response code in a message sent to a distribution list. The message option control 4220 may be a toggle 'check-box'. The message send control 4225 may be used to send a message indicated in the messaging box 4230 to a distribution. The messaging box 4230 may be used to provide information of a message to be delivered to a distribution. While a text box is used for the purposes of illustration, any type of media might be indicated in the message box 4230. The message indicator windows 4235 may include information of messages associated with a distribution. For example, the message indicator window 4235a includes information of 'Message 16'. The message ID indicators 4240 may be used to indicate an identifier of a message. For example, the message ID indicator 4240b indicates 'Message 15—R' which may indicate that 'Message 15' included a response code associated with attending the event indicated in the message content indicator 4250b. The message time indicators 4245 may be used to indicate a delivery time associated with a distribution message. For example, the message time indicator 4245c indicates that 'Message 14' was delivered '03/4/11 8:30 AM'. The navigation controls 4275 may be used to navigate within the content of the message management window 4215.

The message response window 4255 may include information associated with a response to a message. Selection of the message ID indicator 4240b may cause information of 'Message 15' to be provided in the message response information window 4255. The response indicator 4260 may indicate a message ID associated with a response. The response indicator 4265 may indicate information regarding responses to a message. The response detail indicator 4270 may be used to obtain detailed information of responses to a message. Activation of the response detail indicator 4270 may cause a window providing a response status associated with individual members of a distribution list to be presented (not shown).

Figure 43:
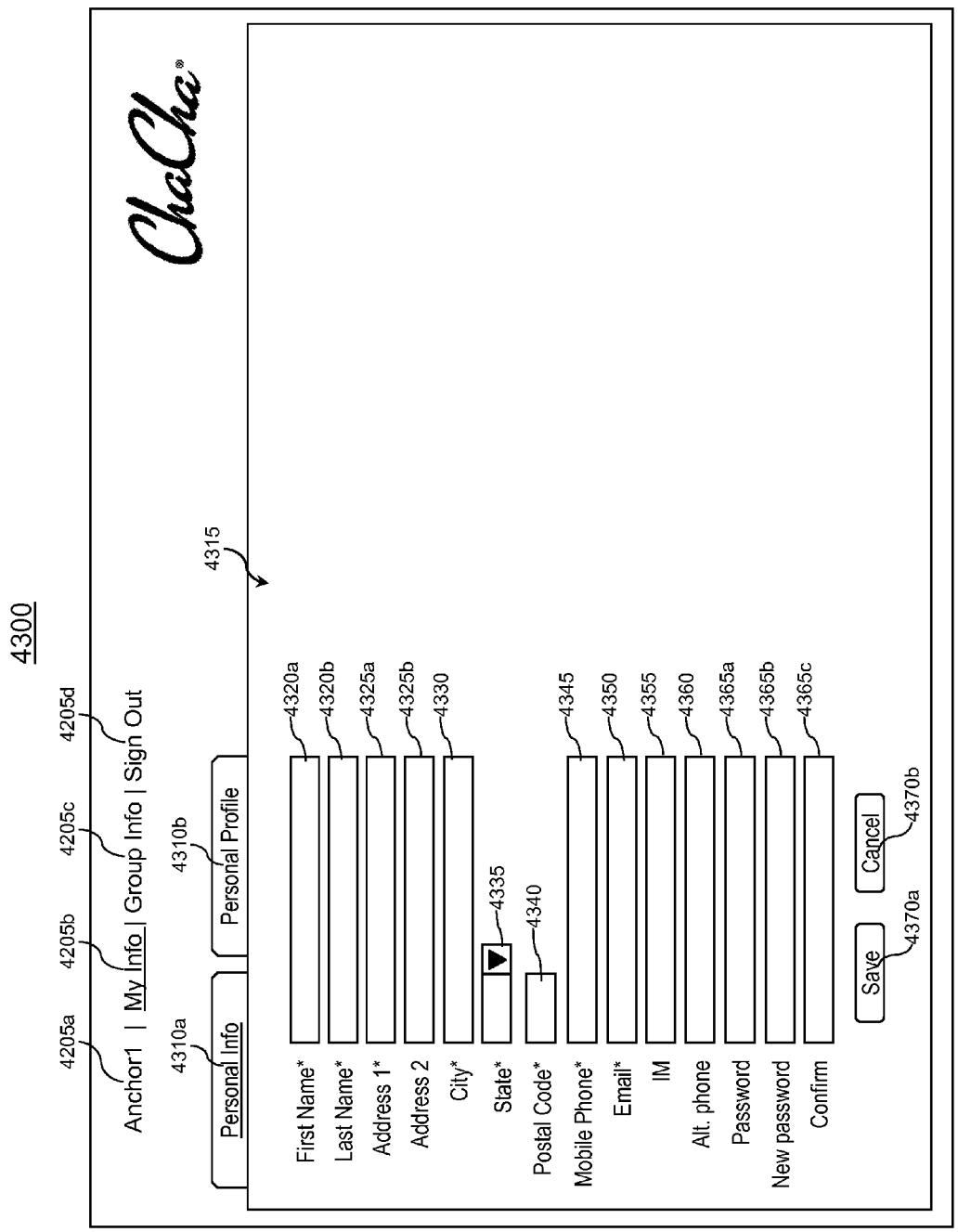
FIG. 43 illustrates a GUI for providing anchor user registration.

A GUI 4300 for managing personal information is illustrated in FIG. 43. The GUI 4300 may be presented on a display device associated with a user system such as the anchor user system 2640b (FIG. 26). The GUI 4300 may include the activity selection controls 4205, personal data selection controls 4310, a personal data management window 4315, name indicators 4320, address indicators 4325, a city indicator 4330, a state indicator 4335, a postal code indicator 4340, a mobile phone indicator 4345, an email indicator 4350, an IM address indicator 4355, an alternate phone indicator 4360, password indicators 4365, and action controls 4370.

The activity selection controls 4205 may be used to select an activity. The 'Anchor1' activity selection control 4205a may cause the GUI 4200 (FIG. 42) to be provided. The 'My Info' activity selection control 4205b may cause the GUI 4300 (FIG. 43) to be provided. The 'Group Info' activity selection control 4205c may cause the GUI 4400 (FIG. 44) to be provided. The 'Sign Out' activity selection control 4205d may be used to logon or logoff. An active control may be indicated in any suitable way such as color, shading, etc. Using the example in FIG. 43, the underline indicates that the activity selection control 4205b is active.

The personal data selection controls 4310 may be used to select between management of account information and management of personal profile information. The personal information selection control 4310a may be used to view the GUI 4300, the personal profile selection control 4310b may be used to view a GUI (not shown) which may be used to provide profile information such as demographic, personality, etc., regarding a user.

The name indicator 4320a may be used to indicate a user first name. The name indicator 4320b may be used to indicate a user last name. The address indicators 4325 may be used to indicate a user street address. The city indicator 4330 may be used to indicate a user city. The state indicator 4335 may be used to indicate a user state. The postal code indicator 4340 may be used to indicate a user postal code. The mobile phone indicator 4345 may be used to indicate a mobile phone number associated with a user. The email indicator 4350 may be used to indicate an email address associated with a user. The IM address indicator 4355 may be used to indicate IM credentials associated with a user. The alternate phone indicator 4360 may be used to indicate an alternate phone associated with a user. The password indicators 4365 may be used to establish and modify a password associated with user account. The password indicator 4365a may be used to provide a current password associated with an account. The new password indicator 4365b may be used to provide a new password associated with a user account. The confirm password indicator 4365c may be used to confirm a new password associated with a user account. The 'Save' action control 4370a may be used to indicate that information indicated in the GUI 4300 is to be recorded. The 'Cancel' action control 4370b may be used to indicate that modifications made to the information indicated in the GUI 4300 are to be discarded.

A GUI 4400 for managing information associated with a subscription list is illustrated in FIG. 44. The GUI 4400 may be presented on a display device associated with a user system such as the anchor user system 2640b (FIG. 26). The GUI 4400 may include the activity selection controls 4205, the group selection controls 4410, a group information window 4415, group information selection controls 4420, a group profile window 4425, a group name indicator 4427, a group owner indicator 4430, group address indicators 4435, a group city indicator 4440, a group state indicator 4445, a group postal code indicator 4450, group affiliation indicators 4455, group demographic indicators 4460, group shared information indicators 4465, a group keyword window 4470 and action controls 4475.

The activity selection controls 4205 may be used to select an activity. The 'Anchor1' activity selection control 4205a may cause the GUI 4200 (FIG. 42) to be provided. The 'My Info' activity selection control 4205b may cause the GUI 4300 (FIG. 43) to be provided. The 'Group Info' activity selection control 4205c may cause the GUI 4400 (FIG. 44) to be provided. The 'Sign Out' activity selection control 4205d may be used to logon or logoff. An active control may be indicated in any suitable way such as color, shading, etc. Using the example in FIG. 44, the underline indicates that the activity selection control 4205c is active.

The group selection controls 4410 may be used to select information associated with a group. While a few group selection controls 4410 are indicated in the GUI 4400, any number of group selection controls 4410 may be provided as per a number of groups associated with a user. The group selection control 4410a selects the group 'WKU Caving Club' and is active as indicated by the underline. The group selection control 4410b selects the group 'Bowling Green Party'. The group information window 4415 displays the information selection controls associated with the selected group.

The group information selection controls 4420 may be used to select various types of information associated with a subscription list. The 'Group Profile' selection control 4420a may cause the GUI 4400 to be provided. The 'Group Members' selection control 4420b may cause the GUI 4500 (FIG. 45) to be provided. The 'Group Messages' selection control 4420c may cause the GUI 4600 (FIG. 46) to be provided. As indicated by the underline, the 'Group Profile' selection control 4420a is active. The group profile window 4425 may provide information of a profile associated with a subscription list.

The group name indicator 4427 may be used to indicate a group name (e.g. WKU Caving Club). The group owner indicator 4430 may be used to indicate an anchor user authorized to manage the data of the group. The group address indicators 4435 may be used to indicate a group street address. The group city indicator 4440 may be used to indicate a group city. The group state indicator 4445 may be used to indicate a group state. The group postal code indicator 4450 may be used to indicate a group postal code. The group affiliation indicators 4455 may be used to indicate affiliations associated with a group. For example, the affiliation indicators 4455 may be used to indicate an academic, political, religious, or sponsorship affiliation. The group demographic indicators 4460 may be used to indicate demographic information of a group. For example, the group demographic indicators 4460 may be used by an anchor user to provide information of a group such as age, academic interests, area of study, etc. The group shared information indicators 4465 may be used to identify information associated with a group. For example, the shared information indicator 4465a might designate a group website, the shared information indicator 4465b might indicate a calendar of events, and the shared information indicator 4465c might indicate an email account where responses and/ or other information to be shared within the group might be found. The group keyword window 4470 may include information of keywords associated with a subscription list. Keywords might be provided by an anchor user, derived from messages, obtained by processing of group resources, etc. The 'Save' action control 4475a may be used to indicate that information indicated in the GUI 4400 is to be recorded. The 'Cancel' action control 4475b may be used to indicate that modifications made to the information indicated in the GUI 4400 are to be discarded.

Figure 45:
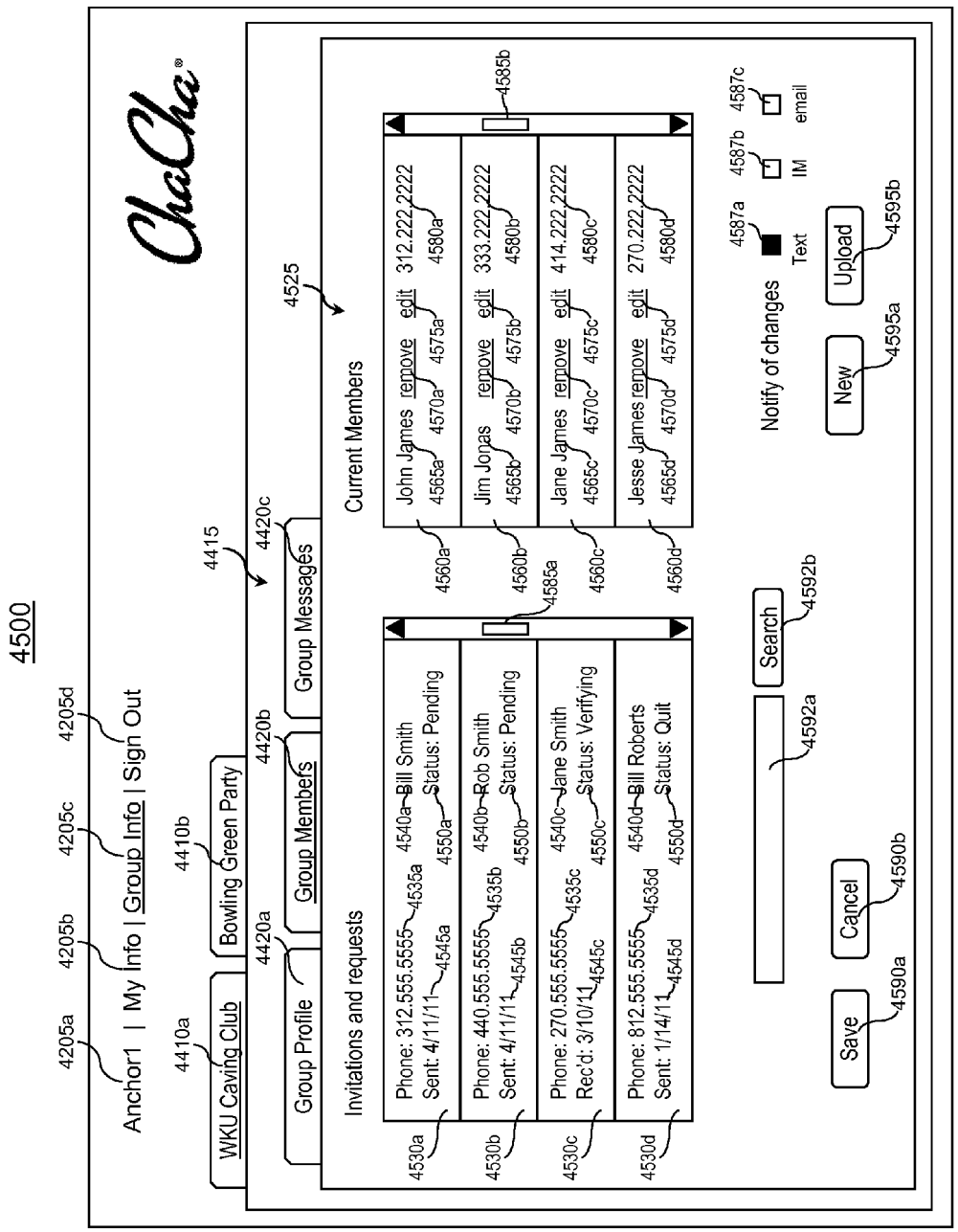
FIG. 45 illustrates a GUI for maintaining and reviewing membership information of a subscription group.

A GUI 4500 for managing members associated with a subscription list is illustrated in FIG. 45. The GUI 4500 may be presented on a display device associated with a user system such as the anchor user system 2640b (FIG. 26). The GUI 4500 may include the activity selection controls 4205, the group selection controls 4410, the group information window 4415, the group information selection controls 4420, a group membership window 4525, member invitation windows 4530, member status windows 4560, notification controls 4587, member search controls 4592, action controls 4590, and invitation controls 4595.

The activity selection controls 4205 may be used to select an activity. The 'Anchor1' activity selection control 4205a may cause the GUI 4200 (FIG. 42) to be provided. The 'My Info' activity selection control 4205*b* may cause the GUI 4300 (FIG. 43) to be provided. The 'Group Info' activity selection control 4205*c* may cause the GUI 4400 (FIG. 44) to be provided. The 'Sign Out' activity selection control 4205*d* may be used to logon or logoff. An active control may be indicated in any suitable way such as color, shading, etc. Using the example in FIG. 45, the underline indicates that the activity selection control 4205*c* is active.

The group information selection controls 4420 may be used to select various types of information associated with a subscription list. The 'Group Profile' selection control 4420*a* may cause the GUI 4400 to be provided. The 'Group Members' selection control 4420*b* may cause the GUI 4500 (FIG. 45) to be provided. The 'Group Messages' selection control 4420*c* may cause the GUI 4600 (FIG. 46) to be provided. As indicated by the underline, the 'Group Members' selection control 4420*b* is active. The group membership window 4525 may provide information of members and invitations to members associated with a subscription list.

The member invitation windows 4530 may include member contact indicators 4535, member name indicators 4540, delivery date indicators 4545, and invitation status indicators 4550. The member contact indicators 4535 may indicate an address associated with a member. For example, the member contact indicator 4535*b* indicates the phone number '440.555.5555', which may indicated that the user 'Rob Smith' as indicated in the member name indicator 4540*b* was sent an invitation to join 'WKU Caving Club' on '4/11/11' as indicated in the delivery date indicator 4545*b*, and has not replied yet, as indicated in the invitation status indicator 4550*b*.

The member status windows 4560 may provide information regarding current members of a distribution list. The member status windows 4560 may include member name indicators 4565, member delete controls 4570, member editing controls 4575, and member address indicators 4580. The member status window 4560*c* includes information regarding the member 'Jane James' as indicated in the member name indicator 4565*c*. The member remove control 4570*c* may be used to remove 'Jane James' from the group 'WKU Caving Club'. The member editing control 4575*c* may be used to edit information of 'Jane James'. The member address indicator 4580*c* indicates that 'Jane James' may be contacted using the phone number '414.222.2222'. The navigation controls 4585*a* and 4585*b* may be used to navigate within the content of the member invitation windows 4530 and the member status windows 4560, respectively.

The notification controls 4587 may be used to designate a notification method to be used when status of group membership is changed. The notification control 4587*a*, 4587*b*, and 4587*c* may be used to indicate that a group owner or administrator is to be notified by SMS (i.e. text messaging), IM and email, respectively. The notification controls 4587 may be implemented as for example 'check boxes'. The 'New' invitation control 4595*a* may be used to create a new member invitation manually using a member invitation window. The 'Upload' invitation control 4595*b* may be used to indicate files which may include member information which may be used to create invitations to join a subscription list. The members search controls 4592 may be used to locate a member of a subscription group. A search term may be entered using the search control 4592*a*, and a search of the member list may be initiated using the 'Search' search control 4592*b*. The 'Save' action control 4590*a* may be used to indicate that information indicated in the GUI 4500 is to be recorded. The 'Cancel' action control 4590*b* may be used to indicate that modifications made to the information indicated in the GUI 4500 are to be discarded.

Figure 46:
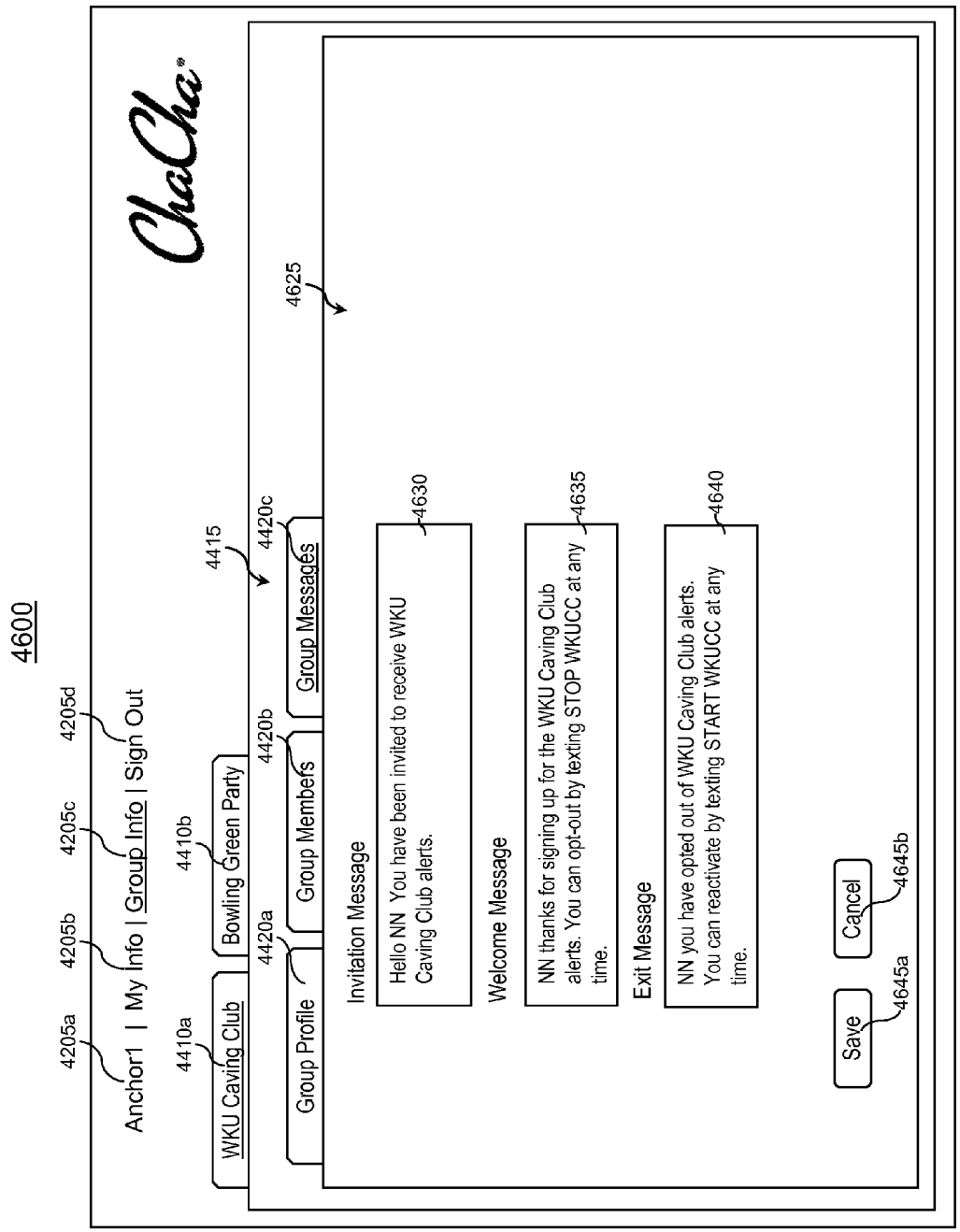
FIG. 46 illustrates a GUI for creating and editing standardized messages for a subscription group.

A GUI 4600 for managing messages associated with a subscription list is illustrated in FIG. 46. The GUI 4600 may be presented on a display device associated with a user system such as the anchor user system 2640*b* (FIG. 26). The GUI 4600 may include the activity selection controls 4205, the group selection controls 4410, the group information window 4415, the group information selection controls 4420, a group message information window 4625, an invitation message window 4630, a welcome message window 4635, an exit message window 4640 and action controls 4645.

The activity selection controls 4205 may be used to select an activity. The 'Anchor1' activity selection control 4205*a* may cause the GUI 4200 (FIG. 42) to be provided. The 'My Info' activity selection control 4205*b* may cause the GUI 4300 (FIG. 43) to be provided. The 'Group Info' activity selection control 4205*c* may cause the GUI 4400 (FIG. 44) to be provided. The 'Sign Out' activity selection control 4205*d* may be used to logon or logoff. An active control may be indicated in any suitable way such as color, shading, etc. Using the example in FIG. 46, the underline indicates that the activity selection control 4205*c* is active.

The group information selection controls 4420 may be used to select various types of information associated with a subscription list. The 'Group Profile' selection control 4420*a* may cause the GUI 4400 to be provided. The 'Group Members' selection control 4420*b* may cause the GUI 4500 (FIG. 45) to be provided. The 'Group Messages' selection control 4420*c* may cause the GUI 4600 (FIG. 46) to be provided. As indicated by the underline, the 'Group Messages' selection control 4420*c* is active. The group message window 4625 may provide information of standardized messages associated with a subscription list.

The invitation message window 4630 includes information of a current form message which is delivered to a user when the user is invited to join the subscription group. A user may be invited to join in various ways. For example, a user may be invited by an anchor user using the GUI 4500 (FIG. 45). Alternately, a user may send a message to a system associated with the search system 2630 which may cause the user to be invited to join a subscription group.

In at least one embodiment, a user may be required to confirm participation in a subscription group. In such an embodiment, after a user confirms participation in the subscription group, a welcome message such as that in the welcome message window 4635 may be delivered to the user. The welcome message may include standard information which may be required for regulatory or other purposes.

If a user elects to cease participating in a subscription list, the user may indicate that intent in various ways. Likewise, an anchor user may elect to remove a user from a subscription list for any reason. If a user is removed from a subscription list, the user may receive a message such as that in the exit message window 4640.

The invitation message window 4630, welcome message window 4635, and the exit message window 4640 may be used to edit the respective messages, and may provide information such as message constraints, etc. The action controls 4645 may be used to store or discard changes to the information indicated in the group message GUI 4600. The 'Save' action control 4645*a* may be used to record information indicated in the GUI 4600. The 'Cancel' action control 4645*b* may be used to discard changes to information indicated in the group message GUI 4600.

Figure 47:
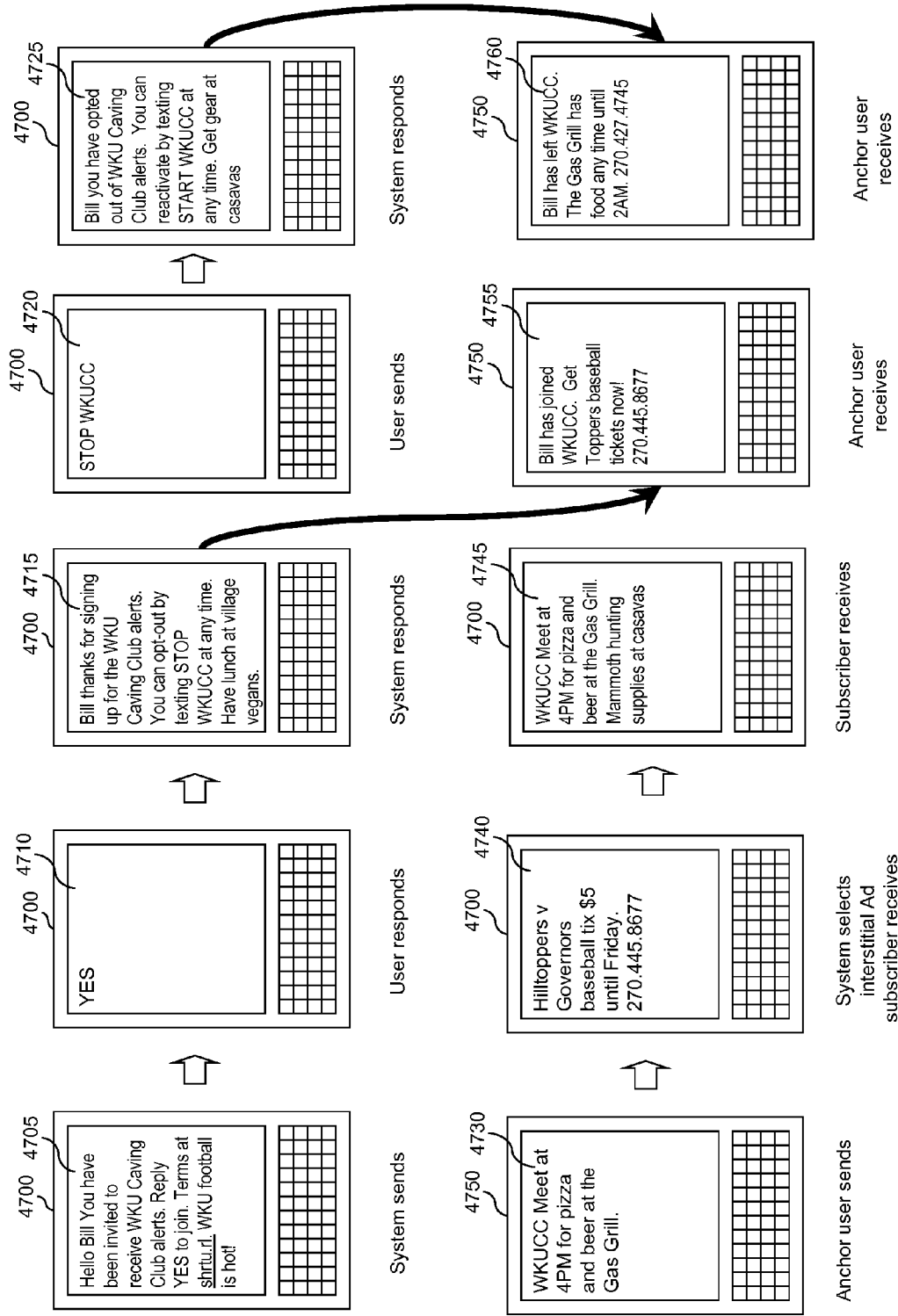
FIG. 47 illustrates message flows for a subscription group.

An exemplary sequence of messages between the search system 2630 (FIG. 26), a subscriber user device 4700, and an anchor user device 4750 is illustrated in FIG. 47. After a user is added to a subscription list, the subscriber user device 4700 may receive a welcome message 4705. If the user elects to join the subscription list, the subscriber user device 4700 may send an acceptance message 4710. The search system 2630 may receive the acceptance message, add the subscriber user to a subscription list, and send a welcome message 4715 to the subscriber user device 4700. The search system 2630 may send a notification message 4755 to the anchor user device 4750, which may inform an anchor user of the membership change.

An anchor user may compose a group message 4730 on the anchor user device 4750. The anchor user device 4750 may transmit the group message 4730 to the search system 2630. For example, an SMS message including the keyword assigned to a group (i.e. 'WKUCC') might be sent to a short code associated with the search system 2630. The search system 2630 may select an advertisement based on characteristics associated with a subscribing user, such as a location, and an affiliation (i.e., Bowling Green, college student), which may cause an advertising message 4740 to be delivered to the subscriber user device 4700. While a single advertising message being sent to a single user is depicted, multiple users might receive different advertising messages which may be selected based on a ranking of the advertisement for a user.

After receiving an optional interstitial advertisement, the subscriber user device 4700 may receive a subscriber distribution message 4745. The subscriber distribution message 4745 may include the message provided in the group message 4730, as well as an advertising message. For example, as the members of 'WKUCC' are associated with the characteristic 'nature lover' and the keyword 'outdoors' advertisements such as 'Advert1' might be more likely to be delivered to members of 'WKUCC'. For example the trailer ad "Mammoth hunting supplies at casavas" might be 'Advert1' as illustrated in the advertisement record 3000a (FIG. 30).

If a subscriber user elects to opt-out of a subscription list, the user may transmit an opt-out message 4720 from the subscriber user device 4700. The opt-out message 4720 may be sent to a short code associated with the search system 2630 (FIG. 26). The search system 2630 (FIG. 26) may respond by transmitting an exit message 4725 to the subscriber user device 4700, and/or an exit notification message 4760 to the anchor user device 4750.

Figure 48:
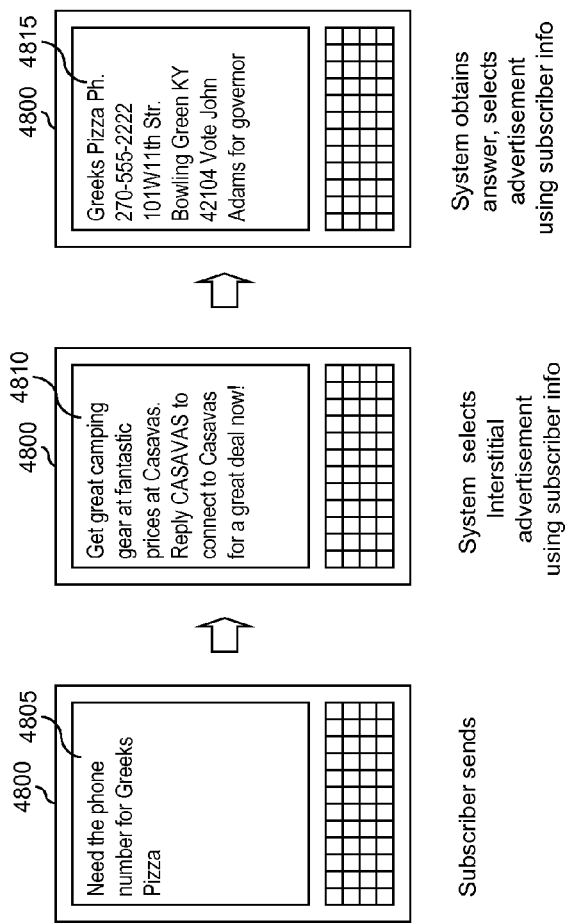
FIG. 48 illustrates a message flow for a request for information.

An exemplary sequence of messages between a subscriber user device 4800 and the search system 2630 (FIG. 26) is illustrated in FIG. 48. A subscriber user (e.g., 'Subscriber2') may compose a request message 4805. The request message 4805 may be transmitted to a short code associated with the search system 2630. Processing of a request may be recorded in a request record such as the request record 3300 (FIG. 33). The request message 4805 may be directed to an ambassador guide, as it is not amenable to fully automated processing. An interstitial advertisement may be selected for an interstitial message 4810. An advertisement selected based on the subscription list (i.e., WKUCC) associated with 'Subscriber2', may allow better targeting of an advertisement than a keyword of the request message 4805. An ambassador guide selected to respond to the request message 4805 may determine that the request is seeking directory assistance listings. An automated resource might provide a sponsored listing, and thus an advertisement for a competitor to the sponsor based on the keyword 'pizza' may not be suitable to be provided as a trailer advertisement in a result message 4815. However, as 'Subscriber2' is associated with 'WKUCC' which is an 80% match to 'Profile1' (see FIG. 35), the advertisement 'Advert2' (i.e., "Vote for John Adams for Governor") might be selected to be presented in the search result message 4815. In this example, a selected advertisement avoids keywords of a query when content of the request is not clearly expressed (e.g., the interstitial advertisement). Further when content of a request is clarified (i.e., the trailer advertisement) a highly rated advertisement that does not conflict with sponsored content may be provided using information associated with a subscriber user.

While the method and system herein have been described using particular types of indicators and user interface features, no limitation is implied thereby. Any indications and user interface features well known in the relevant art may be used to implement the user interfaces herein without departing from the scope and spirit of the embodiments.

While particular data structures and database elements have been used for the purposes of illustration, other equivalent data structures as would readily occur to one of ordinary skill in the relevant art may be used to implement the various data elements of the system and methods herein. Any fields of any of the records described may be blank, and the records may include other fields within the scope and spirit of the embodiments herein.

For the purposes of illustration, a system employing SMS messaging has been used to describe the method and systems herein. However, the system may be implemented using any or all of SMS, MMS, email, Instant Messaging, voice communications, internet communications, etc. which may allow distribution of information to multiple users who may form a subscription group.

Using the method and systems described herein, users may elect to receive messages from a group which distributes messages or subscription list. A user who controls the messages which are distributed or anchor user may provide information of the group. Information of users associated with a subscription list may be used to target information to the users. An anchor user may add, remove, invite and message members of a subscription list.

In at least one embodiment, a search service may provide a distribution list service. Messages distributed as part of a distribution list service may include advertisements. Profile information associated with a distribution list may be provided by a user who controls messages to be distributed. Messages may be distributed using any suitable service such as IM, SMS, MMS, email, voice, and/or IP communications, etc. Information associated with a subscription list may be associated with a user who subscribes to the subscription list. Profile information associated with a subscription list or distribution list may include geographic, demographic, personality, affiliation, etc., characteristics.

Advertisements, messages, and/or other information which may be provided by a search service may be selected based on profile information associated with a user. A more detailed profile of a user may be determined based on profile information associated with the user. Messages exchanged between members of a distribution list may be used to determine profile information of the distribution list.

In a system using humans to respond to a query, the use of human efforts must be carefully applied. For example, a classic call center may implement an IVR system to attempt to encourage a 'self service' approach to obtaining information. Similarly an automated search service such as Google or Yahoo! leaves the burden of locating a desired answer on the user of the service.

An alternative approach is to use human searchers to respond to user queries with a direct answer to the query. For example, the AskMeNow® and AQA® search services have been commercialized. However, the cost to use such a service may inhibit adoption. In the case of the ChaCha® search service, an advertising supported model has greatly increased adoption of mobile text search. In 2011, ChaCha garnered a larger share of SMS text searches than Google, with an accumulated query count of over one Billion queries answered.

In order to provide a high quality service while keeping the cost of responding low enough to be advertising supported it is critical that queries be processed in the most efficient way possible while maintaining a high level of user satisfaction. This task may be further complicated by use of the service for responding to queries which are frivolous. A frivolous query is a question which may involve an opinion, a humorous comment directed to a human searcher, or a question seeking non-specific advice.

In light of these and other problems, what is needed is a method and system for processing frivolous queries.

A system is provided which includes a user system for submitting a query and receiving a response, a search server receiving the query, a database storing information of queries, search results, searchers, and other information, a guide system receiving a query and providing a search result, a human assisted resource responding to frivolous queries, and an automated resource responding to frivolous queries. The system includes a query processing server which receives queries, determines an appropriate response, and distributes the query, a guide system operated by a human searcher receiving a request and providing a search result, a user system submitting a request, a resource providing information to respond to a query, a database recording information associated with processing of queries, a conversational resource responding to frivolous queries, and a frivolous query distribution system.

When a query is received by a search system, the query may be analyzed to determine if an automated response to the query is suitable. When an automated response is not suitable, the query may be analyzed to determine if it is a frivolous query. Factors such as query content, user history, user profile, time of day, system loading and others may affect the probability that a query will be determined to be frivolous. If a query is determined to be frivolous, the query may be directed to a resource such as a query robot, or may be directed to a person who is currently available who has agreed to accept frivolous queries of a type associated with the query.

When a query is submitted to a search system, the query is analyzed to determine whether content of the query indicates that the query is a frivolous query. The analysis may be based on statistical techniques. In at least one embodiment, the query is analyzed using a Fisher-Bayes statistical model. A statistical model may be based on a corpus of non-frivolous queries and a corpus of frivolous queries. Alternate probability determinations which are well known in the art may be used such as a neural network, a programmatic heuristic, or other predictive models. A probability model may be created, trained, updated, etc. based on opinions of human searchers. A human searcher may be presented with a plurality of queries in the course of responding to user requests which form the basis for determining whether a future query is a frivolous query.

If it is found that the probability that a query is frivolous is above a first threshold, a user submitting the query is examined. An identifier of a user such as a telephone number, login ID, or IM address might be used to associate previous queries with the user. A query history of a user may be examined to determine whether the user has submitted frivolous queries in the past. If the user is found to have submitted frivolous queries in the past, a probability that a query is frivolous may be adjusted.

If it is found that the probability that a query is frivolous is above a second threshold after examining a user history associated with the query, characteristics of the user may be evaluated to determine whether a query is frivolous. For example, age associated a user may be examined, and the probability that a query is frivolous may be adjusted based on a ratio of frivolous queries associated with that age group. Parameters such as age, location, gender, time of day, time between queries, affiliation, source, etc. may be used to adjust a probability that a query is frivolous.

After adjustments have been applied, a final determination is made as to whether a query is a frivolous query. If it is found that the query is a frivolous query, the query may be distributed to various resources. In at least one embodiment, a frivolous query is distributed to a conversation exchange which may distribute queries to users registered to accept a type of request. A frivolous query may be associated with a category and/or a keyword which may be used to select a user to receive the query. In at least one embodiment, a frivolous query is directed to a 'chat bot' or artificial intelligence agent (AI). An AI may be customized using a database associated with previous frivolous queries. An AI may be further customized based on characteristics of a user, a location, a query, etc.

If it is determined that a query is not frivolous, the query is passed to an expediter guide and/or a searcher who may obtain a search result. If a guide determines that a query is a frivolous query, a predictor may be modified based on the guide's opinion.

As used herein, a "request" means a request for information, products, and/or services. A request or search request or query may include various types of media, and may be provided by any user system which may establish communication with a server and/or other devices associated with a search service. A request may be referred to as a "search request", "search query", or "query".

A "user" is a person who submits a request. A user may receive any type of information responsive to a request. A user may be any person or entity. A "guide" is a person who assists in processing a request. A guide may be referred to as a "provider", "searcher", "human searcher", "expediter", "transcriber", "specialist" or "generalist". Guides may be assigned various roles. A guide who transcribes a user request from one form to another may be referred to as a transcriber. A guide who reviews a query, determines a most likely response, and/or may modify a query may be referred to as an expediter or "ambassador". A guide who performs a search for queries associated with a specific category may be referred to as a specialist. A guide who performs a search for queries regardless of category may be referred to as a generalist. Any guide may perform any role or activity.

An "advertiser" is any person and/or entity which may provide promotional information or "advertisements" to be delivered to a user. An advertisement may take various forms and/or may include media of any sort which can be delivered to a user device. A "result", "response", "answer", or "search result" is any information which has been determined to be a response to a request. A result may include an advertisement. A result may be any information which is determined to be a response to a request. A "resource" or "search resource" may be any source of information which may provide a search result. A resource may include a search engine, a web server, a software application, an API, printed media, an RSS feed, streaming media, a web page, etc. A "profile" may be any information associated with, describing, innate to, or characterizing a person such as demographic data, geographic data, personality data, affiliations, etc.

The terms voice and speech are used interchangeably herein. A user, a guide, an AI and/or a search system may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail and/or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, laptop or server system might be used to establish a communication session using IM, email, SMS, MMS, etc. A landline phone, a specialized communication terminal, or any other communication device might be used to establish a communication session.

Communication between a user, a guide, an AI, a distribution server and/or a search system may include conversion of text to speech and speech to text. Any type of media which can be sent and/or received using a communication system may be part of a communication session. A communication session may be conducted using any or all communication services associated with a user, a guide, an AI, a query distribution server and/or a search system. Any communication session may include communication via multiple services and/or devices. For example, a request may be submitted as a voice query, which might indicate an image located on a resource accessible to a user. A voice query might be converted to a text message, the image might be processed in order to associate a tag and/or other images with the image, and a response might be provided as a spoken reply to a mobile phone associated with a user, and a video presentation which is accessible via a high-speed connection that might be delivered to a browser functionality of a different user device.

An advertisement may be transmitted, including during any or all communication sessions. A guide, a user, a search result, a resource, an AI, a distribution service, and/or a request may be rated. Rating information may be obtained from a user, a guide, and/or an administrator of a search system. Rating information may be used to select a user, a guide, a request, a result, an AI, and/or any item based on information associated with an item indicated in a database. A search service may be compensated by advertising revenue. Advertising and/or content may be delivered to a user and/or a guide using any communication service associated with a user and/or a guide or worker.

Figure 49:
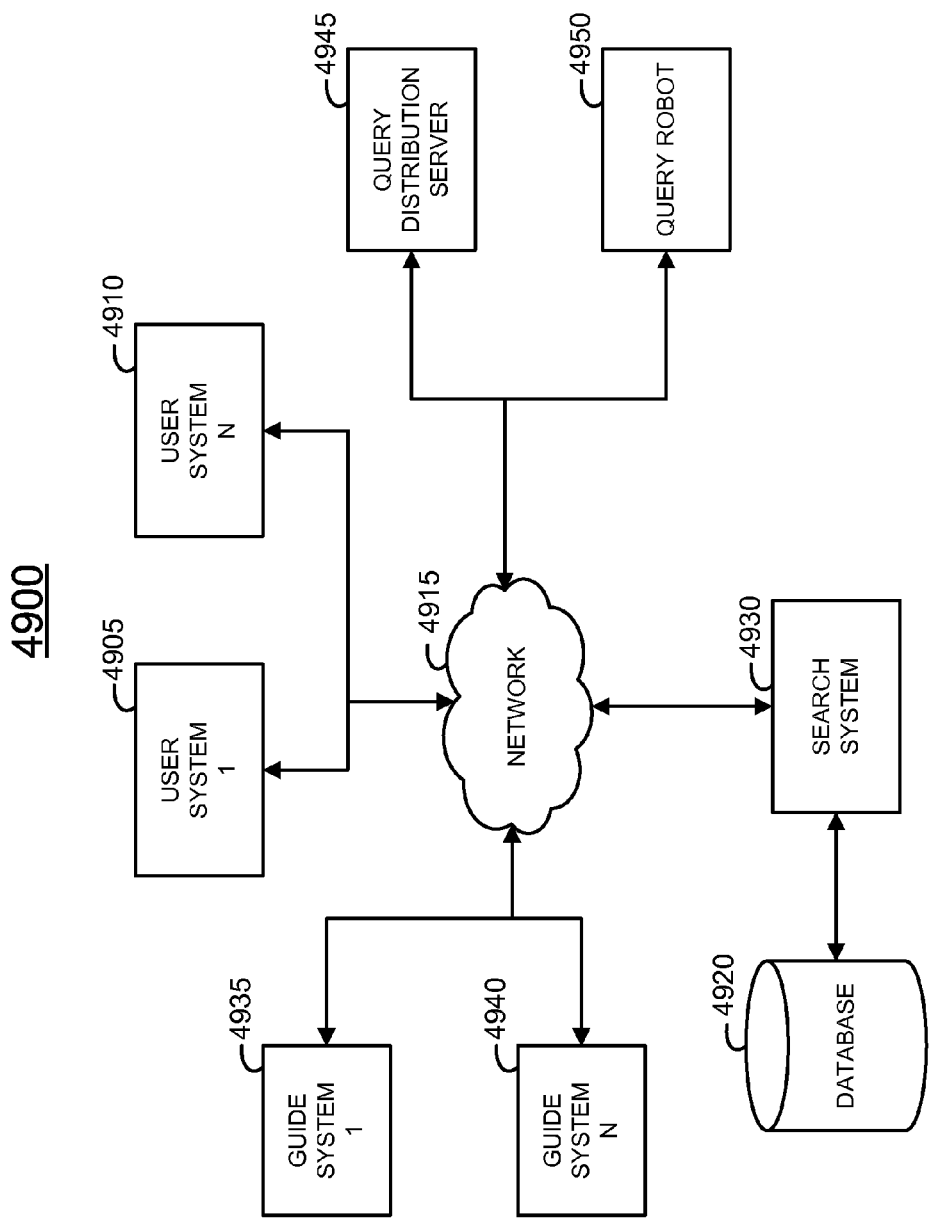
FIG. 49 is a block diagram of an exemplary system embodiment.

As illustrated in FIG. 49, system 4900 includes user systems 4905, 4910, a network 4915 such as the Internet, a search system 4930, a database 4920, which may comprise various records, guide systems 4935, 4940, a query distribution server 4945, and a query robot 4950. Although the query distribution server 4945 and the query robot 4950 are shown as separate components, any or all of query distribution server 4945 and the query robot 4950 may be fully or partially integrated with the search system 4930.

While only a few systems associated with a user and a guide are depicted in FIG. 49, it is within the scope of the disclosure for multiple systems for a user and guide to be utilized. In particular it is envisioned that many user and guide systems may be implemented. A search system, query distribution server, and query robot may be composed of many components as described further herein. Many query distribution servers and query robots may be implemented.

Any user system (e.g. the user system 4905) can be used to submit a request to the search system 4930 and/or receive a result and/or other information. Any user system may receive a response, and/or may provide compensation to the search system 4930.

The network 4915 may be a global public network of networks (i.e., the Internet) and/or may consist in whole or in part of one or more private networks and communicatively couples the user systems 4905, 4910, the guide systems 4935, 4940, the query distribution server 4945, and the query robot 4950 with the other components of the system such as the search system 4930, and the database 4920. The network 4915 may include one or more wireless networks which may enable wireless communication between the various elements of the system 4900. For example, the search system 4930 may receive messages which may be routed via a wireless network controlled by a wireless service to the user systems 4905, 4910. A wireless service may receive messages from the guide systems 4935, 4940, via a wireless network which is a part of the network 4915, and provide the messages to the search system 4930 via an internet connection which is part of the network 4915. Similarly a voice communication via wired and/or wireless communication might be established between any elements of the system 4900.

The search system 4930 allows interaction to occur among the user systems 4905, 4910, the guide systems 4935, 4940, the query distribution server 4945, and the query robot 4950. For example, a request can be transmitted from the user system 4905 to the search system 4930, which may provide information obtained from the database 4920, which may include an advertisement provided by an advertiser who is a user (e.g. a user at the user system 4910) to the user system 4905. Similarly, a search result from a searcher operating the guide system 4935 might be routed to the search system 4930, which might process the response and provide a message to the user system 4905. Any type of communication between users and/or workers may be mediated and/or facilitated by the search system 4930, and/or other elements of the system 4900.

The search system 4930 is communicatively coupled with the database 4920. As will be described herein in further detail below, the database 4920 includes persistent data that is processed in association with operation of the embodiments. Although FIG. 49 illustrates the database 4920 as a separate component of the system, the database 4920 may be integrated with the search system 4930. Further, the records maintained in the database 4920 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 4920 may reside in any suitable elements of the system 4900. Any or all elements of the system 4900 may include any or the entire database 4920.

The user systems 4905, 4910, the guide systems 4935, 4940, the query distribution server 4945, the query robot 4950 and the search system 4930 may include equipment, software, systems and personnel required to send and/or receive messages between a user system 4905, 4910, the guide systems 4935, 4940, the query distribution server 4945, the query robot 4950 and/or the search system 4930 using the network 4915. The database 4920 includes information which may allow the search system 4930 to establish communication between any or all of the elements of the system 4900.

A user system, a guide system, a query distribution server, a query robot and/or a search system may be a desktop or portable PC or Mac®, a mobile phone, a smart phone, a tablet computer, a PDA, a server system, a landline phone, a specialized communication terminal, a terminal connected to a mainframe, or any other communication device and/or system. The search system 4930, the query distribution server 4945, and/or the query robot 4950 may include one or more servers, computers, etc. For example, servers such as the PowerEdge® 50900 by Dell, or the BladeCenterJS22 by IBM, or equivalent systems might be used to implement elements of the search system 4930. The search system 4930 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems or communication devices known in the art may be used as user systems, guide systems, query distribution servers, query robots and/or to implement the search system 4930.

A user may be identified by the search system 4930. When a user system, such as the user system 4905, establishes a communication session with the search system 4930, an identifier of a user system is determined. An identifier of a user system may be associated with other information regarding a user. A user system may be identified using an email address, a telephone number, an IM credential, a username, and/or any other identifier which may be used to associate information with a user. Multiple identifiers of a user may be associated with each other. Using information of communication services associated with a user, a communication session may be established between a user system such as the user system 4905 and an advertiser system, a guide system 4935 and/or the search system 4930. Information such as a keyword, a category, a user profile, a request, a result, etc., may be associated with a user. A user may be required to provide profile information to the search system 4930. A user may elect to receive requests from the search system 4930 and/or the query distribution server 4945. Information of a user may be stored in the database 4920.

A guide may be required to register with the search system 4930. As part of a registration process, at least one communication method is associated with a guide. In at least one embodiment, a guide may register with the search system 4930 and establish a username and password which are associated with the guide. A guide may login to the search system 4930 using a web browser functionality of the guide system 4935, 4940 in order to communicate with the search system 4930. Multiple communication services may be associated with a guide and may allow a communication session to be established between a guide system such as the guide system 4935 and a user system, a query robot, a query distribution server, and/or the search system 4930. Multiple identifiers of a guide may be associated with each other. Information such as IM credentials, an email address, a phone number, a URL, a username, etc., of a guide may be identified which may allow the search system 4930 to establish a communication session between a guide system and a user system, a query robot, a query distribution server, and/or the search system 4930.

When a guide registers with the search system 4930 the guide may be associated with one or more keywords, categories, and/or other information. Information associated with a guide may be stored in the database 4920 and may be used for various purposes. Information associated with a guide may be used to rank requests, resources, results, advertisements and/or other information which may be presented to the guide. In at least one embodiment, payment information is associated with a guide. In at least one embodiment, a guide may be required to undergo testing to determine whether a guide is able to perform any tasks which may be required by an operator of the search system 4930. For example, a guide may be assigned to a role such as translator, transcriber, expediter, generalist, specialist, etc.

Records may be maintained in the database 4920 which may be used to record the status of various items. Such records may be used to aid the processing of requests and production of responses or answers. For example, a user may submit a request, which may describe a desired response, and provide access to information and/or materials needed to produce the response. Information indicated in a record may be combined with information in other records, and may be used to produce tables, as further described herein.

As illustrated in FIG. 50 an exemplary request record table 5002 is provided. The request table 5002 may comprise a number of request records 5000 of which one or more may be associated with or resident in the database 4920 (FIG. 49). The request record table 5002 may include information of requests, which may be distributed. The request records 5000 may include a request ID field 5005, a request type field 5010, a request guide ID field 5015, a request user ID field 5020, a request input field 5025, a request output field 5030, a request quality field 5035, and a request time information field 5040.

The request ID field 5005 includes an identifier of a request which is preferably unique and is preferably used consistently. A request ID serves to distinguish a request record associated with a request from a request record associated with other requests. Any number of characters, numbers, and/or other indicators may be used to indicate a request ID. In at least one embodiment, a request ID associated with a request is included in the request ID field 5005. In at least one embodiment, a random number is indicated in the request ID field 5005. Using the example in FIG. 50, 'Request1' is the request ID associated with the request record 5000*a*.

The request type field 5010 may include information of a type associated with a request. Information indicated in the request type field 5010 may be used to select a request. For example, a type associated with a request may be used to rank guides who may be associated with the type of request. Likewise, a type associated with a request may be used to rank requests which may be presented to a guide. Any request which may be performed by a guide or resource registered with the search system 4930 (FIG. 49) may be indicated in the request type field 5010. A type may be associated with a request automatically and/or using the assistance of a person. Using the example in FIG. 50, 'Request2' may be of type 'Expedite—timed' as indicated in the request record 5000*b*. This may indicate that a worker qualified to perform the 'Expedite' request in a timed mode (i.e. the request must be completed in a predetermined amount of time) may be notified if 'Request2' is available. Request types may be associated with various properties such as processing to be performed, a time interval, a category, etc. A type associated with a request may be used to determine an automated and/or human-assisted process for the query. A worker may select a request based on information indicated in the request type field 5010.

The request guide ID field 5015 may include information of a number of guides associated with a request. Content of the request guide ID field 5015 may be used to obtain information of a guide using a record such as the guide record 5200*a* (FIG. 52). If a guide is selected for a request, elects to receive a request, and/or completes a request, an identifier of the guide may be indicated in the request guide ID field 5015. Using the example in FIG. 50, 'Guide1' is associated with 'Request1'. This may indicate that 'Request1' has been completed by 'Guide1'. An automated guide such as the query robot 4950 (FIG. 49) may be indicated in the request guide ID field 5015.

The request user ID field 5020 may include information of a number of users associated with a request. Content of the request user ID field 5020 may be used to obtain information of a user associated with a request. For example, if a request is submitted by a user, an identifier of the user may be indicated in the request user ID field 5020. A request may not be associated with a user request. For example, the search system 4930 (FIG. 49) may provide requests to guides which are not directly related to a user request. Using the example in FIG. 50, 'User1' is associated with 'Request1' and 'Request2' while 'User2' is associated with 'Request3'. This may indicate that 'Request1' and 'Request2' were submitted by 'User1' while 'Request3' was submitted by 'User2'.

The request input field 5025 may include information of a request. Content of the request input field 5025 may be provided to a guide who accepts a request. Content of the request input field 5025 may include any type of information. For example, a pointer to audio, video, text, and/or other media may be indicated in the request input field 5025. As illustrated in FIG. 50, the query 'What is the first law of robotics?' is the request input associated with 'Request1'. In at least one embodiment, the request input field 5025 may indicate an original user request, a categorization, and a rewritten user request.

The request output field 5030 may include information of a response associated with a request. Content of the request output field 5030 may indicate a response to be provided to a user responsive to a request. Content of the request output field 5030 may be stored in the database 4920 (FIG. 49). Content of the request output field 5030 may be reviewed by a user, a guide, and/or an administrator. As illustrated in FIG. 50, the response 'I like to wear something sexy this time of night. Ski boots are my favorite.' is associated with 'Request3' as illustrated in the request record 5000*c*. While a text response to a query is used for the purposes of illustration, any type of media may be indicated in the request output field 5030. In at least one embodiment, a text response and a URL associated with a source of the text response may be indicated in the request output field 5030.

The request quality field 5035 may include information of a quality rating associated with a request. Content of the request quality field 5035 may affect compensation provided. For example, if a guide achieves a specified level of quality performance, additional points may be credited to the guide. A quality rating may be any type of indication, such as a flag, a numeric value, etc. Content of the request quality field may be produced automatically and/or using the assistance of a person. Using the example in FIG. 50, the quality flag 'OK' is associated with all the request records 5000, which may indicate that 'Request1', 'Request2', and 'Request3' have passed a quality check. A quality rating or ranking associated with a request may be used to determine a ranking of other items associated with a request such as a guide, a resource, etc.

The request time information field 5040 may include information of time associated with a request. Content of the request time information field 5040 may be used for various purposes. For example, completion time of a request may be used to determine a period associated with compensation for a guide completing the request. Time information associated with a request may be used to determine a rating of a guide associated with the request. For example, if a guide is taking a longer or shorter time than other guides for completing a request, a rating of the guide may be adjusted. Time information associated with a request may be used to select a request and/or to determine a type associated with the request. For example, a start time indicating when a request was submitted may affect the probability that the request is determined to be frivolous.

As illustrated in FIG. 51 an exemplary user record table 5102 is provided. The user record table 5102 may comprise a number of user records 5100 of which one or more may be associated with or resident in the database 4920 (FIG. 49). The user record table 5102 may include information of users. The user records 5100 may include a user ID field 5105, a user request ID field 5110, a user request type field 5115, a user communication information field 5120, a user profile field 5125, and a user conversation election field 5130.

The user ID field 5105 includes an identifier of a user which is preferably unique and is preferably used consistently. A user ID serves to distinguish a user record associated with a user from a user record associated with other users. Any number of characters, numbers, and/or other indicators may be used to indicate a user ID. In at least one embodiment, a random number is indicated in the user ID field 5105. Using the example in FIG. 51, 'User1' is the user ID associated with the user record 5100*a*.

The user request ID field 5110 may include information of a number of requests associated with a user. A user request ID may be, for example, a pointer to a request record associated with a request submitted by a user. If a user submits a request, a request ID may be added to the user request ID field 5110. Using the example illustrated in FIG. 51, 'Request3' and 'Request11' and 'Request12' are associated with 'User2' as indicated in the user record 5100*b*. This may indicate that 'User2' has submitted 'Request3' and 'Request11' and 'Request12'. A number of queries, query frequency, query interval, etc., associated with a user may affect a probability that a user query is determined to be a frivolous query.

The user request type field 5115 may include information regarding a type associated with a user request. For example, if a request is directed to a type of processing such as transcription, expediting, human search, automated search, search associated with a category, frivolous, conversational, etc., a type associated with the processing may be indicated in the user request type field 5115. A type associated with a user request may affect a probability that a request is a frivolous request. If a user frequently submits conversational queries, a probability that a query is determined to be frivolous may increase.

The user communication information field 5120 may include information of a number of communication services associated with a user. Any information which may be used to establish communication with a user may be indicated in the user communication info field 5120. For example, a telephone number, an email address, an IM credential, a URL, a username, a password, and/or other communication information may be indicated in the user communication info field 5120. Using the example in FIG. 51, the phone number '317.222.2242' and the email 'user1@chacha.com' are associated with the User1'. Information indicated in the user communication information field 5120 may be used to select a user to receive a frivolous query.

The user profile field 5125 may include information of a profile associated with a user. For example, demographic, geographic, affiliation, personality, and/or other types of information may be associated with a user. A user may provide profile information as part of a registration process. User profile information may be obtained from a database provided by a third party. User profile information may be determined based on test, polling, query history, peer review, and/or other information associated with a user. Using the example illustrated in FIG. 51, 'Female, DOB12241945, zip10019' are associated with 'User2'. Profile information may be used to match information provided by a user with other information. For example, if a frivolous query has been submitted, profile information of a user may be used to select a user to receive the frivolous query. Profile information associated with a user may affect a probability that a query submitted by the user is determined to be a frivolous query.

The user conversation election field 5130 may include information of a type of query a user is willing to accept. For example, if a user elects to receive frivolous queries which are associated with sports this may be indicated in the user conversation election field 5130. In at least one embodiment, a user may be able to elect to receive queries filtered for content, topic, keyword, location, etc.

As illustrated in FIG. 52 an exemplary guide record table 5202 is provided. The guide record table 5202 may comprise a number of guide records 5200 of which one or more may be associated with or resident in the database 4920 (FIG. 49). The guide record table 5202 (FIG. 52) may include information of guides. The guide records 5200 may include a guide ID field 5205, a guide request ID field 5210, a guide request type field 5215, a guide rating field 5220, a guide communication info field 5225, and a guide payment info field 5230.

The guide ID field 5205 includes an identifier of a guide which is preferably unique and is preferably used consistently. A guide ID serves to distinguish a guide record associated with a guide from a guide record associated with other guides. Any number of characters, numbers, and/or other indicators may be used to indicate a guide ID. In at least one embodiment, a random number is indicated in the guide ID field 5205. In at least one embodiment, a pseudonym selected by a guide may be indicated in the guide ID field 5205. Using the example in FIG. 52, 'Guide1' is the guide ID associated with the guide record 5200a.

The guide request ID field 5210 may include information of a number of requests associated with a guide. Content of the guide request ID field 5210 may be used to obtain information of a request. For example, if a user request has been determined to require a number of requests to be performed, the search system 4930 (FIG. 49) may assign a unique ID to the requests and may distribute information of the requests to guides. Using the example in FIG. 52, 'Request2', 'Request24' and 'Request102' are associated with 'Expediter1' as indicated in the guide record 5200b. This may indicate that 'Expediter1' has expedited 'Request2', 'Request24' and 'Request102'.

The guide request type field 5215 may include information of a number of types of requests which may be processed by a guide. For example, a category and/or keyword associated with a request, a type of request, temporal information associated with a request, etc., which may be used to determine if a guide is to be presented with a request may be indicated in the guide request type field 5215. In at least one embodiment, a guide may be assigned to a particular type of request as part of a registration process. A guide may select a type of request which the guide may perform. A guide may be required to pass a test in order to be associated with a type of request. Using the example in FIG. 52, 'Guide1' is associated with 'Category1', 'Category2', 'Search timed' and 'Search untimed', which may for example indicate that 'Guide1' may be presented with and/or select requests associated with any search for information associated with 'Category2'.

The guide rating field 5220 may include information of a number of ratings associated with a guide. For example, quality, speed, peer review, etc., may be used to determine a rating of a guide. A rating of a guide may be used for purposes such as determining compensation for the guide (e.g. bonus points), selecting a guide to respond to a request, matching a request to a guide, etc. In at least one embodiment, the guide request type field 5215 and the guide rating field 5220 may be linked by, for example, a pointer. Using the example in FIG. 52, 'Expediter1' has a rating of '0.95' associated with 'Expedite timed', which may be used to rank 'Expediter1' versus other guides associated with the request type 'Expedite timed'.

The guide communication information field 5225 may include information of a number of communication services associated with a guide. For example, a user name and password, an email address, an IM credential, a phone number, a web page, a physical address, etc., may be indicated in the guide communication information field 5225. Using the example illustrated in FIG. 52, 'Guide1' is associated with the login ID 'guide1', the email 'guide1@chacha.com', and the phone number '555.924.2242'. This may indicated that 'Guide1' may be contacted using the associated communication services.

The guide payment info field 5230 may include information of a payment method associated with a guide. For example, banking information, a PayPal® account, a Western Union® account, etc., may be indicated in the guide payment info field 5230. Content of the guide payment info field 5230 may be used to provide compensation to a guide. For example, payment may be made by Automated Clearing House (ACH), wire transfer, etc., using information indicated in the guide payment info field 5230.

As illustrated in FIG. 53, an exemplary responder record table 5302 is provided. The responder record table 5302 may comprise a number of responder records 5300 of which one or more may be associated with or resident in the database 4920 (FIG. 49). The responder record table 5302 (FIG. 53) may include information of responders. The responder records 5300 may include a responder ID field 5305, a responder request ID field 5310, a responder request type field 5315, a responder rating field 5320, a responder communication information field 5325, and a responder profile field 5330.

The responder ID field 5305 includes an identifier of a responder which is preferably unique and is preferably used consistently. A responder ID serves to distinguish a responder record associated with a responder from a responder record associated with other responders. Any number of characters, numbers, and/or other indicators may be used to indicate a responder ID. In at least one embodiment, a random number is indicated in the responder ID field 5305. In at least one embodiment, a pseudonym selected by a responder may be indicated in the responder ID field 5305. Using the example in FIG. 53, 'Autochat1' is the responder ID associated with the responder record 5300a.

The responder request ID field 5310 may include information of a number of requests associated with a responder. Content of the responder request ID field 5310 may be used to obtain information of a request. For example, if a user request has been determined to require a number of requests to be performed, the search system 4930 (FIG. 49) may assign a unique ID to the requests and may distribute information of the requests to responders. Using the example in FIG. 53, 'Request11', 'Request100' and 'RequestC22' are associated with 'humanchatter1' as indicated in the responder record 5300*b*. This may indicate that 'humanchatter1', who may be a user, has responded to 'Request11', 'Request100' and 'RequestC22'.

The responder request type field 5315 may include information of a number of types of requests which may be processed by a responder. For example, a category and/or keyword associated with a request, a type of request, etc., which may be used to determine if a responder is to be presented with a request may be indicated in the responder request type field 5315. In at least one embodiment, a responder may be assigned to a particular type of request as part of a registration process. A responder may select a type of request which the responder may receive. A responder may be required to pass a test in order to be associated with a type of request. Using the example in FIG. 53, 'Autochat1' is associated with 'Sports', 'Dating', 'Sex' and 'Offensive', which may for example indicate that 'Autochat1' may be presented with and/or select requests associated with 'Sports', 'Dating', 'Sex' and 'Offensive'.

The responder rating field 5320 may include information of a number of ratings associated with a responder. For example, quality, speed, peer review, etc., may be used to determine a rating of a responder. A rating of a responder may be used for purposes such as determining compensation for the responder, selecting a responder to respond to a request, matching a request to a responder, etc. In at least one embodiment, the responder request type field 5315 and the responder rating field 5320 may be linked by, for example, a pointer. Using the example in FIG. 53, 'Autochat1' has a rating of '0.9' associated with 'Sports', which may be used to rank 'Autochat1' versus other responders associated with the request type 'Sports'.

The responder communication information field 5325 may include information of a number of communication services associated with a responder. For example, a user name and password, an email address, an IM credential, a phone number, a web page, a physical address, etc., may be indicated in the responder communication information field 5325. Using the example illustrated in FIG. 53, the URL <<https://autochat1.chacha.com>> is associated with 'Autochat1'. This may indicate that 'Autochat1' may receive a request and provide a result using an API associated with <<https://autochat1.chacha.com>>.

The responder profile field 5330 may include information of a profile associated with a responder. For example, an identifier of a version revision of an automated responder, demographic, geographic, personality, etc., information which might be used to match a user query to a responder may be indicated in the responder profile field 5330. Content of the responder profile field 5330 may be used to rank a responder. For example, if the automated responder 'Model GerryV2.7.22' is associated with the characteristic 'Male', 'Autochat1' might be more likely to be selected to respond to queries associated with 'Male'. Likewise, if a user such as 'User2' has elected to respond to conversational queries as indicated in the user record 5100*b* (FIG. 51), the user may be included in a group of users responding to queries such as frivolous queries. A request may be directed to a user based on content of the user profile field 5125 of a user record 5100 of users associated with the group 'usersofrandomtexts.com'. For example, a profile may be determined based on membership in a subscription group, etc.

Figure 54:
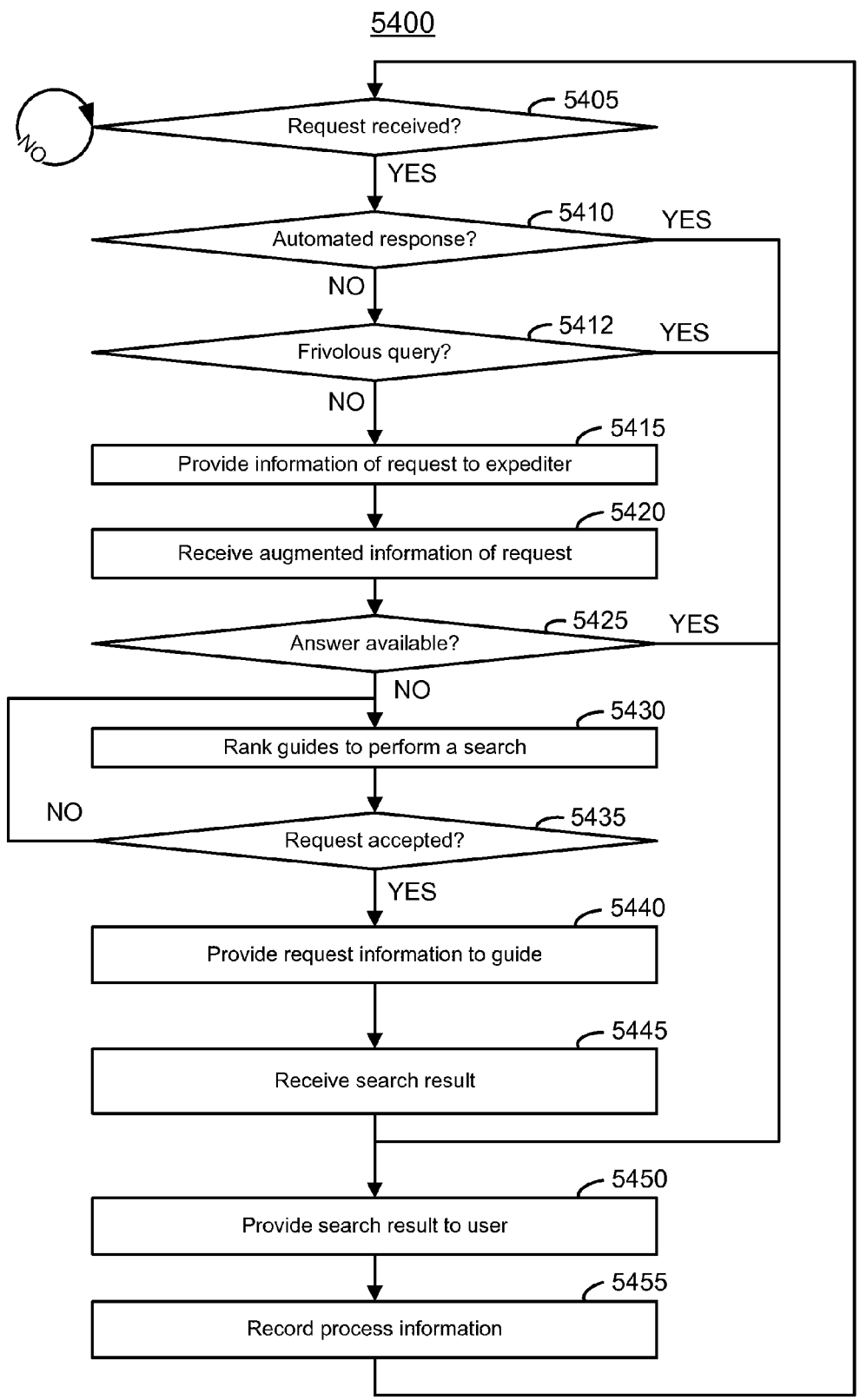
FIG. 54 is a flowchart of replying to a request.

As illustrated in FIG. 54, a process 5400 for responding to a request is provided. The process 5400 may be performed in whole or in part by any suitable element of the system 4900 (FIG. 49). In at least one embodiment, the process 5400 is operative on a server associated with the search system 4930 (FIG. 49).

In operation 5405 (FIG. 54), a determination is made as to whether a request is received. If it is determined in operation 5405 that a request is not received, control remains at operation 5405 and process 5400 continues. If it is determined in operation 5405 that a request is received, control is passed to operation 5410 and process 5400 continues.

The determination in operation 5405 may be made using various criteria. In at least one embodiment, if a message is received at a server associated with the search system 4930 (FIG. 49), it may be determined that a request is received. For example, if an email message, an SMS, EMS, and/or MMS message, an IM, an IP message, and/or a voice message is received at an address associated with the search system 4930, it may be determined that a request is received.

In operation 5410 (FIG. 54), a determination is made as to whether an automated response is acceptable. If it is determined in operation 5410 that an automated response is acceptable, control is passed to operation 5450 and process 5400 continues. If it is determined in operation 5410 that an automated response is not acceptable, control is passed to operation 5412 and process 5400 continues.

The determination in operation 5410 may be made in various ways. For example, a query may be compared to a template, a Regular Expression (RegEx) expression, a historical query, etc., in order to determine whether an automated response is acceptable.

In operation 5412, a determination is made as to whether a query is frivolous. If it is determined in operation 5412 that a query is frivolous, control is passed to operation 5450 and process 5400 continues. If it is determined in operation 5412 that a query is not frivolous, control is passed to operation 5415 and process 5400 continues. The determination in operation 5412 may be made in various ways as further described herein.

In operation 5415, information of a request is provided to an expediter. An expediter may process a request and may indicate whether an answer is available. Control is passed to operation 5420 and process 5400 continues.

In operation 5420, augmented information of a query is received. For example, a profile, a category, a phrasing, an interpretation, etc., based on judgment of an expediter may be received. Control is passed to operation 5425 and process 5400 continues.

In operation 5425, a determination is made as to whether an answer is available. If in operation 5425 it is determined that an answer is available, control is passed to operation 5450 and process 5400 continues. If in operation 5425 it is determined that an answer is not available, control is passed to operation 5430 and process 5400 continues.

The determination in operation 5425 may be made based on various criteria. For example, the determination operation 5410 and/or operation 5412 may be repeated based on information and judgment of an expediter associated with a request. Criteria may be modified based on processing by an expediter. For example, different thresholds may be applied to decision and/or confidence functions, a different algorithm, weighting of content of a query, etc., may be adjusted based on whether a query has been processed by a guide.

In operation 5430, a guide is ranked. A ranking of a guide may be based on information such as a keyword, category, profile, etc., associated with a guide and a request. If a guide has been previously notified of a request, the guide may be removed from a ranking for the query. A highest ranking guide may be notified of a request. Control is passed to operation 5435 and process 5400 continues.

In operation 5435, a determination is made as to whether a request is accepted. If in operation 5435 it is determined that a request is not accepted, control is passed to operation 5430 and process 5400 continues. If in operation 5435 it is determined that a request is accepted, control is passed to operation 5440 and process 5400 continues.

In operation 5440, information of a request is provided to a guide. In at least one embodiment, a first guide to accept a request is provided with the information of the request. A guide may be provided with access to search resources which may assist the guide to perform a search. Control is passed to operation 5445 and process 5400 continues.

In operation 5445, a search result is received. In at least one embodiment, a guide may select a response which is provided to the search system 4930 (FIG. 49). Any number of guides may provide a search result. Control is passed to operation 5450 and process 5400 continues.

In operation 5450, a search result is provided to a user. A search result provided to a user may be obtained from an automated resource, a human assisted resource, and/or a combination thereof. A result may include an advertisement selected using any information associated with a request. Control is passed to operation 5455 and process 5400 continues.

In operation 5455, process information is recorded. Information regarding a guide, a responder, a request, a resource, an advertisement, a user, etc., may be recorded and/or updated. For example, a rating may be adjusted associated with, a keyword, category, type, guide, responder, time, etc., of a request. In at least one embodiment, process information is recorded in the database 4920 (FIG. 49). Control is passed to operation 5405 and process 5400 continues.

Figure 55:
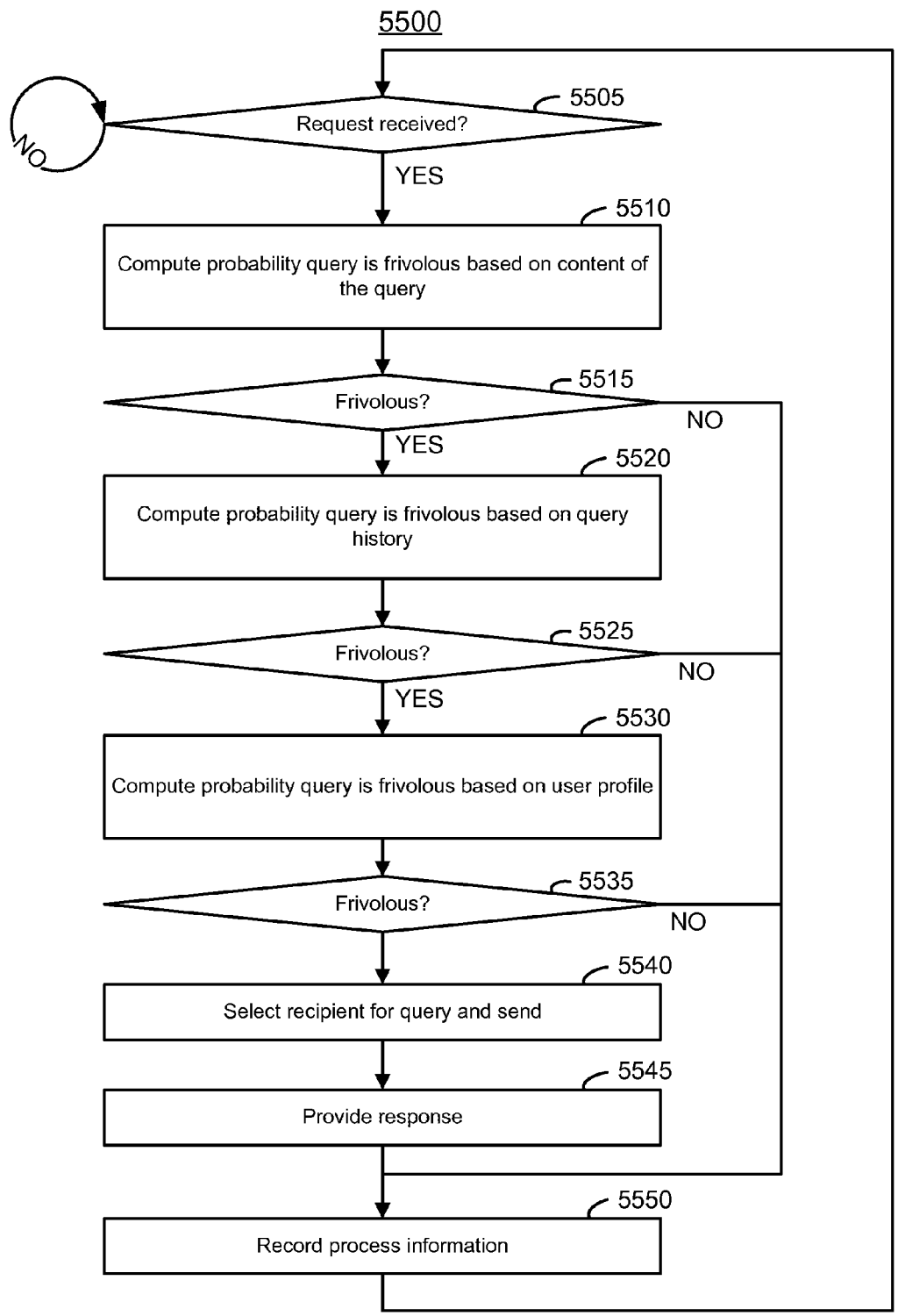
FIG. 55 is a flowchart of detecting and responding to a frivolous request.

As illustrated in FIG. 55, a process 5500 for detecting and responding to a frivolous request is provided. The process 5500 may be performed in whole or in part by any suitable element of the system 4900 (FIG. 49). In at least one embodiment, the process 5500 is operative on a server associated with the search system 4930.

In operation 5505 (FIG. 55), a determination is made as to whether a request is received. If it is determined in operation 5505 that a request is not received, control remains at operation 5505 and process 5500 continues. If it is determined in operation 5505 that a request is received, control is passed to operation 5510 and process 5500 continues.

The determination in operation 5505 may be made using various criteria. In at least one embodiment, if a message is received at a server associated with the search system 4930 (FIG. 49), it may be determined that a request is received. For example, if an email message, an SMS, EMS, and/or MMS message, an IM, an IP message, and/or a voice message is received at an address associated with the search system 4930, it may be determined that a request is received. A request may be communicated between processes active on the search system 4930.

In operation 5510 a probability that a query is frivolous based on content of the query is computed. Various forms of analysis may be applied to a query. A comparison of keywords of a query to a corpus of keywords associated with known frivolous and known not frivolous queries may be performed to determine a probability of a query belonging to each group. "Stop" words which are to be ignored and/or keywords and weighting of keywords may be determined from analysis of corpora of queries. Bi-grams or other named entities may be determined. Word location may be used to determine weighting of "stop" words. Control is passed to operation 5515 and process 5500 continues.

In operation 5515, a determination is made as to whether a query is frivolous. If in operation 5515, it is determined that a query is frivolous, control is passed to operation 5520 and process 5500 continues. If in operation 5515 it is determined that a query is not frivolous, control is passed to operation 5550 and process 5500 continues.

The determination in operation 5515 may be made based on various criteria. For example, a composite of keyword matching, initial phrase content, and word position may be used to compute a normalized rating of a query. If a normalized rating is below a predetermined value it may be determined that a query is not a frivolous query.

In operation 5520, a probability that a query is frivolous based on a query history of a user is computed. Factors associated with a query history probability may include a number of entries in the query history, occurrence of keywords of the query in previous queries, a type associated with previous queries, an average query length, a location associated with previous queries, etc. If a user query history is short, is out of date, etc., a weighting of query history may be reduced. If a user has submitted a high percentage or volume of frivolous queries in the past and/or recent past, a probability that a query is frivolous may be increased. If keywords of a query match keywords of a previous frivolous query, a probability that a query is frivolous may be increased. If a query is submitted at a particular time of day, a probability that a query is frivolous may be modified. Control is passed to operation 5525 and process 5500 continues.

In operation 5525, a determination is made as to whether a query is frivolous. If in operation 5525, it is determined that a query is frivolous, control is passed to operation 5530 and process 5500 continues. If in operation 5525 it is determined that a query is not frivolous, control is passed to operation 5550 and process 5500 continues.

The determination in operation 5525 may be made based on various criteria. For example, a composite of a current probability, query history, and temporal information may be used to compute a normalized rating of a query. If a normalized rating is below a predetermined value it may be determined that a query is not a frivolous query.

In operation 5530 a probability that a query is frivolous based on a user profile is computed. If a user is in an age group which has been found to be likely to submit frivolous queries, a probability that a query is frivolous may be increased. If a query has been associated with a particular category, and a user is associated with a demographic submitting a high percentage of frivolous queries regarding that category, a probability that a query is frivolous may be increased. Parameters such as age, gender, income, location, affiliation, and personality traits may be combined with factors such as content of a query to adjust a probability that a query is a frivolous query. Control is passed to operation 5535 and process 5500 continues.

In operation 5535, a determination is made as to whether a query is frivolous. If in operation 5535, it is determined that a query is frivolous, control is passed to operation 5540 and process 5500 continues. If in operation 5535 it is determined that a query is not frivolous, control is passed to operation 5550 and process 5500 continues.

The determination in operation 5535 may be made based on various criteria. For example, a composite of a current probability and user profile based information may be used to compute a normalized rating of a query. If a normalized rating is below a predetermined value it may be determined that a query is not a frivolous query.

In operation 5540, a query recipient is selected and the query is sent. A query recipient may be determined in various ways. In at least one embodiment, responders may be ranked based on information of the query and the responder. In at least one embodiment, a query is always sent to an automated responder. A query may be sent only to human assisted responders. A query may be sent to multiple responders, and a response selected based on factors such as time, keywords, etc., associated with the responder. Control is passed to operation 5545 and process 5500 continues.

In operation 5545, a response is provided. In at least one embodiment, a response is delivered to a user submitting a frivolous query. A probability that a request is frivolous may be provided. Control is passed to operation 5550 and process 5500 continues.

In operation 5550, process information is recorded. In at least one embodiment, a probability that a query is frivolous based on query content, query history, temporal information and/or a user profile are recorded in the database 4920 (FIG. 49). Information of a responder and a response may be recorded. Any information associated with the process 5500 may be recorded. Control is passed to operation 5505 and process 5500 continues.

While the process 5500 is illustrated with a particular order of operations, any suitable sequence of the operations may be used as required to implement the system. The operations may be performed in parallel, and some operations may be combined and/or removed.

Using the methods and system for responding to a frivolous request described herein, a request is evaluated to determine whether a human assistant is needed to respond to the request. The system examines content of a query, user history, temporal information, and user profile information to adjust a probability that a query is a frivolous query. If a query is determined to be a frivolous query, the query may be routed to an automated responder such as a 'chat bot' or to a query distribution system such as a human network to which queries can be distributed for response. Such a system may reduce costs associated with responding to generalized requests for information. Detection of frivolous queries may improve morale of guides who will receive fewer spurious requests for information. A user submitting a frivolous query who might otherwise receive no response may receive a response from an automated system and/or a conversational network which may be satisfactory for the user.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

The present invention may be implemented using a program stored, for example, in a non-transient computer-readable storage medium such as a CD-ROM, etc., or using one or more specialized terminals, devices or systems that is enabled to execute operation(s) described herein. The storage or recording medium used in an embodiment can be selected from among various persistent computer-readable media including, a disk, a DVD, an internal storage device (memory such as RAM or ROM) in a computer, etc.

The many features and advantages of the claimed invention are apparent from the detailed specification and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A computer implemented method for creation of media content comprising:
   receiving a registration indicator from a curator;
   accepting, by a processor, an indication of a media file by the curator;
   obtaining an item by processing the media file;
   associating the item with a query;
   receiving a request from a user;
   selecting a human assistant other than the user based on the registration indicator when the request indicates the curator;
   providing the request and information of the media file to the human assistant when determining that the request is not an exact match to the query;
   providing information of the request and the item to the curator when determining that the human assistant indicates that the item is a response to the request;
   providing the request and information of the media file to the curator when determining that the human assistant indicates that a suitable response is not available; and
   presenting the item responsive to the request when the request matches the query.

2. The computer implemented method of claim 1, further comprising:
   verifying the registration indicator; and
   providing the item and the query for review by the curator associated with the registration indicator.

3. The computer implemented method of claim 1, further comprising:
   receiving, from the human assistant acceptance of the association of the item with the query and the registration indicator; and
   associating a data structure with the media file when creating the item.

4. The computer implemented method of claim 1, further comprising:
   generating the media file based on a web page; and
   creating the query from a database of queries associated with a type and a structure of the media file.

5. The computer implemented method of claim 1, further comprising:
   delivering the request to a destination designated by the registration indicator and the query when determining that the request is not the exact match to the query.

6. The computer implemented method of claim 5, further comprising:
   receiving the request using at least one of a web page, a short code, and an Instant Message address associated with the registration indicator; and
   delivering a message received at the destination to a human searcher selected based on the registration indicator.

7. The computer implemented method of claim 6, further comprising:
   providing answers and registration indicators associated with the answers to the human searcher; and
   selecting, by the human searcher, the response to the request based on the answers.

8. The computer implemented method of claim 5, further comprising:
  providing an identifier of the registration indicator and a search result obtained from the media file to a human searcher; and
  selecting, by the human searcher, the search result as the response to the request.

9. The computer implemented method of claim 1, further comprising:
  associating the item with the query when the human assistant accepts the association of the item with the query;
  providing the item as the response to the request based on a source of the request when the human assistant indicates that the request matches the query;
  determining an access right associated with the item based on the registration indicator; and
  restricting access to the item by human assistants as determined by the curator associated with the registration indicator.

10. The computer implemented method of claim 1, further comprising:
  providing a questionnaire to a registrant to obtain the indication of the media file; and
  publishing the item on a web page of the registrant.

11. The computer implemented method of claim 1, further comprising:
  delivering a web page to a plurality of users designated by a registrant associated with the registration indicator;
  receiving, from the plurality of users, a plurality of responses to the web page;
  composing an aggregation of the plurality of responses; and
  publishing, with attribution to the registrant, the aggregation responsive to the query.

12. The computer implemented method of claim 1, further comprising:
  presenting the item to the user based on a selection of the item by the human assistant from a plurality of items associated with queries matching the request;
  presenting the request to the curator associated with the registration indicator when the selection is the item;
  creating the registration indicator based on an unique identifier provided by the curator; and
  identifying the request as a match for the query and the item when the curator accepts the request.

13. The computer implemented method of claim 12, further comprising:
  selecting the plurality of items based on an association of the items with the registration indicator and a ranking of the queries based on the request.

14. The computer implemented method of claim 1, further comprising:
  acquiring a characteristic of users subscribing to messages associated with a distribution group;
  associating the user with the distribution group; and
  presenting the item based on the characteristic.

15. The computer implemented method of claim 5, further comprising:
  determining, based on a statistical model of a corpus of queries, whether the request is frivolous; and
  directing the request to an address when determining that the request is frivolous.

16. The computer implemented method of claim 15, further comprising:
  directing the request to a user registered to accept frivolous queries associated with a category when determining that the request is frivolous.

17. The computer implemented method of claim 15, further comprising:
  directing the request to a database for responding to frivolous queries associated with a category when determining that the request is frivolous.

18. The computer implemented method of claim 1, further comprising:
  obtaining independent verification of the registration indicator;
  receiving, from a human assistant registered for a category associated with the registration indicator, acceptance of the association of the item with the query;
  generating, based on query templates associated with the query, an alternate query associated with the item;
  designating the alternate query as an exact match to the query;
  associating the request with the registration indicator based on a destination address of the request;
  presenting the item when determining that the request is the exact match to the query;
  presenting the item responsive to the request when determining that the human assistant has indicated that the item is the response to the request;
  associating the request with the item as the exact match to the query when determining that the curator has accepted the request and the item;
  associating an answer of the curator with the request;
  generating alternate forms associated with the request; and
  receiving, from the curator, acceptance of the alternate forms associated with the request.

19. A search system, comprising:
  a search system device comprising memory and a processor receiving information of a request for information from a user system, receiving an indication of a media file, and a registration indicator associated with the media file, obtaining an item by processing the media file, selecting a human assistant other than the user based on the registration indicator, associating the item with a query when the human assistant accepts the association of the item with the query, providing the request and information of the media file to the human assistant associated with the registration indicator when determining that the request is not an exact match to the query and providing the item as a response to the request based on a source of the request when the human assistant indicates that the request matches the query, providing information of the request and the item to a curator system when determining that the human assistant indicates that the item is the response to the request, providing the request and information of the media file to the curator when determining that the human assistant indicates that a suitable response is not available, and presenting the item responsive to the request when the request matches the query;
  the user system submitting the request for information;
  the curator system providing the indication of the media file and designating a source for requests associated with the media file.

20. A non-transitory computer readable medium storing therein a program for causing a computer to execute an operation including creating media content, comprising:
  receiving a registration indicator from a curator;
  accepting an indication of a media file by the curator;
  obtaining an item by processing the media file;
  associating the item with a query;
  receiving a request from a user;

selecting a human assistant associated with the registration indicator when the request indicates an identifier of the curator;
providing the request and information of the media file to the human assistant when determining that the request is not an exact match to the query;
providing information of the request and the item to the curator when determining that the human assistant indicates that the item is a response to the request;
providing the request and information of the media file to the curator when determining that the human assistant indicates that a suitable response is not available;
associating the request with the item as a match to the query when determining that the curator has accepted the request and the item; and
presenting the item responsive to the request when the request matches the query.

* * * * *